(12) United States Patent
Lo

(10) Patent No.: US 8,990,132 B2
(45) Date of Patent: Mar. 24, 2015

(54) ARTIFICIAL NEURAL NETWORKS BASED ON A LOW-ORDER MODEL OF BIOLOGICAL NEURAL NETWORKS

(76) Inventor: James Ting-Ho Lo, Ellicott City, MD (US)

( * ) Notice: Subject to any disclaimer, the term of this patent is extended or adjusted under 35 U.S.C. 154(b) by 256 days.

(21) Appl. No.: 13/469,090

(22) Filed: May 11, 2012

(65) Prior Publication Data

US 2013/0304683 A1    Nov. 14, 2013

(51) Int. Cl.
| | | |
|---|---|---|
| G06E 1/00 | (2006.01) | |
| G06E 3/00 | (2006.01) | |
| G06F 15/18 | (2006.01) | |
| G06G 7/00 | (2006.01) | |
| G06N 3/06 | (2006.01) | |
| G06N 3/12 | (2006.01) | |

(52) U.S. Cl.
CPC ... *G06N 3/06* (2013.01); *G06N 3/12* (2013.01)
USPC ............................................. 706/20; 706/26

(58) Field of Classification Search
CPC ........... G06N 3/088; G06N 3/06; G06N 3/12; G06N 3/063; G05B 13/027
USPC .......................................................... 706/20
See application file for complete search history.

(56) References Cited

U.S. PATENT DOCUMENTS

| | | | |
|---|---|---|---|
| 7,548,894 B2 | 6/2009 | Fuji | |
| 7,747,549 B2 | 6/2010 | Hoya | |
| 7,788,196 B2 | 8/2010 | Buscema | |
| 7,895,140 B2 | 2/2011 | Nagashima | |
| 2009/0290800 A1 | 11/2009 | Lo | |
| 2010/0166298 A1 | 7/2010 | Paquier | |
| 2010/0312734 A1 | 12/2010 | Widrow | |
| 2011/0225112 A1 | 9/2011 | Cameron et al. | |
| 2011/0270788 A1* | 11/2011 | Moore | 706/20 |

OTHER PUBLICATIONS

M. Riesenhuber and T. Poggio, Hierarchical models of object recognition in cortex, Nature Neuroscience, Nov. 1999, pp. 1019-1025, vol. 2, No. 11, Nature Publishing Group, U.S.A.

T. Serre, L. Wolf, Bilesche, M. Riesenhuber and T. Poggio, Robust Object Recognition with Cortex-like Mechanisms, IEEE Transactions on Pattern Analysis and Machine Intelligence, 2007, pp. 411-426, vol. 29, No. 3, The IEEE Press, U.S.A.

(Continued)

*Primary Examiner* — Kakali Chaki
*Assistant Examiner* — Kevin W Figueroa

(57) ABSTRACT

A low-order model (LOM) of biological neural networks and its mathematical equivalents including the clusterer interpreter probabilistic associative memory (CIPAM) are disclosed. They are artificial neural networks (ANNs) organized as networks of processing units (PUs), Each PU comprising artificial neuronal encoders, synapses, spiking/nonspiking neurons, and a scheme for maximal generalization. If the weights in the artificial synapses in a PU have been learned (and then fixed) or can be adjusted by the unsupervised accumulation rule and the unsupervised covariance rule (or supervised covariance rule), the PU is called unsupervised (or supervised) PU. The disclosed ANNs, with these Hebbian-type learning rules, can learn large numbers of large input vectors with temporally/spatially hierarchical causes with ease and recognize such causes with maximal generalization despite corruption, distortion and occlusion. An ANN with a network of unsupervised PUs (called clusterer) and offshoot supervised PUs (called interpreter) is an architecture for many applications.

34 Claims, 21 Drawing Sheets

(56) References Cited

OTHER PUBLICATIONS

Dileep George and Jeff Hawkins, Towards a Mathematical Theory of Cortical Micro-circuits, PLoS Computational Biology, Oct. 9, 2009, pp. 1-26, vol. 5, No. 10, Public Library of Science, San Francisco, U.S.A.

Richard Granger, Engines of the brain: The computational instruction set of human cognition, AI Magazine, 2006, pp. 15-32, vol. 27, Association for the Advancement of Artificial Intelligence, Palo Alto, CA, U.S.A.

K. A. C. Martin, Microcircuits in visual cortex, Current Opinion in Neurobiology, 2002, vol. 12, pp. 418-425, Elsevier Science Ltd., Amsterdam, The Netherlands.

* cited by examiner

General Neuronal Code $\breve{v}_t$,
General Code Deviation Accumulation Vector $C$,
and General Code Covariance Matrix $D$ $$\breve{v}_t := [\breve{v}_t{}'(1) \quad \breve{v}_t{}'(2) \quad \cdots \quad \breve{v}_t{}'(\Psi)]'$$

$$\langle \breve{v}_t \rangle := [\langle \breve{v}_t{}'(1) \rangle \quad \langle \breve{v}_t{}'(2) \rangle \quad \cdots \quad \langle \breve{v}_t{}'(\Psi) \rangle]'$$

For $\psi = 1, \ldots, \Psi$, $$C(\psi) = \frac{\Lambda}{2} \sum_{\tau=1}^{t} \lambda^{t-\tau} (\breve{v}_t(\psi) - \langle \breve{v}_t(\psi) \rangle)',$$

$$D(\psi) = \Lambda \sum_{\tau=1}^{t} \lambda^{t-\tau} (r_t - \langle r_t \rangle)(\breve{v}_t(\psi) - \langle \breve{v}_t(\psi) \rangle)' \text{ or}$$

(learned by the unsupervised covariance rule)

$$D(\psi) = \Lambda \sum_{\tau=1}^{t} \lambda^{t-\tau} \left( r_t - \frac{1}{2} I \right)(\breve{v}_t(\psi) - \langle \breve{v}_t(\psi) \rangle)'$$

(learned by the supervised covariance rule).

$$C = [C(1) \quad C(2) \quad \cdots \quad C(\Psi)]$$

$$D = [D(1) \quad D(2) \quad \cdots \quad D(\Psi)]$$

FIG. 18   42

ARTIFICIAL NEURAL NETWORKS BASED ON A LOW-ORDER MODEL OF BIOLOGICAL NEURAL NETWORKS

1 CROSS-REFERENCE TO RELATED APPLICATIONS

This application is related to the provisional patent application Ser. No. 61/475,819, filed Apr. 15, 2010 and the provisional patent application Ser. No. 61/434,109, filed Jan. 19, 2010 submitted by the present inventor.

2 BACKGROUND AND ADVANTAGES OF THE INVENTION

The invention herein disclosed comprises artificial neural networks (ANNs) and systems and methods based thereon for most of the applications of ANNs such as clustering, detecting or recognizing spatial, hierarchical and/or temporal patterns of objects or causes; understanding images or videos; recognizing speeches, handwriting and texts; and generating representations of probability distributions of labels of patterns of objects and causes, where data may contain erasure, smear, noise, occlusion, distortion, alteration, rotation, translation and/or scaling. The ANNs (artificial neural networks) are based on a low-order model of biological neural networks and have applications in a large number of fields such as computer vision, signal processing, financial engineering, telecommunication, data clustering, and data mining. Example applications are handwritten character/word classification, face recognition, fingerprint identification, DNA sequence identification, speech recognition, machine fault detection, baggage/container examination, video monitoring/understanding, image understanding, scene analysis, text/speech understanding, automatic target recognition, medical diagnosis, prosthesis control, robotic arm control, and vehicle navigation.

A good introduction to the prior art in ANNs (artificial neural networks) and their applications can be found in Simon Haykin, *Neural Networks and Learning Machines*, Third Edition, Pearson Education, New Jersey, 2009; Christopher M. Bishop, *Pattern Recognition and Machine Learning*, Springer Science, New York, 2006.

An ANN, which is a functional model of biological neural networks, was recently reported in James Ting-Ho Lo, Functional Model of Biological Neural Networks, *Cognitive Neurodynamics*, Vol. 4, Issue 4, pp. 295-313, November 2010, where the ANN is called the temporal hierarchical probabilistic associative memory (THPAM), and in James Ting-Ho Lo, A Cortex-Like Learning Machine for Temporal and Hierarchical Pattern Recognition, U.S. patent application Ser. No. 12/471,341, filed May 22, 2009; Publication No. US-2009-0290800-A1, Publication Date Nov. 26, 2009, where the ANN is called the probabilistic associative memory (PAM). The ANN is hereinafter referred to as the THPAM. The goal to achieve in the construction of the THPAM was to develop an ANN that performs Hebbian-type unsupervised and supervised learning without differentiation, optimization or iteration; retrieves easily; and recognizes corrupted, distorted and occluded temporal and spatial information. In the process to achieve the goal, mathematical necessity took precedence over biological plausibility. This mathematical approach focused first on minimum mathematical structures and operations that are required for an effective learning machine with the mentioned properties.

The THPAM turned out to be a functional model of biological neural networks with many unique features that well-known models such as the recurrent multilayer perceptron, associative memories, spiking neural networks, and cortical circuit models do not have. However, the THPAM has been found to have shortcomings. Among them the most serious one is the inability of its unsupervised correlation rule to prevent clusters from overgrowing under certain circumstances. These shortcomings motivated further research to improve the THPAM. At the same time, the unique features of the THPAM indicated that it might contain clues for understanding the structures and operations of biological neural networks. To achieve this understanding and eliminate the mentioned shortcomings, the components of the THPAM were examined from the biological point of view with the purpose of constructing a biologically plausible model of biological neural networks. More specifically, the components of the THPAM were identified with those of biological neural networks and reconstructed, if necessary, into biologically plausible models of the same.

This effort resulted in a low-order model (LOM) of biological neural networks and an improved functional model called the Clustering Interpreting Probabilistic Associative Memory (CIPAM). They were respectively reported in the articles, James Ting-Ho Lo, A Low-Order Model of Biological Neural Networks, *Neural Computation*, Vol. 23, No. 10, pp. 2626-2682, October 2011; and James Ting-Ho Lo, A Cortex-Like Learning Machine for Temporal Hierarchical Pattern Clustering, Detection, and Recognition, *Neurocomputing*, Vol. 78, pp. 89-103, 2012, which are both incorporated into the present invention disclosure by reference. Note that "dendritic and axonal encoders", "dendritic and axonal trees" and "dendritic and axonal expansions" in them are collectively called "neuronal encoders", "neuronal trees" and "neuronal codes" respectively in the present invention disclosure and that "C-neuron", "D-neuron" and "expansion covariance matrix" are called "nonspiking neuron", "spiking neuron" and "code covariance matrices" respectively in the present invention disclosure.

It was subsequently discovered that the LOM and the CIPAM are equivalent in the sense that their corresponding components can mathematically be transformed into each other. In fact, generalizing the mathematical transformation that transforms the LOM and the CIPAM into each other, we can transform the LOM and the CIPAM into infinitely many equivalent models.

The LOM, the CIPAM and their equivalent models are each a network of models of the biological neuronal node or encoder (which is a biological dendritic or axonal node or encoder), synapse, spiking/nonspiking neuron, means for learning, feedback connection, maximal generalization scheme, feedback connection, etc. For simplicity, these component models are sometimes referred to without the word "model". For example, the model neuronal node, model neuronal encoder, model neuronal tree, model synapse, model spiking/nonspiking neuron, etc. will be referred to as the neuronal node/encoder/tree, synapse, spiking/nonspiking neuron, etc. respectively. The LOM, the CIPAM and all their equivalent models can be used as artificial neural networks (ANNs). To emphasize that their components are artificial components in these artificial neural networks, they are referred to as the artificial neuronal node/encoder/tree, artificial synapse, artificial spiking/nonspiking neuron, etc. respectively.

If there is possibility of confusion, the real components in the brain are referred to with the adjective "biological", for example, the biological neuronal node, biological neuronal encoder, biological neuronal tree, biological spiking/nonspiking neuron, and biological synapse, etc. The components of equivalent models (or equivalent ANNs) that can be obtained from transforming a component model of the LOM are given the same name of the said component of the LOM. In other words, all the model components (of the equivalent ANNs) that are equivalent to one another are given the same component name.

All models that are equivalent to the LOM including the LOM and the CIPAM use the "unsupervised covariance rule" instead of the "unsupervised correlation rule" used in the THPAM and can prevent the clusters of patterns or causes formed in synapses from overgrowing. Moreover, all models that are equivalent to the LOM including the LOM and the CIPAM use the "supervised covariance rule" instead of the "supervised correlation rule" used in the THPAM. These are two of the main improvements in the LOM, the CIPAM and other equivalent models over the THAPM.

From the application viewpoint, as an ANN, the LOM (or a mathematical equivalent thereof) has the following advantages:

1. No label of the learning data from outside the ANN is needed for the UPUs (unsupervised processing units) in the LOM to learn.
2. The unsupervised learning by a processing unit clusters data without involving selecting a fixed number of prototypes, cycling through the data, using prototypes as cluster labels, or minimizing a non-convex criterion.
3. Both the unsupervised and supervised covariance rules are of the Hebbian type, involving no differentiation, backpropagation, optimization, iteration, or cycling through the data. They learn virtually with "photographic memories", and are suited for online adaptive learning. Large numbers of large temporal and spatial data such as photographs, radiographs, videos, speech/language, text/knowledge, etc. are learned easily. The "decision boundaries" are not determined by exemplary patterns from each and every pattern and "confuser" class, but by those from pattern classes. In many applications such as target and face recognition, there are a great many pattern and "confuser" classes and usually no or not enough exemplary patterns for some "confuser classes".
4. Only a small number of algorithmic steps are needed for retrieving or estimating labels. Detection and recognition of multiple/hierarchical temporal/spatial causes are easily performed. Massive parallelization at the bit level by VLSI implementation is suitable.
5. empirical probability distributions and membership functions of labels are easily obtained by supervised processing units (SPUs) and unsupervised processing units (UPUs).
6. The ANN generalizes not by only a single holistic similarity criterion for the entire input exogenous feature vector, which noise; erasure; distortion and occlusion can easily defeat, but by a large number of similarity criteria for feature subvectors input to a large number of UPUs (processing units) in different layers. These criteria contribute individually and collectively to generalization for single and multiple causes. Example 1: smiling; putting on a hat; growing or shaving beard; or wearing a wig can upset a single similarity criterion used for recognizing a face in a mug-shot photograph. However, a face can be recognized by each of a large number of feature subvectors of the face. If one of them is recognized to belong to a certain face, the face is recognized. Example 2: a typical kitchen contains a refrigerator, a counter top, sinks, faucets, stoves, fruit and vegetable on a table, etc. The kitchen is still a kitchen if a couple of items, say the stoves and the table with fruit and vegetable, are removed.
7. Masking matrices in a PU (processing unit) eliminate effects of corrupted, distorted and occluded components of the feature subvector input to the PU, and thereby enable maximal generalization capability of the PU, and in turn that of the ANN.
8. The ANN is no more a blackbox with "fully connected" layers much criticized by opponents of such neural networks as multilayer perceptrons (MLPs) or recurrent MLPs. In a PU of the ANN, synaptic weights are covariances between neuronal codes and labels of the vector input to the PU. Each PU has a receptive field in the exogenous feature vector input to the ANN and recognizes the pattern(s) or cause(s) appearing within the receptive field. Such properties can be used to help select the architecture (i.e., layers, PUs, connections, feedback structures, etc.) of the ANN for the application.
9. The ANN (or a mathematical equivalent thereof) may have some capability of recognizing rotated, translated and scaled patterns. Moreover, easy learning and retrieving by an ANN allow it to learn translated, rotated and scaled versions of an input image with ease.
10. The hierarchical architecture of the clusterer stores models of the hierarchical temporal and spatial worlds (e.g., letters, words and sentences).
11. Ambiguity and uncertainty are represented and resolved with empirical probabilities and membership degrees in the sense of fuzzy logic.
12. Noises and interferences in inputs self-destruct like random walks with residues eliminated gradually by forgetting factors in the synapses, leaving essential informations that have been learned by repetitions and emphases.
13. The architecture of the ANN can be adjusted without discarding learned knowledge in the ANN. This allows enlargement of the feature subvectors, increase of the number of layers, and even increase of feedback connections.

For simplicity and clarity of the present invention disclosure, we will mainly describe the LOM in the present invention disclosure and will also show how the LOM is transformed into the CIPAM and other ANNs that are mathematically equivalent to it by the use of affine functions and their inverses.

3 SUMMARY

In this Section, we first describe briefly the LOM (Low-Order Model of biological neural networks) and its equivalents including the CIPAM (Clustering Interpreting Probabilistic Associative Memory). All these equivalents and the LOM can be transformed into one another by affine functions and their inverses. The components of the LOM and their corresponding components of those equivalents are models of the corresponding components of biological neural networks. Each model component of the LOM and its corresponding model components of those equivalents can be transformed into one another by affine functions and their inverses and are therefore given the same name. Such components include the model neuronal node, model neuronal encoder, model neuronal tree, model synapse, model spiking neuron, model non-spiking neuron, etc.

The LOM and its equivalents form a new paradigm of artificial neural networks and can be used for the wide range of data processing applications that artificial neural networks are intended for. Said applications include clustering data, detecting objects or patterns, recognizing or classifying patterns or objects. In applications, the LOM and its equivalents are artificial neural networks, and their model components, which are mentioned above, are the artificial neuronal (axonal or dendritic) node, artificial neuronal (axonal or dendritic) encoder, artificial neuronal (axonal or dendritic) tree, artificial synapse, artificial spiking neuron, artificial nonspiking neuron, etc. In the present invention disclosure, the words, "model" and "artificial" in front of a component are used interchangeably, depending on whether the emphasis is placed on modeling of a biological component or on application of the model.

For simplicity, the LOM is described in the present invention disclosure with the understanding that the description is valid for the equivalents of the LOM after transformation by proper affine functions and their inverses. Notice also that in this invention disclosure, although a dendrite or axon is a part of a neuron, and a dendro-dendritic synapse is a part of a dendrite (thus a part of a neuron), they are treated, for simplicity, as if they were separate entities, and the word "neuron" refers essentially to the soma of a neuron in this specification. Similarly, artificial dendrites, artificial axons, and artificial synapses are treated, for simplicity, as if they were separate from artificial nonspiking/spiking neurons, and the term "artificial nonspiking/spiking neuron" refers essentially to the model of a soma of a neuron in the present invention disclosure.

In this Summary, references to subsection and subsubsection numbers in the Section entitled "DESCRIPTION OF PREFERRED EMBODIMENTS" are made. It is stressed that the LOM is described in the present invention disclosure with the understanding that the description is valid for the equivalents of the LOM.

Object 1 of the present invention is to provide an artificial neural network, a learning machine, and a method for identifying or approximating a known or unknown function or dynamical system.

Object 2 of the present invention is to provide an artificial neural network, a learning machine, and a method for nonparametric nonlinear classification for spatial or temporal data.

Object 3 of the present invention is to provide an artificial neural network, a learning machine, and a method for nonparametric nonlinear classification for spatially or temporally hierarchical data.

Object 4 of the present invention is to provide an artificial neural network, a learning machine, and a method for recognizing spatial or temporal patterns.

Object 5 of the present invention is to provide an artificial neural network, a learning machine, and a method for recognizing spatially or temporally hierarchical patterns.

Object 6 of the present invention is to provide an artificial neural network, a learning machine, and a method for understanding images or videos.

Object 7 of the present invention is to provide an artificial neural network, a learning machine, and a method for Objects 1-6 where said artificial neural network, learning machine, and said method are trained on data with erasure, smear, noise, occlusion, distortion, and/or alteration.

Object 8 of the present invention is to provide an artificial neural network, a learning machine, and a method for generating representations of probability distributions of labels of the vector or its subvectors input to the artificial neural network, learning machine, or the method.

Object 9 of the present invention is to provide an artificial neural network, a learning machine, and a method for data fusion, data mining, decision making, predicting a financial time series, or searching the internet.

Object 10 of the present invention is to provide an artificial neural network, a learning machine, and a method for unsupervised learning of data or clustering of data.

Object 11 of the present invention is to provide an artificial neural network, a learning machine, and a method for supervised learning of data.

Object 12 of the present invention is to provide an artificial neural network, a learning machine, and a method to perform both supervised and unsupervised learning of data.

Object 13 of the present invention is to provide an artificial neural network and a learning machine whose architecture can be adjusted without discarding learned knowledge.

Object 14 of the present invention is to provide a method wherein the dimensionalities of unsupervised or supervised covariance matrices can be adjusted without discarding learned knowledge.

Object 15 of the present invention is to provide an artificial neural network and a learning machine with a hierarchical architecture for recognizing hierarchical patterns at different levels.

Object 16 of the present invention is to provide an artificial neural network and a learning machine with feedback connections for processing sequences of vectors such as those obtained from examining single images at consecutive time points, multiple images of an object taken from different angles, consecutive frames in a video or movie, and handwritten or printed letters in a word, words in a sentence, and sentences in a paragraph.

Object 17 of the present invention is to provide a method that employs feedback structures for processing sequences of vectors such as those obtained from examining single images at consecutive time points, multiple images of an object taken from different angles, consecutive frames in a video or movie, and handwritten or printed letters in a word, words in a sentence, and sentences in a paragraph.

Object 18 of the present invention is to provide an artificial neural network, a learning machine, and a method for recognizing rotated, translated and/or scaled patterns.

The foregoing objects, as well as other objects of the present invention that will become apparent from the discussion below, are achieved by the present invention.

As an artificial neural network (ANN), the LOM (or any of its equivalents) described in the Section on Description of Preferred Embodiments is a discrete-time multilayer network of processing units (PUs) with or without feedback connections. A PU includes some or all of the following components;

1. at least one artificial neuronal encoder for encoding a vector into a neuronal code;
2. a means for evaluating a code deviation vector, which is the deviation of a neuronal code obtained by said artificial neuronal encoder from a neuronal code average;
3. a plurality of artificial synapses each for storing a component of a code deviation accumulation vector;
4. a first means for evaluating a first product of a component of a code deviation accumulation vector, a masking factor, and a component of a code deviation vector;
5. an artificial nonspiking neuron for evaluating a first sum of first products obtained by said first means;
6. a plurality of artificial synapses each for storing an entry of a code covariance matrix;
7. a second means for evaluating a second product of an entry of a code covariance matrix, a masking factor, and a component of a code deviation vector; and
8. at least one artificial spiking neuron for evaluating a second sum of second products obtained by said second means, for using said second sum and a first sum obtained by said nonspiking neuron processor to evaluate a representation of a first empirical probability distribution of a component of a label of a vector that is input to said processing unit, and for generating a pseudorandom number in accordance with said first empirical probability distribution, wherein the number R of artificial spiking neurons is the number of binary digits in the label of the vector input to the PU, the R pseudorandom numbers generated by said artificial spiking neurons are binary digits (i.e., 0 and 1) and form a point estimate of the label of the vector input to said PU. Over time, the point estimates generated by a PU form R spike trains output from the PU. The effect of the masking factors, which are nonnegative integers, can also be achieved either by having numerous artificial neuronal encoders with input vectors of different dimensionalities (i.e., input vectors with different numbers of components) or by including multiple copies of said first products and multiple copies of said second products in the first and second sum respectively.

A vector input to a PU first goes through artificial neuronal encoders (Subsection 5.1), which are networks of artificial neuronal nodes and form the upper part of the artificial neuronal trees. Artificial neuronal nodes in the LOM are each a hyperbolic polynomial with two variables, which acts approximately like an XOR (exclusive-OR) logic gate with an accuracy depending on how close the two inputs to the node are to binary digits (Subsubsection 5.1.1). By forming function compositions of such hyperbolic polynomials, which are commutative and associative binary operations, an artificial neuronal node may have more than two input variables.

An artificial neuronal encoder, which is a network of neuronal nodes or function compositions of many hyperbolic polynomials, can be looked upon as a function that encodes its input vector into a neuronal code with an orthogonal property (Subsubsection 5.1.3). After neuronal codes are produced by artificial neuronal encoders, code deviation vectors that are each a deviation of a neuronal code from a neuronal code average over a time window are then computed.

The weight (or strength) of an artificial synapse is either an entry of a code covariance matrix or a component of a code deviation accumulation vector. A component of a code deviation accumulation vector, a masking factor, and a component of a code deviation vector are multiplied to yield a first product. An entry of a code covariance matrix, a masking factor, and a component of a code deviation vector are multiplied to yield a second product. The masking factor is a diagonal entry of a masking matrix corresponding to the artificial synapse.

An artificial nonspiking neuron in the PU evaluates a first sum of products each of a first product (Subsubsection 5.5.4). An artificial spiking neuron evaluates a second sum of second products, uses said second sum and a first sum obtained by the artificial nonspiking neuron to evaluate a representation of an empirical probability distribution of a component of a label of a vector that is input to said processing unit, and generates a pseudorandom number in accordance with said empirical probability distribution (Subsubsection 5.5.5). The R pseudorandom numbers generated by the R artificial spiking neurons in the PU are binary digits (i.e., 0 and 1) and form a point estimate of the label of the vector input to said PU, such labels and their point estimates being R-dimensional binary vectors. Over time, the point estimates generated by a PU form R spike trains output from the PU.

There are three learning rules: the unsupervised covariance rule, supervised covariance rule and unsupervised accumulation rule. The unsupervised covariance rule is used to adjust weights of synapses with post-synaptic artificial spiking neurons whose outputs are teaching signals (i.e., desired or target outputs from the post-synaptic artificial spiking neurons) (Subsubsection 5.2.1). The supervised covariance rule is used to adjust weights of synapses using teaching signals (i.e., desired or target outputs from the post-synaptic artificial spiking neurons) or a given label from outside the PU (Subsubsection 5.2.2). The unsupervised accumulation rule is used to adjust weights of synapses with a post-synaptic artificial nonspiking neuron by accumulating deviations of the neuronal codes from their averages over time (Subsubsection 5.2.3).

A forgetting factor $\lambda$ and a normalizing constant A are used to keep the entries in code covariance matrices and code deviation accumulation vectors bounded. A PU usually learns by the unsupervised accumulation rule and one of the other two learning rules. In some applications, a processing unit can perform both supervised and unsupervised covariance learning, depending on whether a teaching signal from outside the LOM is available or not.

By the unsupervised covariance rule, the output vector from the R artificial spiking neurons (i.e., model spiking neurons) in the PU is assigned as the label (or teaching signals) to be learned jointly with the vector input to the PU. If the input vector or a variation thereof has not been learned before, the output vector from the R artificial spiking neurons is a purely random label. If the input vector or a variation of it has been learned before, the output vector, which is a point estimate of the label or labels of the input vector based on the empirical probability distribution, is learned jointly with the input vector. Supervised covariance learning is performed when teaching signals (i.e., labels of input vectors to the PU) from outside the PU are provided (Subsection 5.2.2). In the third type of learning, namely unsupervised accumulation learning, no label is needed.

Maximal generalization capability of the PU is achieved mainly with masking matrices each automatically finding the largest subvector of the code deviation vector that matches a subvector of a code deviation vector that has been learned and stored in the code covariance matrix (or the code deviation accumulation vector) and setting the rest of the components of the former code deviation vector equal to zero. A masking matrix can be viewed as idealization and organization of neuronal encoders with overlapped and nested input vectors (Section 5.4).

A PU is sometimes required to learn to distinguish learned input vectors with small differences, but to recognize unlearned input vectors with larger differences with learned input vectors. In this case, masking matrices for retrieving and masking matrices for unsupervised learning should be different. To distinguish these two types of masking matrix, the former and the latter are respectively called the masking matrices and the learning masking matrices, and similarly, their entries are respectively called masking factors and learning masking factors.

To use learning masking factors or matrices for unsupervised learning, a processing unit should further include:

1. a third means for evaluating a third product of a component of a code deviation accumulation vector, a learning masking factor, and a component of a code deviation vector;
2. a summing means for evaluating a third sum of third products obtained by said third means;
3. a fourth means for evaluating a fourth product of an entry of a code covariance matrix, a learning masking factor, and a component of a code deviation vector;
4. a summing-evaluating means for evaluating a fourth sum of fourth products obtained by said fourth means and for using said fourth sum and a third sum obtained by said summing means to evaluate a representation of a second empirical probability distribution of a component of a label of a vector that is input to said processing unit; and 5. an unsupervised learning means for using at least one pseudorandom number generated in accordance with said second empirical probability distribution and at least one component of a code deviation vector to adjust at least one entry of a code covariance matrix by an unsupervised covariance rule in response to a vector that is input to said processing unit.

A PU that has completed learning or continues to learn by the unsupervised covariance rule is called an unsupervised processing unit (UPU). A PU that has completed learning or continues to learn by the supervised covariance rule is called a supervised processing unit (SPU). The LOM may have UPU in the lower layers and have SPUs in the higher layers. Alternatively, the LOM may have a network of UPUs only and have SPUs that branch out from the UPUs in said network. As unsupervised learning requires no label from outside the PU, it can be performed anytime on data without a given or handcrafted label. What the network of UPUs actually does is clustering of spatial and temporal patterns in the data. When supervised learning occurs, a cluster is assigned with the same label given or handcrafted. Therefore, the network of UPUs is called a clusterer, and the set of SPUs branching out from the clusterer is called an interpreter.

In the following, embodiments of the present invention disclosed herein are described. The mathematical symbols are used for explanation only, and are not intended to restrict the embodiments.

Embodiment 1 of the present invention disclosed herein is an artificial neural network that comprises at least one processing unit, a first processing unit including (a) at least one artificial neuronal encoder for encoding a vector $v_t(\psi)$ that is input to said encoder into a neuronal code $\check{v}_t(\psi)$ that is output from the encoder; (b) a means for evaluating a code deviation vector $\check{v}_{\tau j}(\psi) - \langle\check{v}_{\tau j}(\psi)\rangle$, which is the deviation of a neuronal code $\check{v}_{\tau j}(\psi)$ obtained by said artificial neuronal encoder from a neuronal code average $\langle\check{v}_{\tau j}(\psi)\rangle$; (c) a plurality of artificial synapses each for storing an entry $C_j(\psi)$ of a code deviation accumulation vector $$C(\psi) = \frac{\Lambda}{2}\sum_{s=1}^{t}\lambda^{t-s}(\tilde{v}_s(\psi) - \langle\tilde{v}_s(\psi)\rangle)',$$

(d) a first means for evaluating a first product $c_{\tau j}(\psi) = C_j(\psi) M_{jj}(\check{v}_{\tau j}(\psi) - \langle\check{v}_{\tau j}(\psi)\rangle)$ of said entry $C_j(\psi)$, a masking factor $M_{jj}(\psi)$ and a component $\check{v}_{\tau j}(\psi) - \langle\check{v}_{\tau j}(\psi)\rangle$ of a code deviation vector $\check{v}_\tau(\psi) - \langle\check{v}_\tau(\psi)\rangle$ that is the deviation of a neuronal code $\check{v}_\tau(\psi)$ from a neuronal code average $\langle\check{v}_\tau(\psi)\rangle$; (e) an artificial nonspiking neuron processor for evaluating a first sum $c_\tau = \sum_{\psi=1}^{\Psi}\sum_{j=1}^{dim\, v_t(\psi)} c_{\tau j}(\psi)$ of first products obtained by said first means; (f) a plurality of artificial synapses each for storing an entry $D_{kj}(\psi)$ of a code covariance matrix $D(\psi) = \Lambda\sum_{s=1}^{t}\lambda^{t-s}(r_s - 1/2)(\check{v}_s(\psi) - \langle\check{v}_s(\psi)\rangle)'$; (g) a second means for evaluating a second product $d_{\tau k} = D_{kj}(\psi)M_{jj}(\check{v}_{\tau j}(\psi) - \langle\check{v}_{\tau j}(\psi)\rangle)$ of said entry $D_{kj}(\psi)$, a masking factor $M_{jj}$, and a component $(\check{v}_{\tau j}(\psi) - \langle\check{v}_{\tau j}(\psi)\rangle)$ of a code deviation vector $\check{v}_\tau(\psi) - \langle\check{v}_\tau(\psi)\rangle$ that is a deviation of a neuronal code $\check{v}_\tau(\psi)$ from a neuronal code average $\langle\check{v}_{\tau j}(\psi)\rangle$; and (h) at least one artificial spiking neuron for evaluating a second sum $d_{\tau k} = \sum_{\psi=1}^{\Psi}\sum_{j=1}^{dim\, v_t(\psi)} d_{\tau kj}(\psi)$, k=1, . . . , R, of second products obtained by said second means and for using said second sum $d_{\tau k}$ and a first sum $c_\tau$ obtained by said nonspiking neuron to evaluate a representation of a first empirical probability distribution $p_{\tau i}$ of a component of a label of a vector $v_\tau$ that is input to said first processing unit. (See FIGS. 3-4, 10, 14-21.)

Embodiment 1 can be generalized such that a plurality of code covariance matrices are submatrices of a general code covariance matrix, a plurality of code deviation accumulation vectors are subvectors of a general code deviation accumulation vector, a plurality of masking factors are entries of a masking matrix, a plurality of masking matrices are submatrices of a general masking matrix, and a plurality of neuronal codes are subvectors of a general neuronal code.

Embodiment 2 is Embodiment 1, wherein a plurality of code covariance matrices $D(\psi)$, $\psi=1, \ldots, \Psi$, in the processing unit are submatrices of a general code covariance matrix $D=[D(1)\, D(2) \ldots D(\Psi)]$, a plurality of code deviation accumulation vectors $C(\psi)$, $\psi=1, \ldots, \Psi$, in the processing unit in the first embodiment are subvectors of a general code deviation accumulation vector $C=[C(1)\, C(2) \ldots C(\Psi)]$, a plurality of masking factors $M_{jj}(\psi)$ in the processing unit in the first embodiment are entries of a masking matrix $M(\psi)$, a plurality of masking matrices $M(\psi)$, $\psi=1, \ldots, \Psi$, in the processing unit in the first embodiment are submatrices of a general masking matrix $M=\text{diag}[M(1)\, M(2) \ldots M(\Psi)]$, a plurality of neuronal codes $\check{v}_t(\psi)$, $\psi=1, \ldots, \Psi$, in the processing unit in the first embodiment are subvectors of a general neuronal code $\check{v}_t=[\check{v}_t'(1)\, \check{v}_t'(2) \ldots \check{v}_t'(\Psi)]'$ and a plurality of neuronal code averages $\langle\check{v}_t(\psi)\rangle$, $\psi=1, \ldots, \Psi$, are subvectors of a general neuronal code average $\langle\check{v}_t\rangle = [\langle\check{v}_t'(1)\rangle\, \langle\check{v}_t'(2)\rangle \ldots \langle\check{v}_t'(\Psi)\rangle]'$. (See FIG. 18.)

Embodiment 3 is Embodiment 1, further comprising feedback connections with time delay means for processing temporal data such as videos or enhancing the performance in processing spatial data. (See FIGS. 25-27.)

Embodiment 4 is Embodiment 1, wherein said first processing unit further includes an unsupervised accumulation learning means for adjusting (or learning online or offline) at least one component of a code deviation accumulation vector without supervision by an unsupervised accumulation rule, $$C_j(\psi) \leftarrow \lambda C_j(\psi) + \frac{\Lambda}{2}(\tilde{v}_{tj}(\psi) - \langle\tilde{v}_{tj}(\psi)\rangle)',$$

in response to a vector $v_t$ that is input to said first processing unit. (See FIGS. 7b, 22.)

Embodiment 5 is Embodiment 1, wherein said first processing unit further includes a pseudorandom number generation means for generating at least one pseudorandom number $u_{\tau i} = v\{p_{\tau i}\}$ in accordance with a first empirical probability distribution obtained by said at least one artificial spiking neuron processor. (See FIG. 20.)

Embodiment 6 is Embodiment 5, wherein said first processing unit further includes an unsupervised learning means for using a pseudorandom number $u_{\tau i}$ generated by said pseudo-random number generation means and at least one entry $\check{v}_{\tau j}(\psi) - \langle\check{v}_{\tau j}(\psi)\rangle$ of a code deviation vector to adjust at least one entry $D_{ij}$ of a code covariance matrix by an unsupervised covariance rule, $D_{ij}(\psi) \leftarrow \lambda D_{ij}(\psi) + \Lambda(u_{\tau i} - \langle u_{\tau i}\rangle)(\check{v}_{\tau j}(\psi) - \langle\check{v}_{\tau j}(\psi)\rangle)'$, in response to a vector $v_\tau$ that is input to said first processing unit. (See FIGS. 5b, 22.)

Embodiment 7 is Embodiment 1, wherein said first PU (processing unit) uses learning masking factors $M_{jj}^{\#}$ (or matrices $M^{\#}(\psi)$) for unsupervised learning. How the learning masking factors are used are described earlier on in this Summary. (See FIG. 24.)

Embodiment 8 is Embodiment 1, wherein said first processing unit further includes a supervised learning means for using at least one entry $\check{v}_{\tau j}(\psi) - \langle\check{v}_{\tau j}(\psi)\rangle$ of a code deviation vector and at least one component $w_{\tau i}$ of a given label $w_\tau$ of a vector $v_\tau$ that is provided from outside said first processing unit to adjust at least one entry $D_{ij}(\psi)$ of a code covariance matrix $D(\psi)$ by a supervised covariance rule, $D_{ij}(\psi) \leftarrow \lambda D_{ij}(\psi) + \Lambda(w_{\tau i} - \langle w_{\tau i}\rangle)(\check{v}_{\tau j}(\psi) - \langle\check{v}_{\tau j}(\psi)\rangle)'$. A given label $w_\tau$ is a label provided from outside the first processing unit. It is usually handcrafted or manually determined. (See FIGS. 6b, 23.)

Embodiment 9 is Embodiment 1 whose architecture comprises a network of unsupervised processing units (UPUs) and set of supervised processing units (SPUs), wherein the code deviation accumulation vectors and the code covariance matrices in the UPUs have been learned by unsupervised learning, and those in the SPUs have been learned by supervised learning. The network of UPUs puts learned data in clusters and is therefore called a clusterer. Each UPU creates its own label of a vector input to it and thus has its own vocabulary. The SPUs are used to translate the labels in the UPUs' vocabularies into the vocabulary of the artificial neural network's user. Hence, the set of SPUs is called an interpreter. (See FIG. 27)

Embodiment 10 of the present invention is a learning machine comprising at least one processing unit, a first processing unit including (a) an encoding means for encoding a vector $v_\tau(\psi)$ that is input to said encoder into a neuronal code $\check{v}_\tau(\psi)$ that is output from the encoder; (b) a means for evaluating a code deviation vector $\check{v}_{\tau j}(\psi) - \langle\check{v}_{\tau j}(\psi)\rangle$ that is the deviation of a code $\check{v}_{\tau j}(\psi)$ obtained by said encoding means from a code average $\langle\check{v}_{\tau j}(\psi)\rangle$; (c) memory means for storing at least one first weighted sum $\alpha D_{kj}(\psi) + \beta C_j(\psi)$ of an entry $D_{kj}(\psi)$ of a code covariance matrix $D(\psi)$ and a component $C_j(\psi)$ of a code deviation accumulation vector $C(\psi)$, where $\alpha$ and $\beta$ are real-valued weights; (d) a memory means for storing at least one masking factor $M_{ij}$; (e) a multiplying means for evaluating a product of a second weighted sum of an entry of a code covariance matrix and a component of a code deviation accumulation vector, a masking factor, and a code deviation vector; (f) a summing means for evaluating a sum of products obtained by said multiplying means; (g) an evaluation means for using at least a sum obtained by said summing means to evaluate a representation of an empirical probability distribution $p_\tau$ of a label $r_\tau$ of a vector $v_\tau$ input to said first processing unit.

The real-valued weights $\alpha$ and $\beta$ in the second main embodiment can be any real numbers. Embodiment 11 is Embodiment 10, wherein the first weighted sum $\alpha D_{kj}(\psi) + \beta C_j(\psi)$ has $\alpha=0$ and $\beta=1$ and is a component $C_j(\psi)$ of the code deviation accumulation vector $C(\psi)$. Embodiment 12 is Embodiment 10, wherein the first weighted sum $\alpha D_{kj}(\psi) + \beta C_j(\psi)$ has $\alpha=1$ and $\beta=0$ and is an entry $D_{kj}(\psi)$ of a code covariance matrix $D(\psi)$. Embodiment 13 is Embodiment 10, wherein the first weighted sum $\alpha D_{kj}(\psi) + \beta C_j(\psi)$ has $\alpha=1$ and $\beta=1$ and is a sum $D_{kj}(\psi) + C_j(\psi)$.

Embodiment 14 is Embodiment 10, wherein said first processing unit further includes a memory means for storing at least one learning masking factor $M_{ij}^\#(\psi)$ (or matrices $M^\#(\psi)$); and a second evaluation means for using at least a weighted sum of an entry of a code covariance matrix and a component of a code deviation accumulation vector; a learning masking factor; and a component of a code deviation vector to evaluate a representation of a second empirical probability distribution of a component of a label of a vector input to said first processing unit. The weighted sum $\alpha D_{kj}(\psi) + \beta C_j(\psi)$ learned with the second empirical probability distribution can enable Embodiment 14 to distinguish learned patterns with smaller differences and to recognize unlearned patterns by a better ability of generalization on learned patterns than with the first empirical probability distribution.

Embodiment 15 is Embodiment 10, wherein said first processing unit further includes a pseudorandom number generation means for generating at least one pseudorandom number $v_i\{p_\tau\}$ in accordance with a first empirical probability distribution $p_{\tau i}$ obtained by said evaluation means. The pseudorandom number generated is an estimate of a component of the label of a vector input $v_\tau$ to said first processing unit.

Embodiment 16 is Embodiment 15, wherein said first processing unit further includes an unsupervised learning means for using at least a pseudorandom number generated by said pseudorandom number generation means and an entry of a code deviation vector to adjust at least one first weighted sum $\alpha D_{kj}(\psi) + \beta C_j(\psi)$ of an entry of a code covariance matrix $D_{kj}(\psi)$ and a component $C_j(\psi)$ of a code deviation accumulation vector.

Embodiment 17 is Embodiment 16, wherein $\alpha=0$ and $\beta=1$ and the weighted sum $\alpha D_{kj}(\psi) + \beta C_j(\psi)$ is a component $C_j(\psi)$ of the code deviation accumulation vector $C(\psi)$. Embodiment 18 is Embodiment 10, wherein $\alpha=1$ and $\beta=0$ and the weighted sum $\alpha D_{kj}(\psi) + \beta C_j(\psi)$ is an entry $D_{kj}(\psi)$ of a code covariance matrix $D(\psi)$. Note that if $\alpha=1$ and $\beta=1$, then the weighted sum $\alpha D_{kj}(\psi) + \beta C_j(\psi)$ is a sum $D_{kj}(\psi) + C_j(\psi)$ of an entry of a code covariance matrix and a component of a code deviation accumulation vector.

Embodiment 19 is Embodiment 15, further comprising a feedback means for feedbacking at least one pseudorandom number generated by said pseudorandom number generation means to a processing unit after a time delay. Feedback means can enable Embodiment 10 to process temporal data and enhance the performance of the learning machine to process spatial data.

Embodiment 20 is Embodiment 10, wherein the PU further includes a supervised learning means for adjusting at least one entry of a code covariance matrix by a supervised covariance rule.

Embodiment 21 is Embodiment 10, wherein a plurality of processing units are unsupervised processing units, and at least one processing unit is a supervised processing unit. The plurality of processing units is called the clusterer, and the at least one processing unit is called the interpreter.

Embodiment 22 is a method comprising a step of encoding a subvector of a first vector into a code; a step of evaluating a component $\check{v}_{\tau j}(\psi) - \langle\check{v}_{\tau j}(\psi)\rangle$ of a code deviation vector $\check{v}_\tau(\psi) - \langle\check{v}_\tau(\psi)\rangle$ that is the deviation of a code from a code average; a step of evaluating a product of a weighted sum $\alpha D_{kj}(\psi) + \beta C_j(\psi)$ of an entry of a code covariance matrix $D_{kj}(\psi)$ and a component $C_j(\psi)$ of a code deviation accumulation vector, where $\alpha$ and/are real-valued weights, a masking factor, and a component of a code deviation vector; a step of evaluating a sum of products obtained by said step of evaluating a product; and a step of using at least a sum of products obtained by said step of evaluating a sum to evaluate a representation of an empirical probability distribution $p_\tau$ of a component $r_{\tau i}$ of a label $r_\tau$ of said first vector $v_\tau$.

Embodiment 23 is Embodiment 22, wherein a weighted sum $\alpha D_{kj}(\psi) + \beta C_j(\psi)$ has $\alpha=0$ and $\beta=1$ and is $C_j(\psi)$. Embodiment 24 is Embodiment 22, wherein a weighted sum $\alpha D_{kj}(\psi) + \beta C_j(\psi)$ has $\alpha=1$ and $\beta=0$ and is $D_{kj}(\psi)$. Embodiment 25 is Embodiment 22, wherein a weighted sum $\alpha D_{kj}(\psi) + \beta C_j(\psi)$ has $\alpha=1$ and $\beta=1$ and is $D_{kj}(\psi) + C_j(\psi)$.

Embodiment 26 is Embodiment 22, further comprising a step of using at least a component of a code deviation vector and a component $w_{\tau i}$ of a given label of said first vector to adjust at least one entry $D_{ij}(\psi)$ of a code covariance matrix by a supervised covariance rule $D_{ij}(\psi) \leftarrow \lambda D_{ij}(\psi) + \Lambda(w_{\tau i} - \langle w_{\tau i} \rangle)(\check{v}_{\tau j}(\psi) - \langle \check{v}_{\tau j}(\psi) \rangle)'$, said component of a given label being provided for said method to use. $w_{\tau i}$ is not produced by Embodiment 26. It is usually handcrafted or manually determined.

Embodiment 27 is Embodiment 22, further comprising a step of generating a pseudo-random number $v\{p_{\tau i}\}$ in accordance with an empirical probability distribution $p_{\tau i}$ of a component of a label of said first vector. The pseudorandom number is an estimate of a component of a label of said first vector.

Embodiment 28 is Embodiment 27, further comprising a step of comprising including a pseudorandom number generated in accordance with an empirical probability distribution as a component in said first vector after a time delay. The pseudorandom number is an estimate of a component of a label of said first vector. Said step is a step of providing a feedback of the pseudorandom number after a time delay. Feedbacks are helpful in enhancing performances in processing data.

Embodiment 29 is Embodiment 27, further comprising a step of adjusting a weighted sum $\alpha D_{kj}(\psi) + \beta C_j(\psi)$ of a component of a code deviation accumulation vector and an entry of a code covariance matrix.

Embodiment 30 is Embodiment 29, wherein said step of adjusting a weighted sum $\alpha D_{kj}(\psi) + \beta C_j(\psi)$ is a step of adjusting a component $C_j(\psi)$ of a code deviation accumulation vector.

Embodiment 31 is Embodiment 29, wherein said step of adjusting a weighted sum $\alpha D_{kj}(\psi) + \beta C_j(\psi)$ is adjusting an entry $D_{kj}(\psi)$ of a code covariance matrix $D(\psi)$ by an unsupervised covariance rule.

Embodiment 32 is Embodiment 29, further comprising a step of using at least a code deviation vector and a given label of said first vector to adjust a code covariance matrix by a supervised covariance rule, said given label being provided for said method to use. Embodiment 32 is a method comprising both unsupervised and supervised learning for both clustering and interpreting data.

Embodiment 33 is Embodiment 22, further comprising a step of evaluating a second product of a weighted sum of a component of a code deviation accumulation vector and an entry of a code covariance matrix, a learning masking factor, and a component of a code deviation vector; a step of evaluating a sum of second products obtained by said step of evaluating a second product; and a step of using at least a sum of second products obtained by said step of evaluating a sum of second products to evaluate a representation of a second empirical probability distribution of a component of a label of said first vector. The use of learning masking factors for learning and masking factors for retrieving allow distinguishing learned vectors with smaller differences and recognizing unlearned vectors with larger differences.

Embodiment 34 is Embodiment 22, further comprising a step of using at least a sum of second products obtained by said step of evaluating a sum of second products and a component of a given label of said first vector to adjust a code covariance matrix by a supervised covariance rule, said given label being provided for said method to use. Embodiment 34 is a method that includes both supervised learning and unsupervised learning for both clustering and interpreting data, where unsupervised learning is performed with learning masking factors.

4 DESCRIPTION OF DRAWINGS

In the present invention disclosure, the prime ' denotes matrix transposition, a vector is regarded as a subvector of the vector itself, a column or row vector is also a matrix, and $[a_{ij}]$ denotes a matrix whose (i, j)th entry is $a_{ij}$. If $a_{ij}$, i=1, ..., m, j=1, ..., n, then they are contained in the m×n matrix $[a_{ij}]$. Evaluating $a_{ij}$, i=1, ..., m, j=1, ..., n, is equivalent to evaluating the m×n matrix $[a_{ij}]$.

Preferred embodiments of the present invention will now be further described in the following paragraphs of the specification and may be better understood when read in conjunction with the attached drawings, in which:

FIG. 1 illustrates an artificial neuronal node 7, represented by a solid dot, in the LOM. The artificial neuronal node has two input variables, v and u, and one output $\phi(v, u) = -2vu + v + u$. If v and u are binary digits, $\phi(v, u)$ acts like the logic gate, XOR (exclusive-or).

FIG. 2 is a three-dimensional graph of the output $\phi(v, u)$ of an artificial neuronal node over the unit square $[0, 1]^2$. Note that the domain of the function $\phi(v, u)$ contains the unit square as a subset. The saddle shape of $\phi(v, u)$ shows that the artificial neuronal node is robust: If strengths of spikes change in travelling through dendrites/exons or if the spikes are corrupted by biological noises in the dendrites/exons, the outputs of the artificial neuronal node suffer from a graceful degradation. The hyperbolic polynomial $-2vu+v+u$ is an idealized approximation of the XOR logic gate and henceforth called the XOR polynomial.

FIG. 3 illustrates an artificial neuronal encoder with four inputs $v_{ti}$, i=1, ..., 4; and 16 outputs listed on the right side of the artificial neuronal encoder. It is an upper part of an artificial neuronal tree, performing neuronal encoding. The solid dots represent artificial neuronal nodes as shown in FIG. 1. Because of the commutativity and associativity of the XOR polynomial, there are many possible branching structures with the same inputs and outputs.

of $\check{v}_{tj}$ over a time window $[t-q_v+1, t]$ with the window width $q_v$; an unsupervised learning scheme that adjusts an entry $D_{ij}$ of the code covariance matrix D using the unsupervised covariance rule 14a; a unit-time delay 8; an artificial synapse denoted by ⓧ 18d that stores the entry $D_{ij}$ of the code covariance matrix D after a unit-time delay 8 and evaluates the product $D_{ij}(\check{v}_{tj} - \langle \check{v}_{tj} \rangle)$; and artificial spiking neuron i 10 that uses such products from artificial synapses and a graded signal $c_t$ from an artificial nonspiking neuron to generate an output $u_{ti}$. Note that the unsupervised learning rule 14a inputs the artificial code deviation $\check{v}_{tj} - \langle \check{v}_{tj} \rangle$ and the output $u_{ti}$ from the artificial spiking neuron i 10 as the ith component $r_{ti}$ of the label $r_t$ of $v_t$.

Figure 6A:
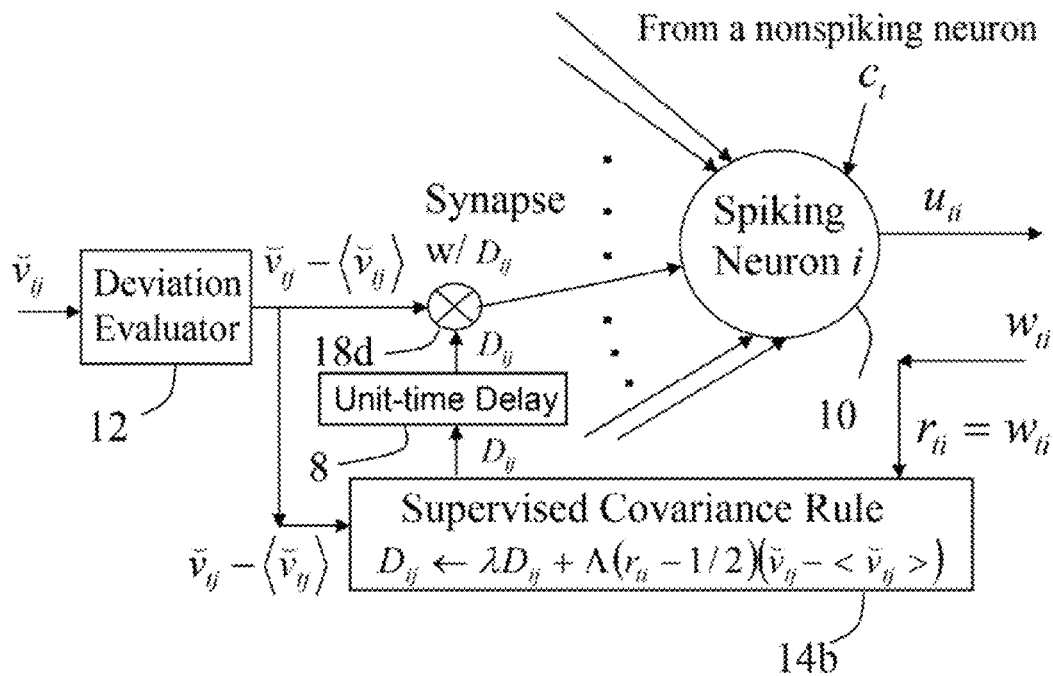

FIG. 6a illustrates a deviation evaluator 12 that evaluates the code deviation $\check{v}_{tj} - \langle \check{v}_{tj} \rangle$ of an artificial neuronal code $\check{v}_{tj}$ from its average $\langle \check{v}_{tj} \rangle$, where the average $\langle \check{v}_{tj} \rangle$ is $\frac{1}{q_v} \sum_{\tau=t-q_v+1}^{t} \check{v}_{tj}$ of $\check{v}_{tj}$ over a time window $[t-q_v+1, t]$ with the window width $q_v$; a supervised learning scheme that adjusts an entry $D_{ij}$ of the code covariance matrix D using the supervised covariance rule 14b; a unit-time delay 8; an artificial synapse ⓧ 18d that stores the entry $D_{ij}$ of the code covariance matrix D after a unit-time delay and evaluates the product $D_{ij}(\check{v}_{tj}-\langle\check{v}_{tj}\rangle)$; and artificial spiking neuron i 10 that uses such products from artificial synapses and a graded signal $c_t$ from an artificial nonspiking neuron to generate an output $u_{ti}$. Note that the supervised learning rule 14b inputs the code deviation $\check{v}_{tj}-\langle\check{v}_{tj}\rangle$ and the component $w_{ti}$ of a label $w_t$ of the measurements in the receptive field of model spiking neuron i, that $w_t$ is provided from outside the LOM (e.g., a handcrafted label $w_t$) as the ith component $r_{ti}$ of the label $r_t$ for the unsupervised covariance rule.

Figure 7A:
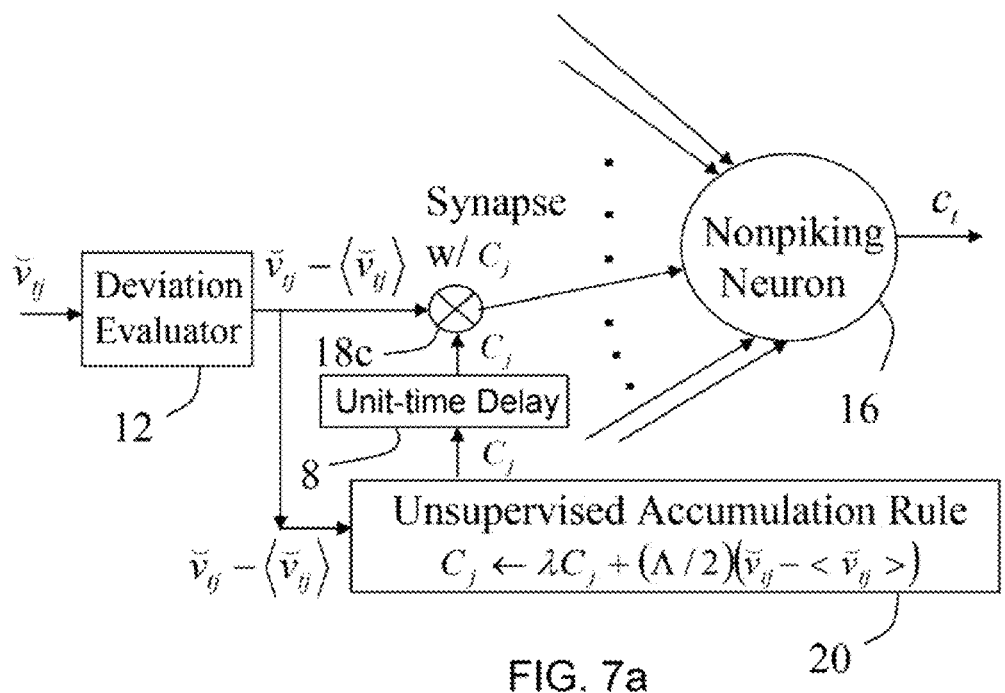

FIG. 7a illustrates a deviation evaluator 12 that evaluates the code deviation $\check{v}_{tj}-\langle\check{v}_{tj}\rangle$ of an artificial neuronal code $\check{v}_{tj}$ from its average $\langle\check{v}_{tj}\rangle$, where the average $\langle\check{v}_{tj}\rangle$ is $$\frac{1}{q_v} \sum_{\tau=t-q_v+1}^{t} \check{v}_{tj} \text{ of } \check{v}_{tj}$$

over a time window $[t-q_v+1, t]$ with the window length $q_v$; an unsupervised accumulation learning scheme 20 that adjusts an entry $C_j$ of the code deviation accumulation vector C using the unsupervised accumulation rule 20; a unit-time delay 8; an artificial synapse ⓧ 18c that stores the entry $C_j$ of the code deviation accumulation vector C after a unit-time delay and evaluates the product $C_j(\check{v}_{tj}-\langle\check{v}_{tj}\rangle)$; and artificial nonspiking neuron i 16 that sums such products from artificial synapses as an output $c_t$. Note that the unsupervised accumulation rule 20 inputs only the component $\check{v}_{tj}-\langle\check{v}_{tj}\rangle$ of the code deviation vector $\check{v}_t-\langle\check{v}_t\rangle$.

Figure 8:
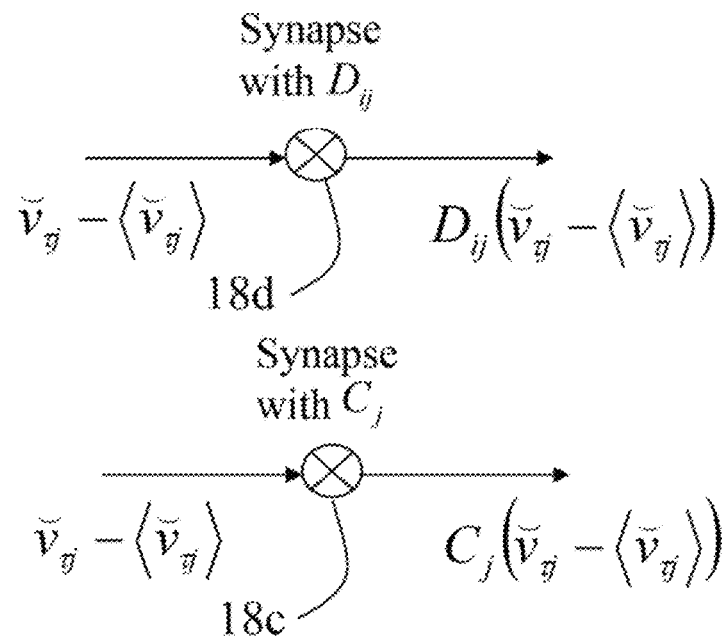

FIG. 8 shows an artificial synapse denoted by ⓧ 18d that stores an entry $D_{ij}$ of the code covariance matrix D and performs the multiplication of its input $\check{v}_{tj}-\langle\check{v}_{tj}\rangle$ and its weight $D_{ij}$. FIG. 8 also shows an artificial synapse denoted by ⓧ 18c that stores an entry $C_j$ of the code deviation accumulation vector C and performs the multiplication of its input $\check{v}_{tj}-\langle\check{v}_{tj}\rangle$ and its weight $C_j$.

Figure 9:
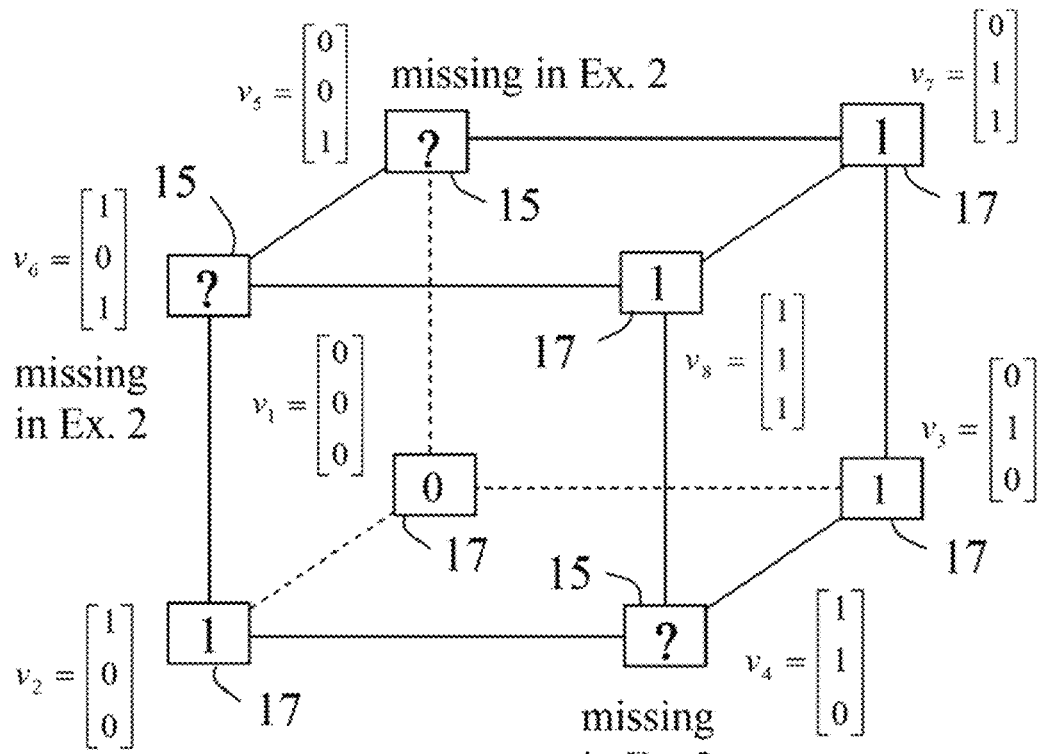

FIG. 9 shows the data for supervised learning in EXAMPLE 2a, unsupervised learning in EXAMPLE 2b, and unsupervised learning in EXAMPLE 2c at the vertices of a cube. The digits 17 in the squares at the vertices are labels for supervised learning. The question marks 15 indicate that the labels are unknown and unsupervised learning is necessary.

Figure 10:
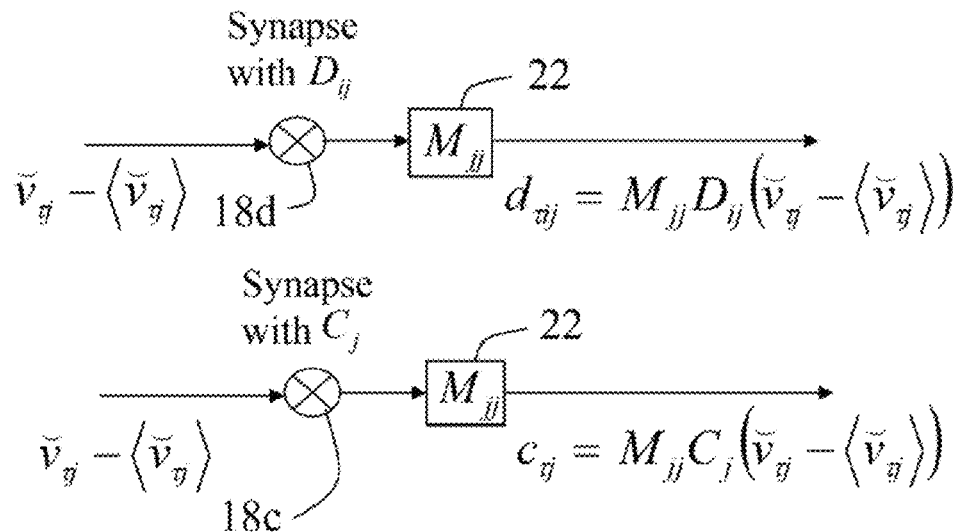

FIG. 10 shows an artificial synapse denoted by ⓧ 18d that stores an entry $D_{ij}$ of the code covariance matrix D and performs the multiplication of its input $\check{v}_{tj}-\langle\check{v}_{tj}\rangle$ and its weight $D_{ij}$. Denoting the jth diagonal entry of the masking matrix M by $M_{jj}$, the product $D_{ij}(\check{v}_{tj}-\langle\check{v}_{tj}\rangle)$ obtained by the artificial synapse is multiplied by the masking factor $M_{jj}$ 22, resulting in $d_{tij}=M_{jj}D_{ij}(\check{v}_{tj}-\langle\check{v}_{tj}\rangle)$, which is the (i, j)th entry of the matrix $[d_{tij}]$. FIG. 10 also shows an artificial synapse denoted by ⓧ 18c that stores an entry $C_j$ of the code deviation accumulation matrix C and performs the multiplication of its input $\check{v}_{tj}-\langle\check{v}_{tj}\rangle$ and its weight $C_j$. The product $C_j(\check{v}_{tj}-\langle\check{v}_{tj}\rangle)$ obtained by the artificial synapse denoted by ⓧ 18c is multiplied by the masking factor $M_{jj}$ 22, resulting in $c_{\tau j}=M_{jj}C_j(\check{v}_{tj}-\langle\check{v}_{tj}\rangle)$, which is the jth entry of the row vector $[c_{\tau j}]$.

Figure 11:
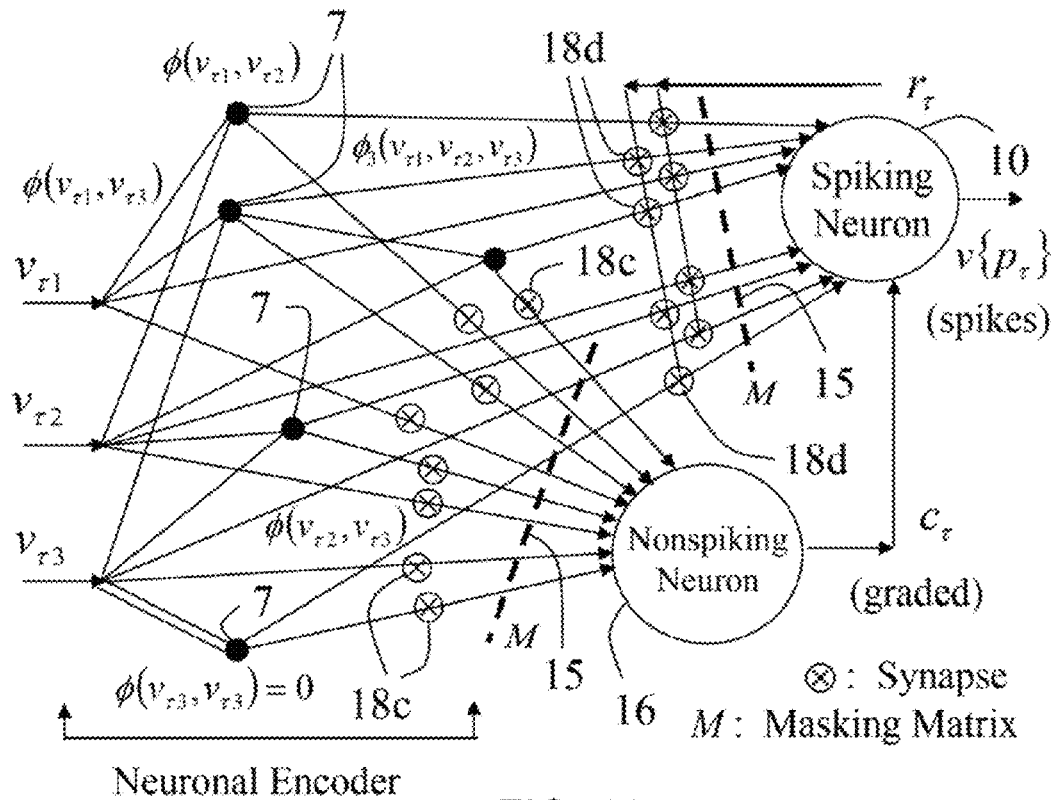

FIG. 11 illustrates an artificial neuronal encoder, wherein artificial neuronal nodes 7 are represented by large dots; an artificial nonspiking neuron 16, an artificial spiking neuron 10, the artificial synapses denoted by ⓧ 18c, 18d, and the masking matrix M denoted by the dashed line 15, that are used in EXAMPLES 2a, 2b and 2c. The dashed line 15 represents a masking factor following an artificial synapse on each feedforward connection. In unsupervised accumulation learning, the weights in artificial synapses 18c are adjusted by the unsupervised accumulation rule 20 as shown in FIG. 7b. For unsupervised covariance learning, the teaching signal $r_\tau$ is the output vector $u_\tau=v\{p_\tau\}$ of the spiking neuron, and the unsupervised covariance rule (14a in FIG. 5b) is used to adjust the weights in artificial synapses denoted by 18d. For supervised covariance learning, the teaching signal $r_\tau$ is a label $w_\tau$ of input vector $v_\tau$, that is provided from outside the LOM, and the supervised covariance rule (14b in FIG. 6b) is used to adjust the weights in artificial synapses denoted by ⓧ 18d.

Figure 12:
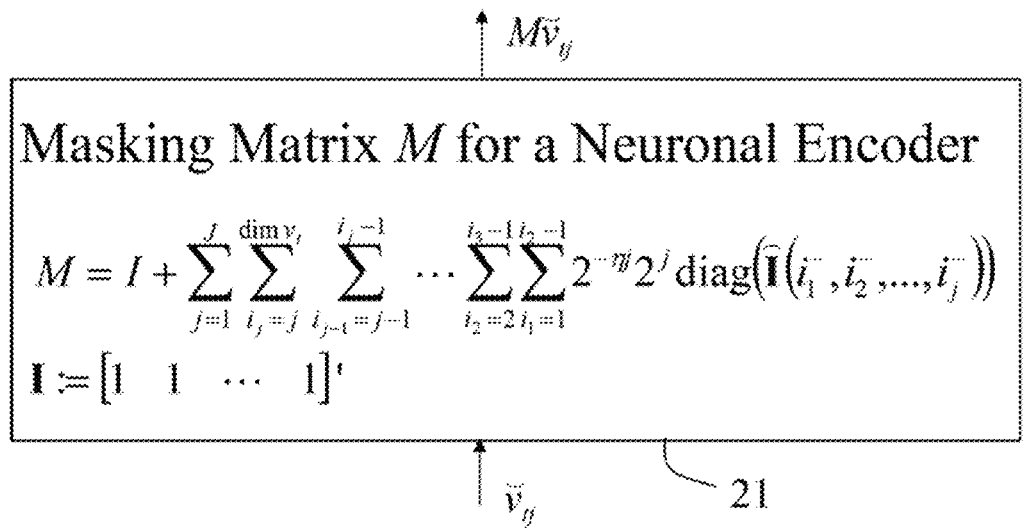

FIG. 12 illustrates the masking matrix M 21 for an artificial neuronal encoder that encodes an m-dimensional vector $v_t$ into its $2^m$-dimensional neuronal code $\check{v}_t$. M is a $2^m \times 2^m$ diagonal matrix diag($M_{11} \ldots M_{2^m 2^m}$), whose diagonal entries are called masking factors. $M\check{v}_t$ eliminates (or reduces) the effect of the corrupted, distorted or occluded components of $v_t$ to enable generalization on other components. The greater J is, the effect of more components of $v_t$ can be eliminated (or reduced). The factor $2^{-nj}$ is used to de-emphasize the effect of subvectors of $v_t$ in accordance with the number j of components of $v_t$ included in $(i_1^-, i_2^-, \ldots, i_j^-)$. The constant J is preselected with consideration of dim $v_t$ and the application.

Figure 5A:
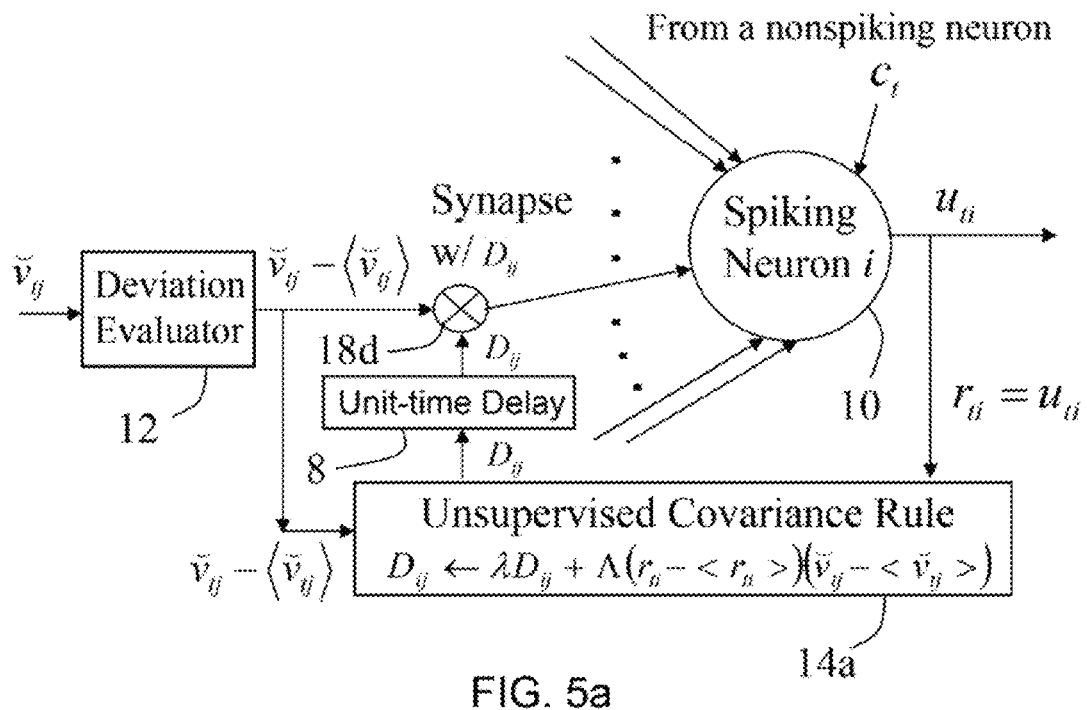
FIG. 5a illustrates a deviation evaluator 12 that evaluates the code deviation $\check{v}_{tj} - \langle \check{v}_{tj} \rangle$ of an artificial neuronal code $\check{v}_{tj}$ from it average $\langle \check{v}_{tj} \rangle$, where the average $$\langle \check{v}_{tj} \rangle \text{ is } \frac{1}{q_v} \sum_{\tau=t-q_v+1}^{t} \check{v}_{\tau j}$$
Figure 5B:
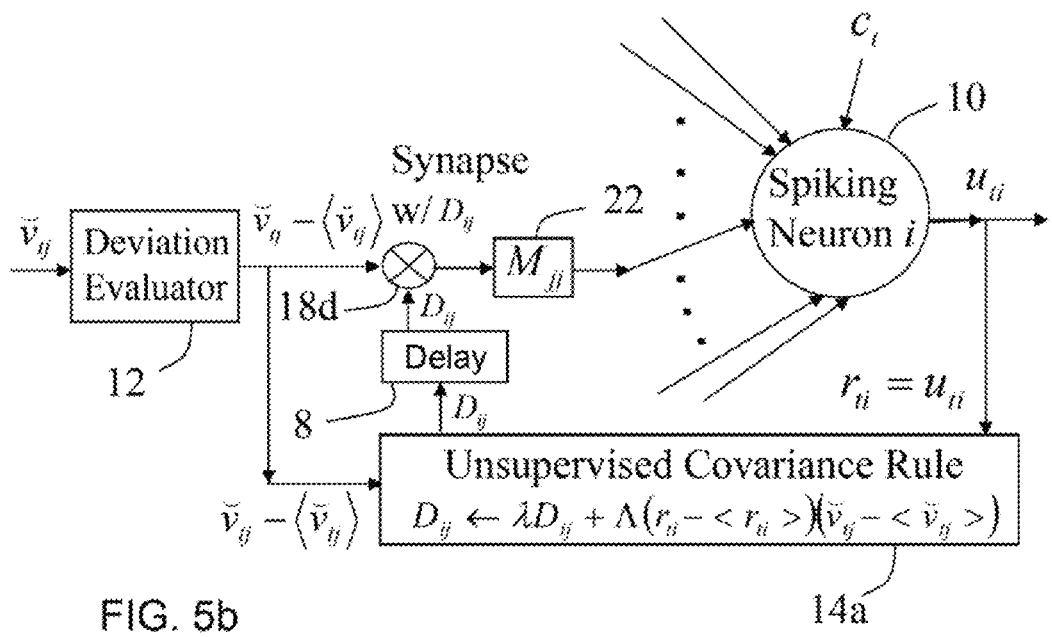

FIG. 5b is the same as FIG. 5a except the addition of the masking factor $M_{jj}$ 22 that is multiplied to the output $D_{ij}(\check{v}_{tj}-\langle\check{v}_{tj}\rangle)$ from the artificial synapse 18d to yield the product $d_{tij}=M_{jj}D_{ij}(\check{v}_{tj}-\langle\check{v}_{tj}\rangle)$. Artificial spiking neuron i 10 then uses such products and a graded signal $c_t$ from an artificial nonspiking neuron to generate an output $u_{ti}$. Note that the unsupervised learning rule 14a inputs the artificial code deviation $\check{v}_{tj}-\langle\check{v}_{tj}\rangle$ and the output $u_{ti}$ from the artificial spiking neuron i 10 as the ith component $r_{ti}$ of the label $r_t$ of $v_t$.

Figure 6B:
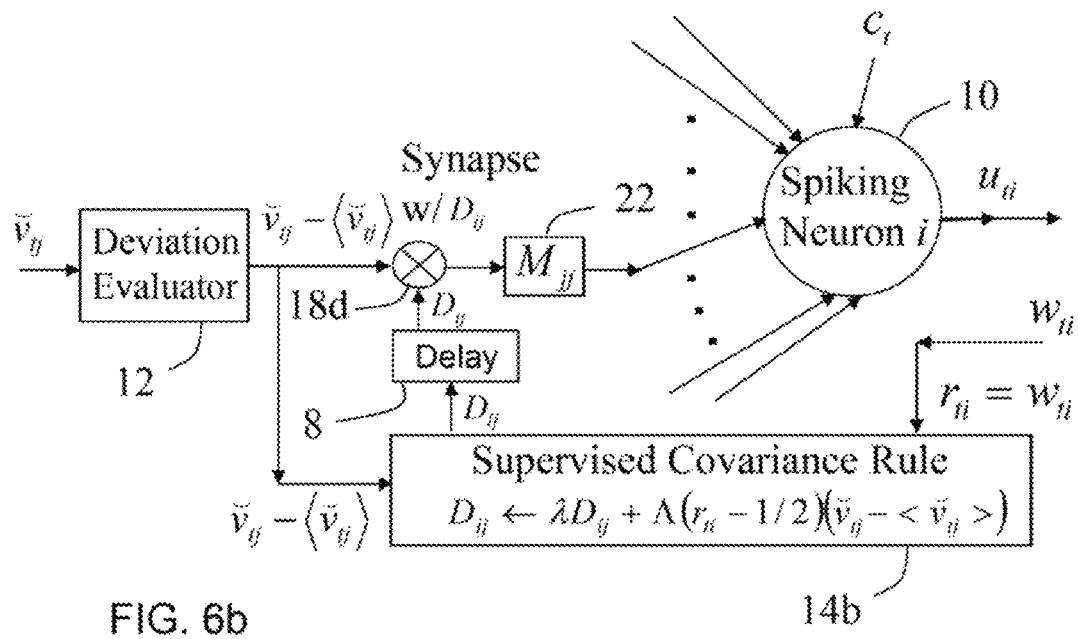
Figure 7B:
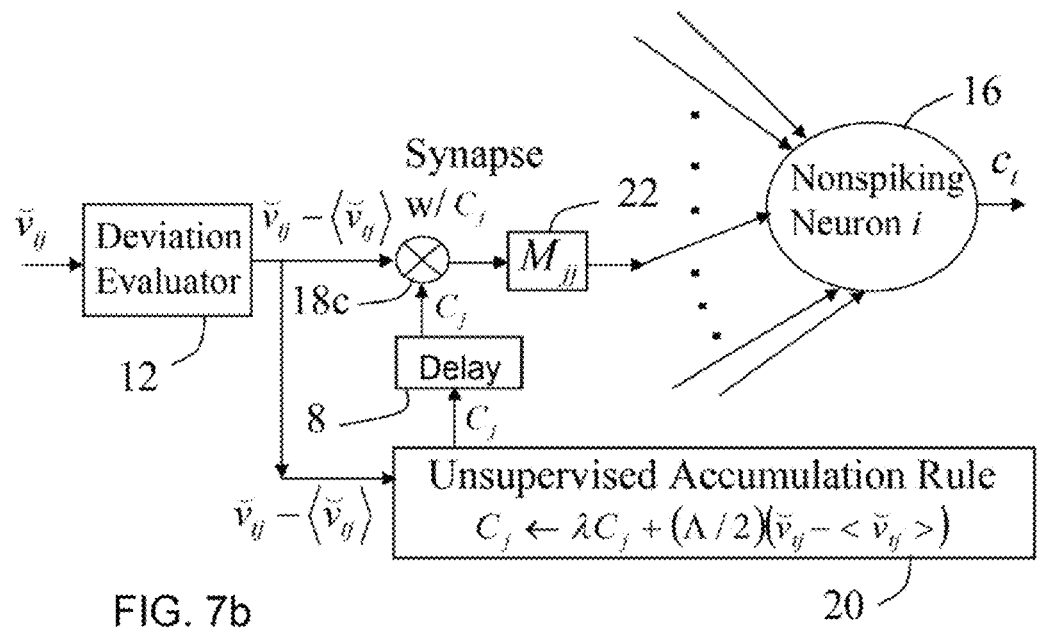

FIG. 6b is the same as FIG. 6a except the addition of the masking factor $M_{jj}$ 22 that is multiplied to the output $D_{ij}(\check{v}_{tj}-\langle\check{v}_{tj}\rangle)$ from the artificial synapse 18d to yield the product $d_{tij}=M_{jj}D_{ij}(\check{v}_{tj}-\langle\check{v}_{tj}\rangle)$. Artificial spiking neuron i 10 then uses such products and a graded signal $c_t$ from an artificial nonspiking neuron to generate an output $u_{ti}$. Note that the supervised learning rule 14b inputs the code deviation $\check{v}_{tj}-\langle\check{v}_{tj}\rangle$ and the component $w_{ti}$ of a label $w_t$ of the measurements in the receptive field of model spiking neuron i, that $w_t$ is provided from outside the LOM (e.g., a handcrafted label $w_t$) as the ith component $r_{ti}$ of the label $r_t$ for the unsupervised covariance rule.

FIG. 7b is the same as FIG. 7a except the addition of the masking factor $M_{jj}$ 22 that is multiplied to the output $C_j(\check{v}_{tj}-\langle\check{v}_{tj}\rangle)$ from the artificial synapse 18c to yield the product $c_{\tau j}=M_{jj}C_j(\check{v}_{tj}-\langle\check{v}_{tj}\rangle)$. Artificial nonspiking neuron 16 then sums such products as an output $c_t$. Note that the unsupervised accumulation rule inputs only the component $\check{v}_{tj}-\langle\check{v}_{tj}\rangle$ of the code deviation vector $\check{v}_t-\langle\check{v}_t\rangle$.

Figure 13:
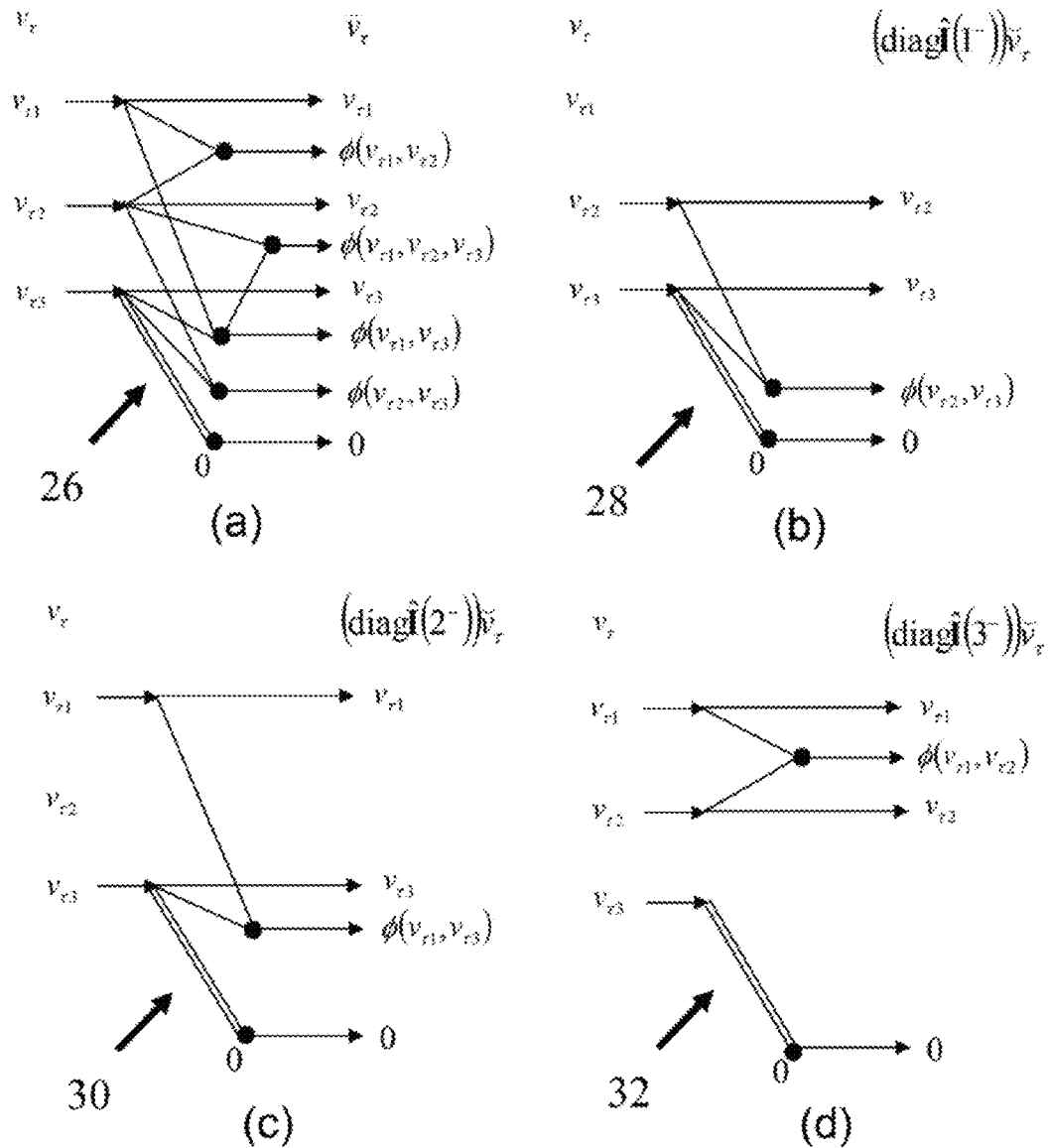

FIG. 13 shows that the product $M\check{v}_\tau$ in EXAMPLE 3 consists of four terms, $\check{v}_\tau$, $(\text{diag}\hat{I}(1^-))\check{v}_\tau$, $(\text{diag}\hat{I}(2^-))\check{v}_\tau$, and $(\text{diag}\hat{I}(3^-))\check{v}_\tau$, where $(\text{diag}\hat{I}(j^-))\check{v}_\tau$ has the components in $\check{v}_\tau$ that involve $v_{\tau j}$ eliminated. These four terms can be viewed as the outputs of four artificial neuronal encoders shown in (a) 26, (b) 28, (c) 30 and (d) 32 in response to four overlapped and nested input vectors, $v_\tau=[v_{\tau1}\ v_{\tau2}\ v_{\tau3}]'$, $[v_{\tau2}\ v_{\tau3}]'$, $[v_{\tau1}\ v_{\tau3}]'$, and $[v_{\tau1}\ v_{\tau2}]'$, respectively. The product $M\check{v}_\tau$ is the sum of the outputs in (a), (b), (c) and (d). Although there are two parts for $(\text{diag}\hat{I}(3^-))\check{v}_\tau$ in (d), they can be replaced with a single neuronal encoder, namely the upper neuronal (e.g., dendritic) part in (d) with $\phi(v_{\tau2}, v_{\tau2})=0$ added to replace $\phi(v_{\tau2}, v_{\tau2})=0$ in the lower neuronal (e.g., dendritic) part.

Figure 14:
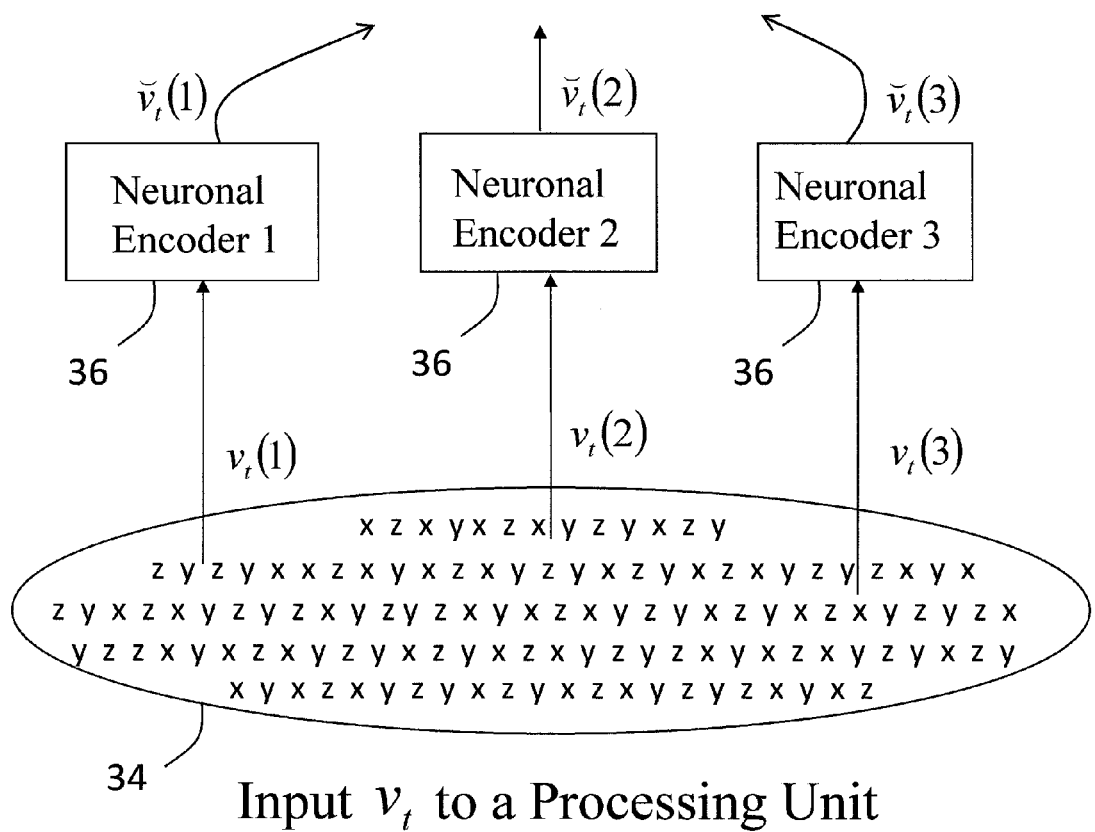

FIG. 14 illustrates three neuronal encoders 36 in a PU (processing unit). Let $v_t(\psi)$, $\psi=1, 2, 3$, be subvectors of the vector $v_t$ 34 input to the PU, where the components of $v_t(\psi)$ are randomly selected from those of $v_t$ such that the union of all the components of $v_t(\psi)$, $\psi=1, 2, 3$, is the set of components of $v_t$. The locations of the components of $v_t(1)$, $v_t(2)$ and $v_t(3)$ are indicated by x, y and z in the circle 34, respectively. The subvectors $v_t(\psi)$, $\psi=1, 2, 3$, are encoded by model neuronal encoders 36 into neuronal codes $v_t(\psi)$, $\psi=1, 2, 3$, which form the general neuronal code $\check{v}_t=[v_t'(1)\ v_t'(2)\ v_t'(3)]'$ of the vector $v_t$ input to the PU. Note that this $v_t$ here is different from the neuronal code of the vector $v_t$ input to the PU.

Figure 15:
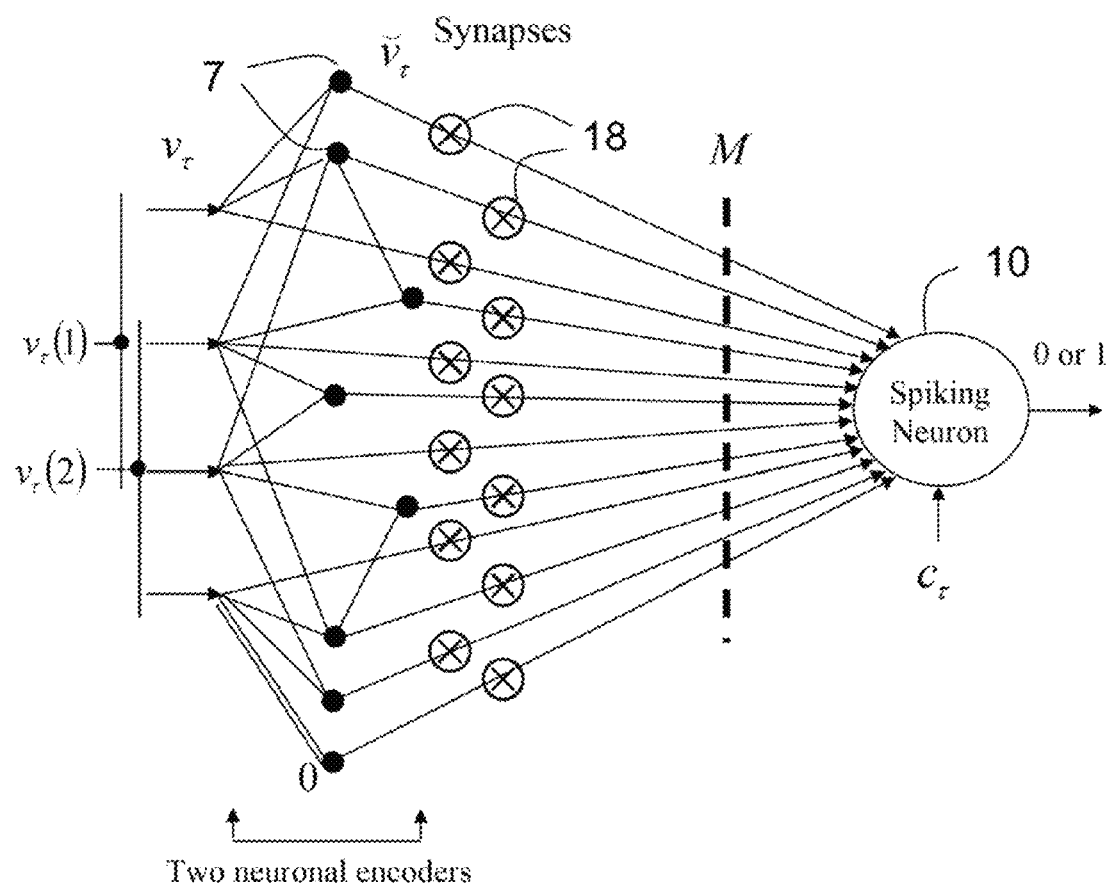

FIG. 15 illustrates two artificial neuronal encoders that input subvectors, $v_\tau(1)$ and $v_\tau(2)$, of the vector $v_\tau$. $v_\tau(1)$ and $v_\tau(2)$ are overlapped. With the masking factors indicated by the dashed line denoted by M, the two artificial neuronal encoders are used to encode one input vector $v_\tau$ into the general neuronal code $\check{v}_t$ of $v_t$ to reduce the number of synapses (from 16 to 12) required and to increase the generalization capability.

Figure 16:
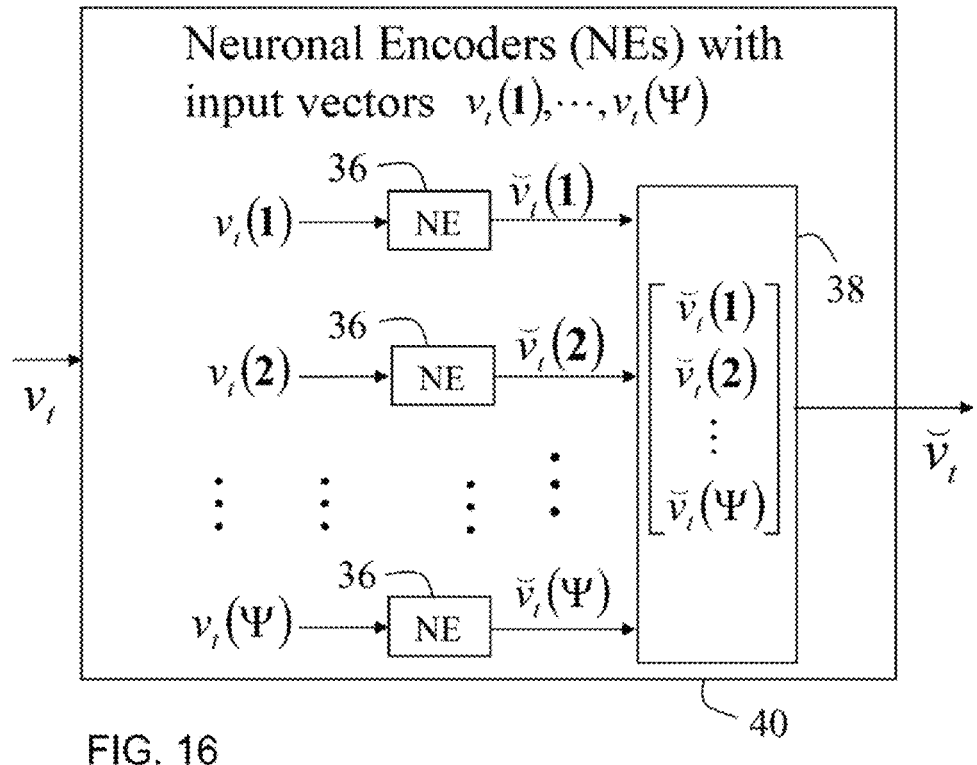

FIG. 16 illustrates the group 40 of artificial neuronal encoders (NEs) 36 in a PU (processing unit). The vector input to the PU is $v_t$. Let $v_t(\psi)$, $\psi=1, \ldots, \Psi$, be subvectors of the vector $v_t$ 34 input to the PU, where the components of $v_t(\psi)$ are randomly selected from $v_t$ such that the union of all the components of $v_t(\psi)$, $\psi=1, \ldots, \Psi$, is the set of components of $v_t$. The subvectors $v_t(\psi)$, $\psi=1, \ldots, \Psi$, are encoded by artificial neuronal encoders 36 into neuronal codes $v_t(\psi)$, $\psi=1, \ldots, \Psi$, which form the general neuronal code $\check{v}_t=[\check{v}_t'(1)\ldots\check{v}_t'(\Psi)]'$ of the vector input to the PU.

Figure 17:
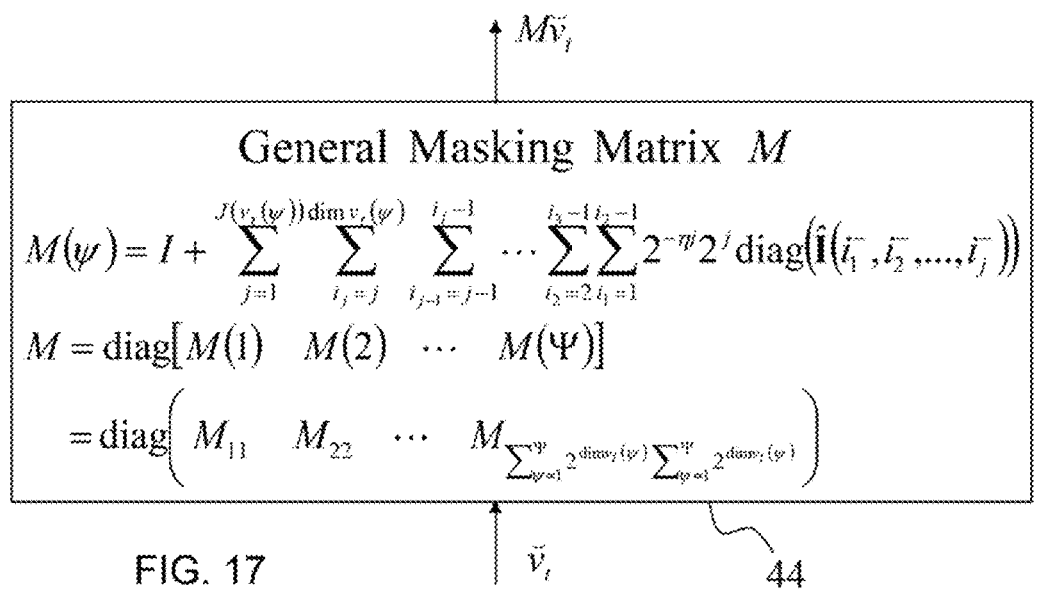

FIG. 17 illustrates the general masking matrix M in a PU, wherein $M(\psi)$ is the masking matrix for neuronal encoder $\psi$ for $\psi=1, \ldots, \Psi$. Note that $\eta$ can be preselected for a given magnitude of dim $v_t(\psi)$ and the application. $M\check{v}_t$, where $\check{v}_t$ is the general neuronal code, reduces or eliminates the effect of the corrupted, distorted, occluded, noised, or erased components of the vector $v_t$ input to the PU. Note that the vector $[\tau_j\ M_{jj}D_{jj}(\check{v}_{tj}-<\check{v}_{tj}>)]$, where $\Sigma_j$ is taken over $j=1, \ldots, \Sigma_{\psi=1}^{\Psi}2^{\dim v(\psi)}$, is equal to the vector $DM(\check{v}_\tau-<\check{v}_\tau>)$, because M is a diagonal matrix.

FIG. 18 provides the formulas 42 of the general neuronal code $\check{v}_t$, the average general neuronal code $<\check{v}_t>$, the general code deviation accumulation vectors C, and the general code covariance matrix D, whose $D(\psi)$, $\psi=1, \ldots, \Psi$, are learned by the unsupervised covariance rule in an unsupervised PU (UPU) or by the supervised covariance rule in a supervised PU (SPU).

Figure 19:
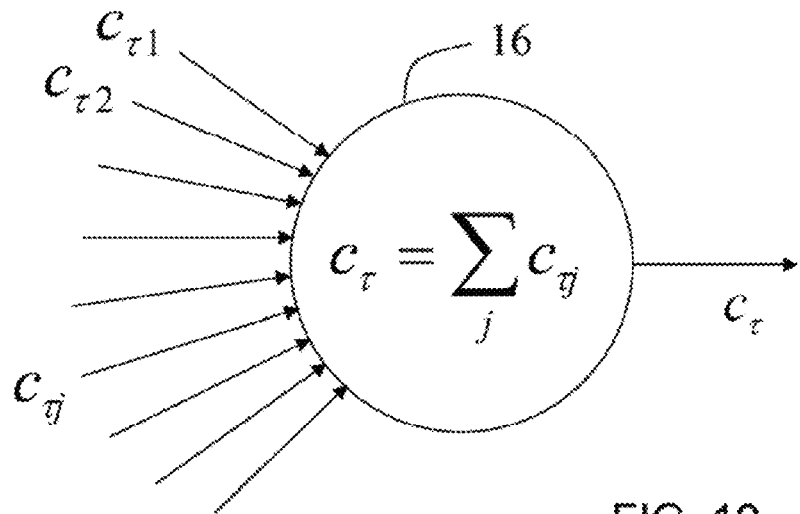

FIG. 19 illustrates an artificial nonspiking neuron 16 in a PU, which evaluates the sum $c_\tau$ of its inputs, $c_{\tau j}$, $j=1, \ldots, \Sigma_{\psi=1}^{\Psi}2^{\dim v_\tau(\psi)}$, which are computed using the general neuronal code deviation $\check{v}_\tau-<\check{v}_\tau>$, the general masking matrix M and the general code deviation accumulation vector C.

Figure 20:
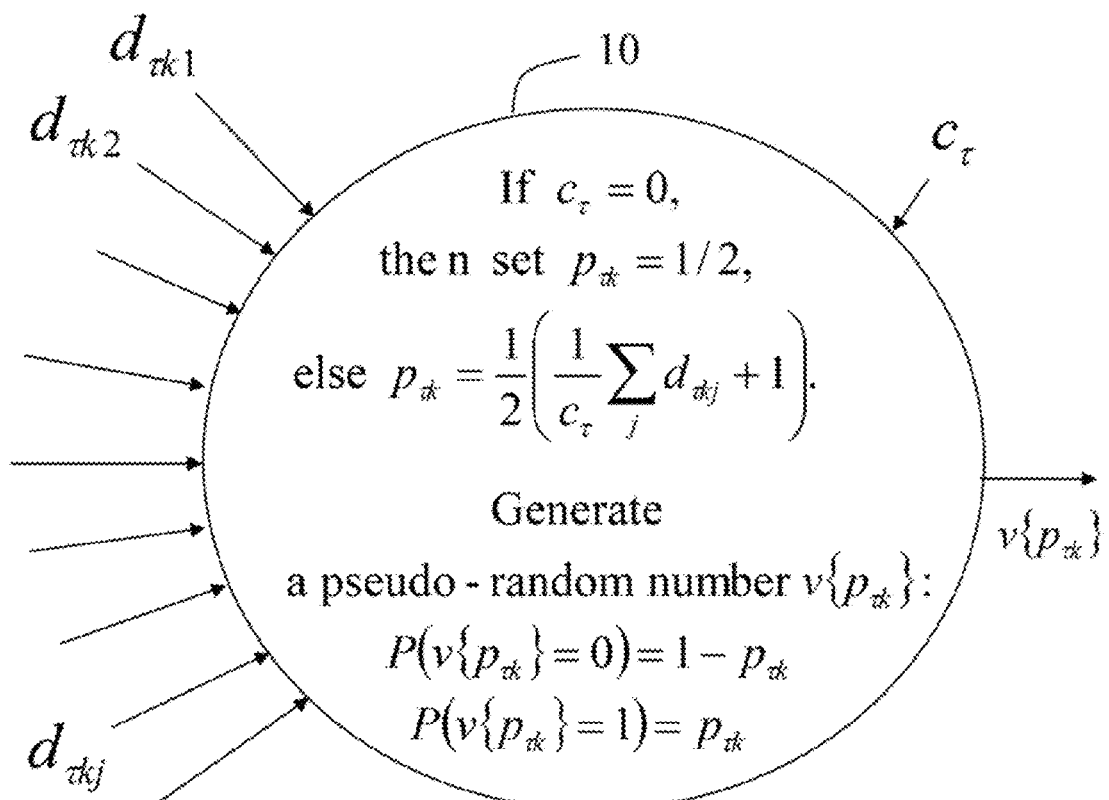

FIG. 20 illustrates artificial spiking neuron k 10 in a PU. It inputs $d_{\tau kj}$, $j=1, \ldots, \Sigma_{\psi=1}^{\Psi}2^{\dim v_t(\psi)}$, which are computed using $c_\tau$ and the general neuronal code deviation $\check{v}_\tau-<\check{v}_\tau>$, the general masking matrix M and the general code covariance matrix D; and evaluates the sum $\Sigma_j d_{\tau kj}$ of $d_{\tau kj}$, $j=1, \ldots, \Sigma_{\psi=1}^{\Psi}2^{\dim v_t(\psi)}$. If $c_\tau=0$, the artificial spiking neuron k then sets $p_{\tau k}=\frac{1}{2}$. If $c_\tau\neq 0$, the artificial spiking neuron k then sets $p_{\tau k}=((\Sigma_j d_{\tau kj})/c_\tau+1)/2$. The artificial spiking neuron generates a pseudo-random number $v\{p_{\tau k}\}$ as follows: $v\{p_{\tau k}\}=1$ with probability $p_{\tau k}$ and $v\{p_{\tau k}\}=0$ with probability $1-p_{\tau k}$.

Figure 21:
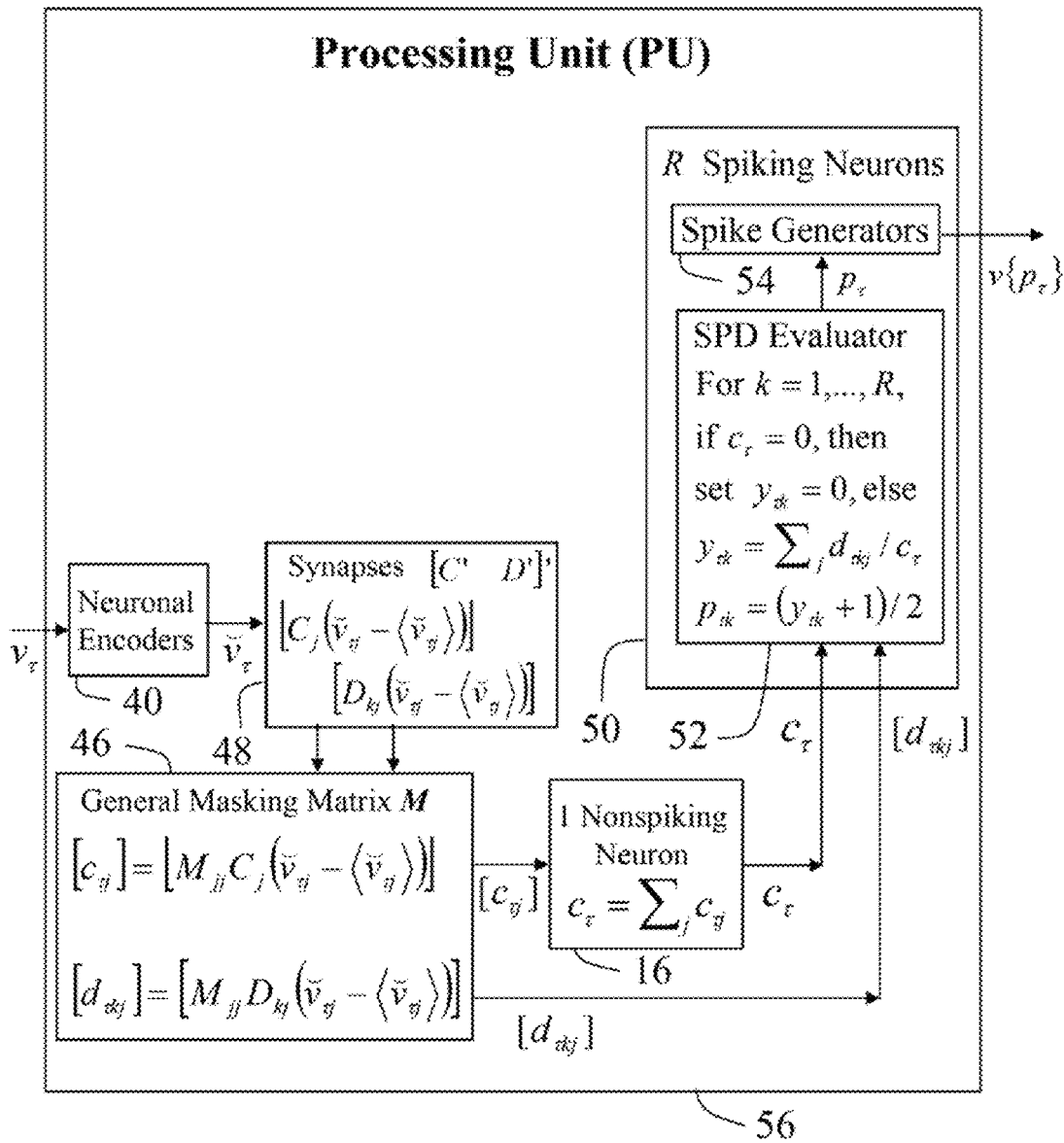

FIG. 21 illustrates a PU (processing unit) 56 without a learning mechanism. A general code deviation accumulation vector C and a general code covariance matrix D are stored in synapses 48. If the D was learned before in accordance with the unsupervised covariance rule, the PU 56 is called an unsupervised processing unit (UPU). If D was learned before in accordance with the supervised covariance rule, the PU 56 is called a supervised processing unit (SPU). At time or numbering $\tau$, the PU receives $v_\tau$. The neuronal encoders 40 encode it into the general neuronal code $\check{v}_\tau$. The synapses 48 compute the entries of the matrix $[D_{kj}(\check{v}_{tj}-<\check{v}_{tj}>)]$ and the vector $[C_j(\check{v}_{tj}-<\check{v}_{tj}>)]$, which entries are multiplied to the masking factors $M_{jj}$ 46 to yield the matrix $[d_{\tau kj}]=[M_{jj}D_{kj}(\check{v}_{tj}-<\check{v}_{tj}>)]$ and the vector $[c_{\tau j}]=[M_{jj}C_j(\check{v}_{tj}-<\check{v}_{tj}>)]$. The masking factor $M_{jj}$ is the jth diagonal entry of the general masking matrix M 46.

There are R artificial spiking neurons 50 and one artificial nonspiking neuron 16 in the PU. The artificial nonspiking neuron sums up $c_{\tau j}$ to form $c_\tau$. For $k=1, \ldots, R$, artificial spiking neuron k sums up $d_{\tau kj}$ to form $d_{\tau k}$ and divides $d_{\tau k}$ by $c_\tau$ to get $y_{\tau k}$. The vector $p_\tau$ with components $p_{\tau k}=(y_{\tau k}+1)/2$ represents an empirical probability distribution of the label of $v_\tau$ input to the PU For $k=1, \ldots, R$, artificial spiking neuron k generates a pseudorandom number $u_{\tau k}=v\{p_{\tau k}\}$ in accordance with the empirical probability $p_{\tau k}$. The pseudo-random vector $v\{p_\tau\}$ is a point estimate of the label of $v_\tau$ according to the empirical probability distribution $p_\tau$ and is the output vector of the PU 56 at time or numbering $\tau$. Over time, the R components of $u_\tau=v\{p_\tau\}$ form R spike trains.

Figure 22:
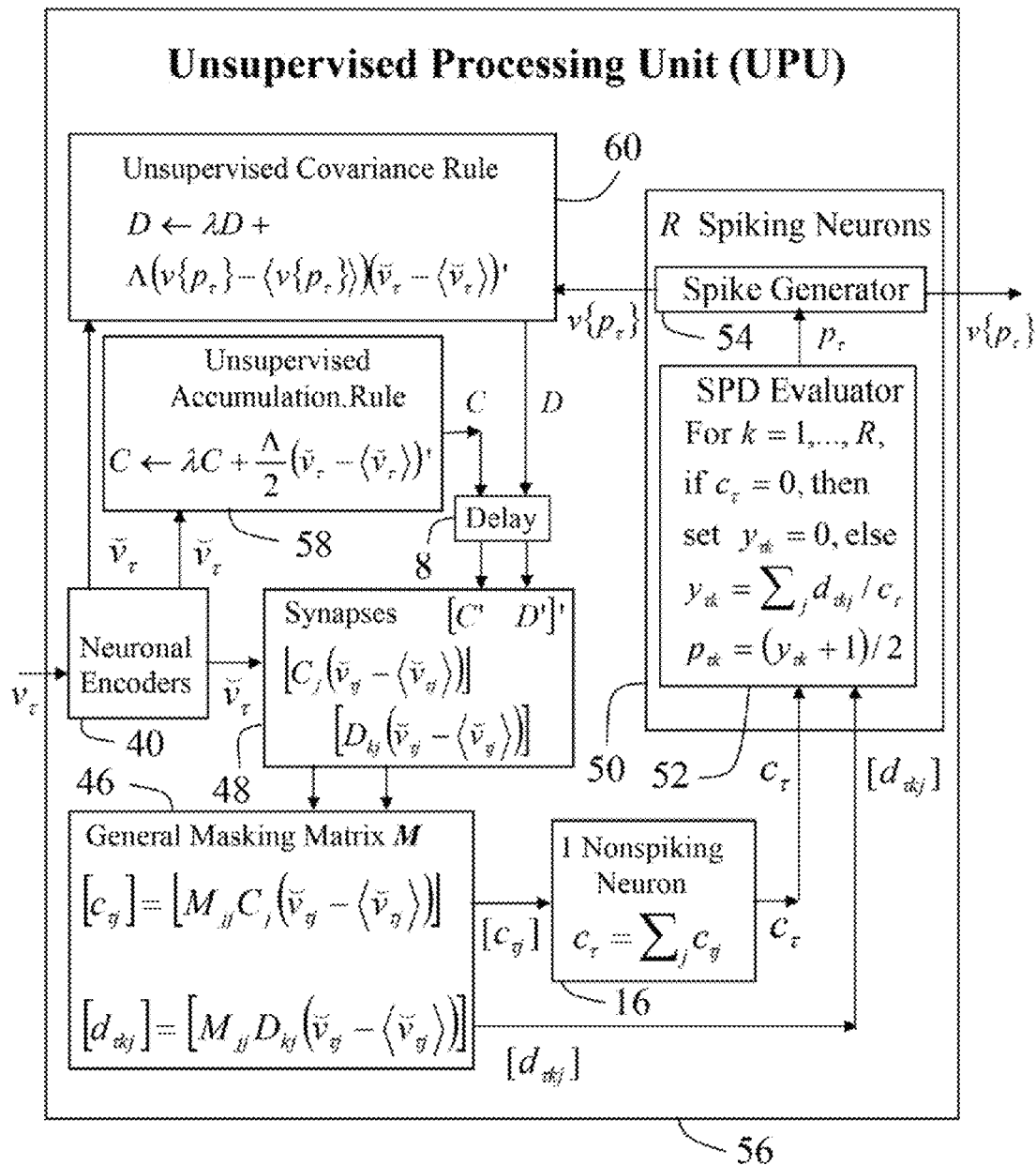

FIG. 22 illustrates an UPU with an unsupervised learning mechanism 60 to learn the code covariance matrix D and an unsupervised learning mechanism 58 to learn the code deviation accumulation vector C. The former 60 learns in accordance with the unsupervised covariance rule, $$D \leftarrow \lambda D + \Lambda(u_\tau - <u_\tau>)(\check{v}_\tau - <\check{v}_\tau>)'$$

where $u_\tau=v\{p_\tau\}$ that is the output of the PU and is actually used by the PU as a label $r_\tau$ of $v_\tau$, and the latter 58 learns in accordance with the unsupervised accumulation rule $$C \leftarrow \lambda C + \frac{\Lambda}{2}(\tilde{v}_\tau - \langle\tilde{v}_\tau\rangle)'$$

The adjusted C and D are delayed for one unit of time or one numbering 8 before being stored in the artificial synapses 48.

Figure 23:
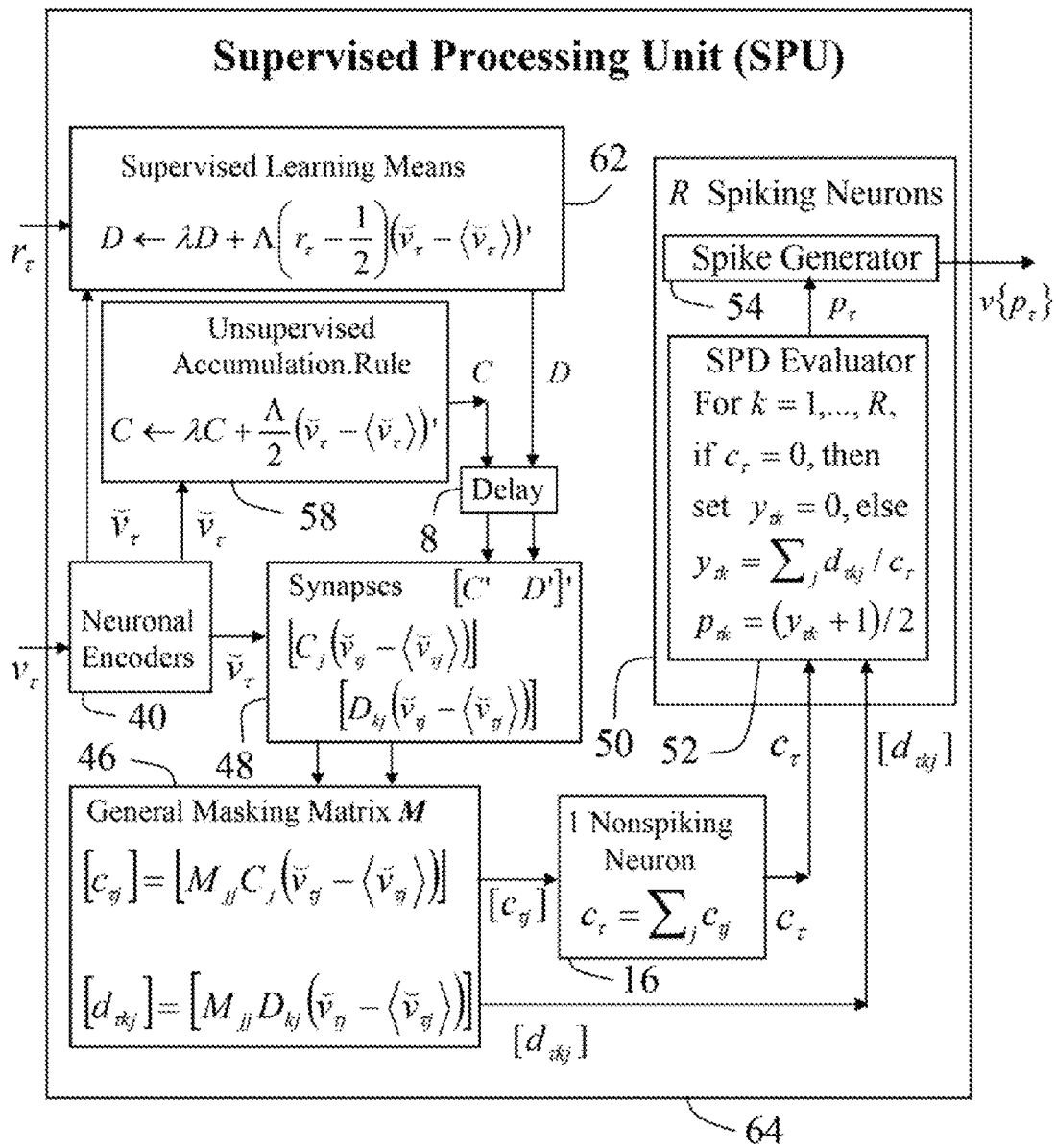

FIG. 23 illustrates an SPU with a supervised learning mechanism 62 to learn the code covariance matrix D and an unsupervised learning mechanism 58 to learn the code deviation accumulation vector C. The former 62 learns in accordance with the supervised covariance rule, $$D \leftarrow \lambda D + \Lambda(r_\tau - \tfrac{1}{2})(\check{v}_\tau - <\check{v}_\tau>)'$$

where $r_\tau$ denotes the label of the vector $v_\tau$ input to the SPU 64, and the latter 58 learns in accordance with the unsupervised accumulation rule $$C \leftarrow \lambda C + \frac{\Lambda}{2}(\tilde{v}_\tau - \langle\tilde{v}_\tau\rangle)'$$

The adjusted C and D are delayed for one unit of time or one numbering 8 before being stored in the artificial synapses 48.

Figure 24:
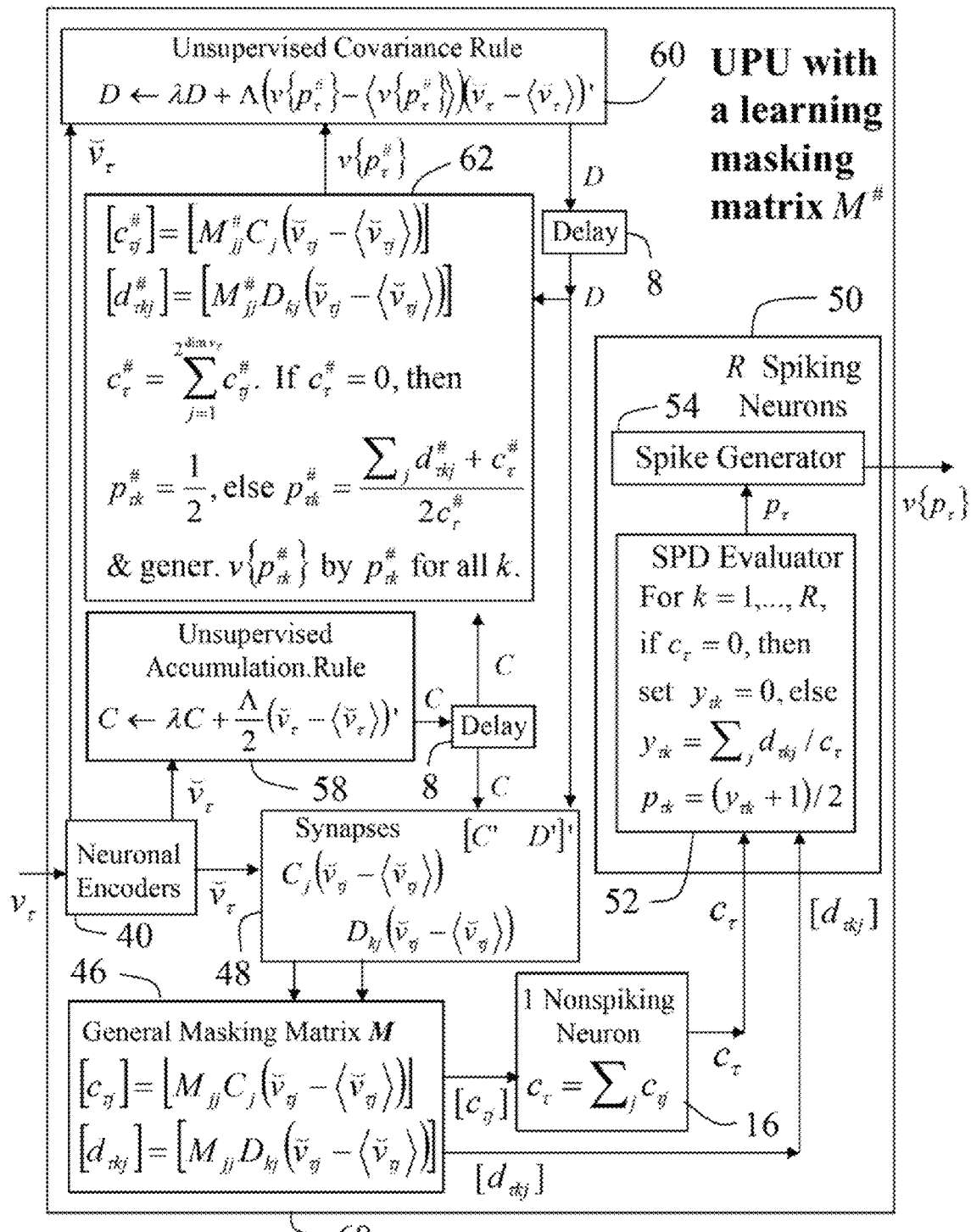

FIG. 24 illustrates an UPU with an unsupervised learning mechanism 60 to learn the code covariance matrix D that uses learning masking factors $M_{jj}^{\#}$ and an unsupervised learning mechanism 58 to learn the code deviation accumulation vector C. $M_{jj}^{\#}$ are the diagonal entries of the learning masking matrices, $M^{\#}(\psi)$, $\psi=1, \ldots, \Psi$, which have a smaller J in (32) than the masking matrices $M(\psi)$ in the same UPU do.

The UPU (with learning masking matrices $M^{\#}(\psi)$, $\psi=1, \ldots, \Psi$), generates an estimate $v\{p_\tau^{\#}\}$ of the label of the vector $v_\tau$ input to the UPU using its masking matrices $M(\psi)$, $\psi=1, \ldots, \Psi$, as before. However, when it comes to learning, the learning masking matrices $M^{\#}(\psi)$, $\psi=1, \ldots, \Psi$, are used instead to generate an estimate $v\{p_\tau^{\#}\}$ of the label of $v_\tau$, and the general code covariance matrix D is adjusted by $$D(\psi) \leftarrow \lambda D(\psi) + \Lambda(v\{p_\tau^{\#}\} - \langle v\{p_\tau^{\#}\}\rangle)(\tilde{v}_\tau - \langle \tilde{v}_\tau \rangle)'$$

for $\psi=1, \ldots, \Psi$. The generation of $v\{p_\tau^{\#}\}$ is described in the Subsection on "Learning Masking Factors for Unsupervised Learning of Smaller Differences" and summarized in 62 in FIG. 24. The code deviation accumulation vector C is learned in accordance with the unsupervised accumulation rule $$C \leftarrow \lambda C + \frac{\Lambda}{2}(\tilde{v}_\tau - \langle \tilde{v}_\tau \rangle)'$$

The adjusted C and D are delayed for one unit of time or one numbering 8 before being stored in the artificial synapses 48.

Figure 25:
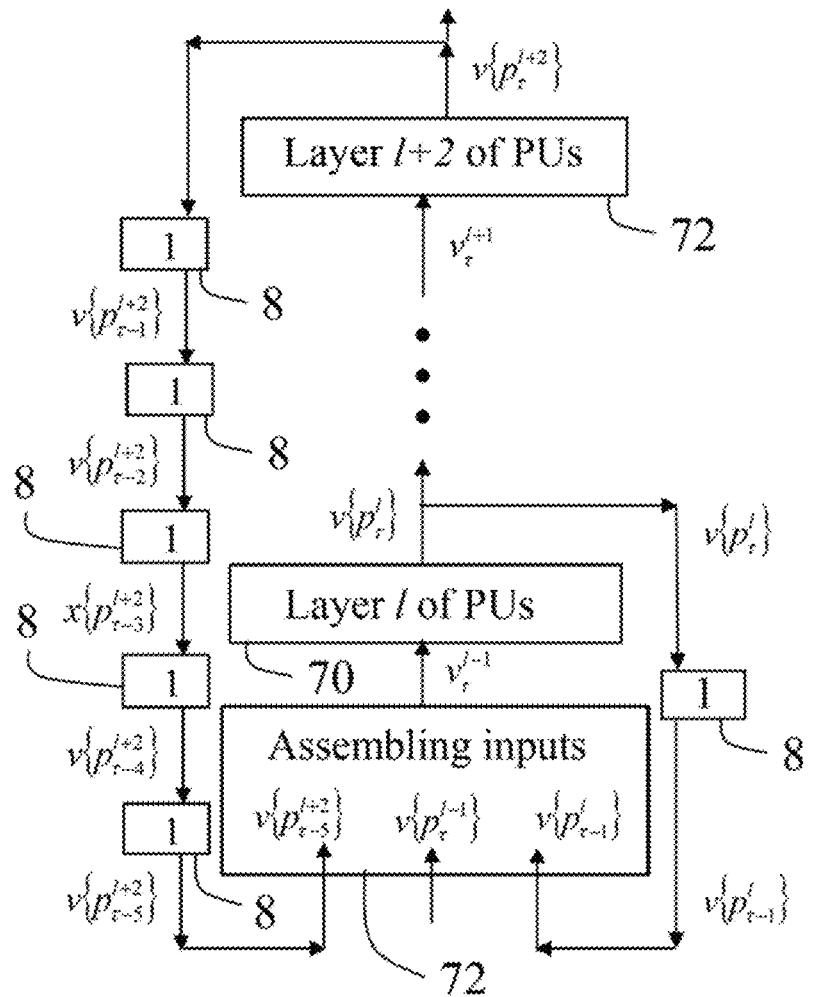

FIG. 25 illustrates layer l and layer l+2 of an example LOM with a feedback connection from layer l to layer l and another from layer l+2 to layer l. The former contains 1 unit-time delay device 8, and the latter 5 unit-time delay devices 8. The box under layer l of PUs does not represent a model of a biological entity. It shows only how both the feedforwarded and feedbacked spike trains are assembled into the vector input to layer l. Note that only the feedbacks from layer l and layer l+2 are shown here. There can be feedbacks from other layers. Note also that for notational simplicity, we feedback all outputs from layer l and layer l+2, but this is not necessary.

Figure 26:
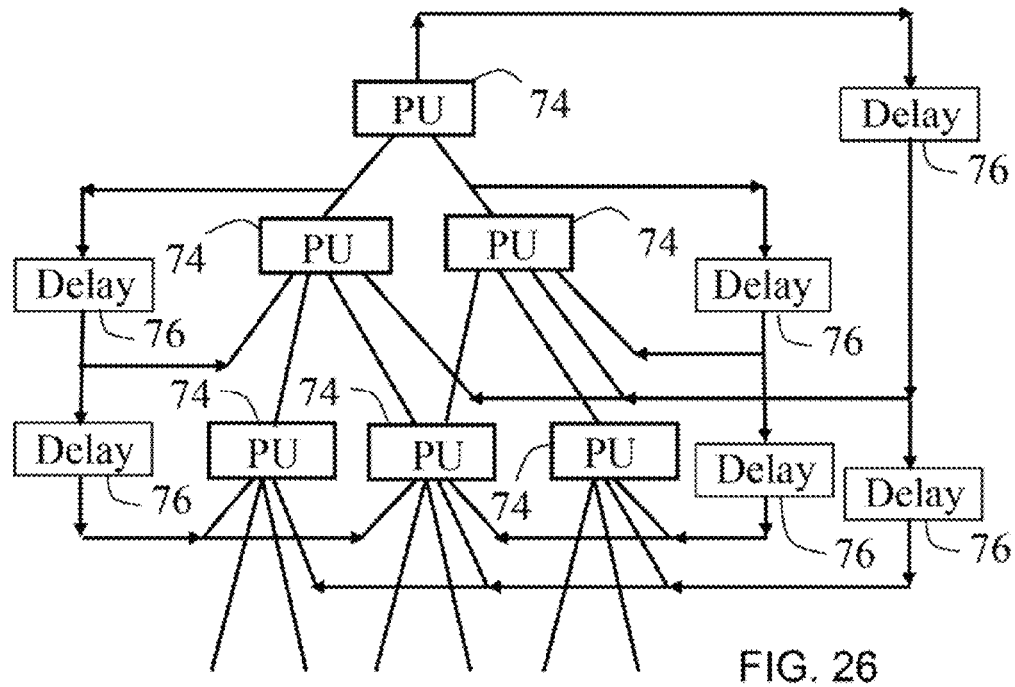

FIG. 26 illustrates an example LOM with three layers of PUs. There are three types of feedback connection: same-layer feedbacks, one-layer feedbacks, and two-layer feedbacks. The delay durations on the feedback connections are not specified in the delay boxes 76. The PUs 74 can be UPUs or SPUs. The second delay box on a feedback connection represents an additional delay.

Figure 27:
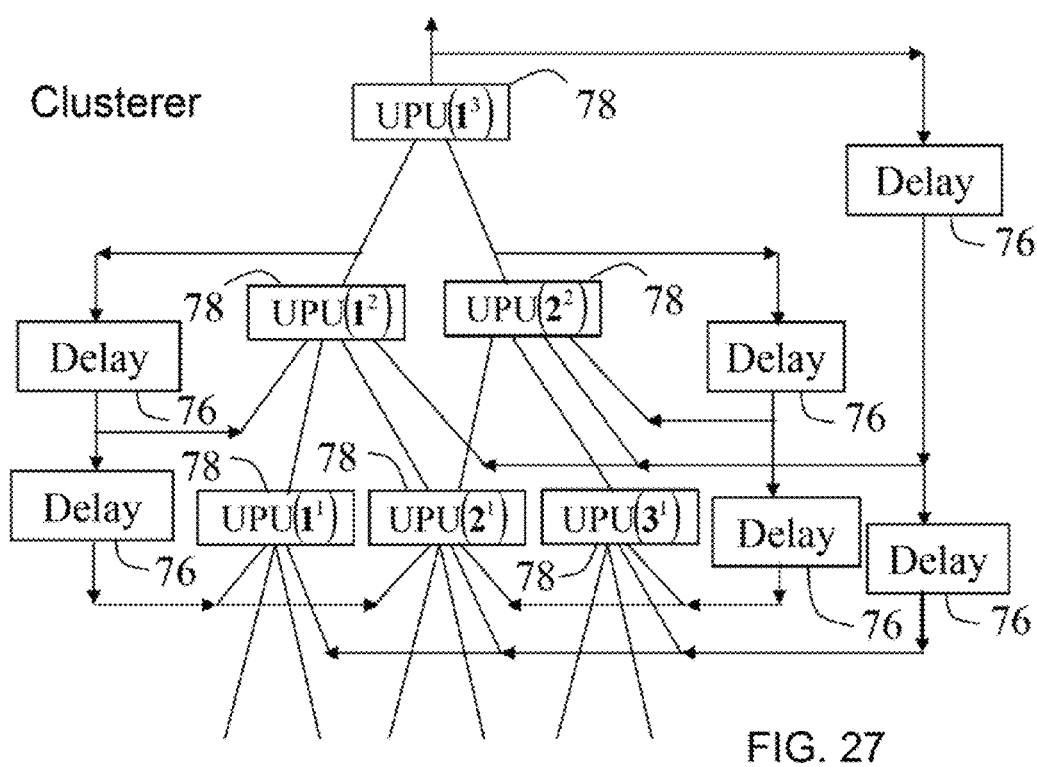

FIG. 27 illustrates the entire clusterer with three layers of UPUs 78 in an example LOM.

Figure 28:
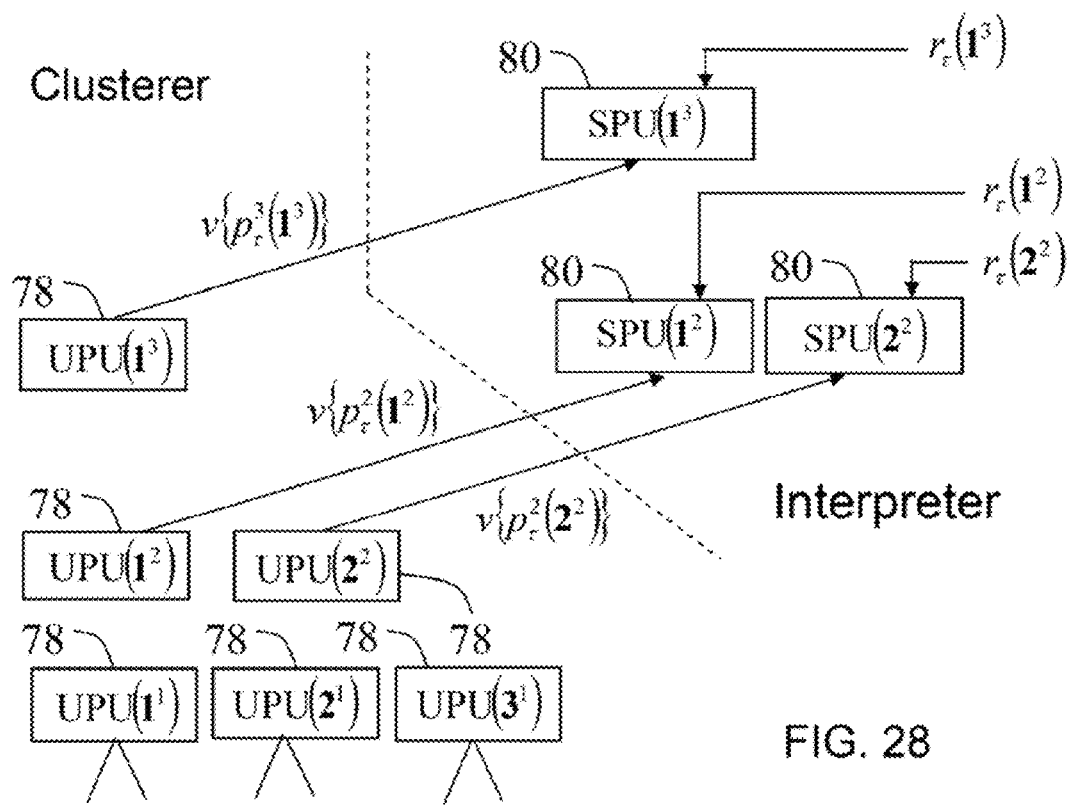

FIG. 28 illustrates an example LOM consisting of the clusterer from FIG. 27 and an interpreter with three SPUs 80. The feedback connections and delays on them in the clusterer in FIG. 27 are not shown for clarify in FIG. 28.

5 DESCRIPTION OF PREFERRED EMBODIMENTS

In the terminology of artificial neural networks, machine learning, and pattern recognition, a feature vector is a transformation of a measurement vector, whose components are measurements or sensor outputs. As a special case, the transformation is the identity transformation, and the feature vector is the measurement vector. Example measurement vectors are digital photographs, frames of a video, segments of speech and handwritten characters/words/numbers. In the present invention disclosure, a feature vector is usually referred to as a vector, unless an emphasis that a vector is a transformation of a measurement vector is needed.

The present invention disclosure discloses a low-order model (LOM) of biological neural networks, the Clustering Interpreting Probabilistic Associative Memory (CIPAM), and other ANNs (artificial neural networks) that are equivalent to the LOM and the CIPAM in the sense that they can be obtained by transforming the LOM or the CIPAM with an affine function and its inverse. The LOM and its equivalent ANNs including the CIPAM are systems that receive and process feature vectors or sequences of feature vectors. Such feature vectors input to the LOM, the CIPAM or another ANN equivalent to them are called exogenous feature vectors. The LOM and ANNs (including the CIPAM) equivalent to the LOM can be viewed as a new ANN paradigm and a new type of learning machine.

The LOM or an ANN equivalent to it is a network of processing units (PUs) with or without feedback connections. If an LOM or an ANN equivalent to it (e.g., CIPAM) is a multilayer network, a vector input to a layer of the network is a feature vector, because it is a transformation of exogenous feature vectors input to the LOM or the ANN and is in turn a transformation of the measurement vectors. A feature vector input to layer l comprises a vector output from layer l−1 and vectors output and feedbacked from the same or other layers. For example, if there is a feedback connection to layer l, then an exogenous feature vector is not an entire feature vector input to layer l, but only a subvector of said entire feature vector.

The LOM, the CIPAM and their equivalent models are each a network of models of the biological neuronal node/encoder, synapse, spiking/nonspiking neuron, means for learning, feedback connection, maximal generalization scheme, feedback connection, etc. For simplicity, these component models are often referred to without the word "model". For example, the model neuronal node, model neuronal encoder, model neuronal tree, model spiking/nonspiking neuron, model synapse, etc. will be referred to as the neuronal node, neuronal encoder, neuronal tree, spiking/nonspiking neuron, synapse, etc. respectively. The LOM, the CIPAM and all their equivalent models can be used as artificial neural networks (ANNs). To emphasize that their components are artificial components in these artificial neural networks, they are referred to as the artificial neuronal node, artificial neuronal encoder, artificial neuronal tree, artificial spiking/nonspiking neuron, artificial synapse, etc. respectively.

We will first describe the LOM and then show how the LOM is transformed into the CIPAM and the general ANN equivalent to the LOM by the use of the affine functions.

In the present invention disclosure, the prime ' denotes matrix transposition, a vector is regarded as a subvector of the vector itself, a column or row vector is also a matrix, and $[a_{ij}]$ denotes a matrix whose (i, j)th entry is $a_{ij}$. If $a_{ij}$, i=1, ..., m, j=1, ..., n, then they are contained in the m×n matrix $[a_{ij}]$. Evaluating $a_{ij}$, i=1, ..., m, j=1, ..., n, is equivalent to evaluating the m×n matrix $[a_{ij}]$.

5.1 Model Neuronal Encoders

It was discovered in 1980's and 1990's that biological dendrites are capable of performing information processing tasks. However, neuronal trees are missing in well-known artificial neural networks, overlooking a large percentage of the neural circuit (Simon Haykin, *Neural Networks and Learning Machines*, Third Edition, Pearson Education, New Jersey, 2009 and Christopher M. Bishop, *Pattern Recognition and Machine Learning*, Springer Science, New York, 2006).

In the low-order model (LOM) disclosed in the present invention disclosure, a model neuronal (dendritic/axonal) encoder, is a network of model neuronal nodes, each of which is a low-order polynomial with two variables that acts like an XOR (exclusive-OR) logic gate when the two input variables are (bipolar) binary digits.

In this Subsection, model neuronal nodes and model neuronal encoders are described. An model neuronal encoder is a function, that encodes the vector input to the encoder into the vector output, called the neuronal code, from the encoder. The output vectors have an orthogonality property proven in the Appendix of James Ting-Ho Lo, A Low-Order Model of Biological Neural Networks, *Neural Computation*, Vol. 23, No. 10, pp. 2626-2682, 2011.

5.1.1 Binary Operation of a Model Neuronal Node

Figure 1:
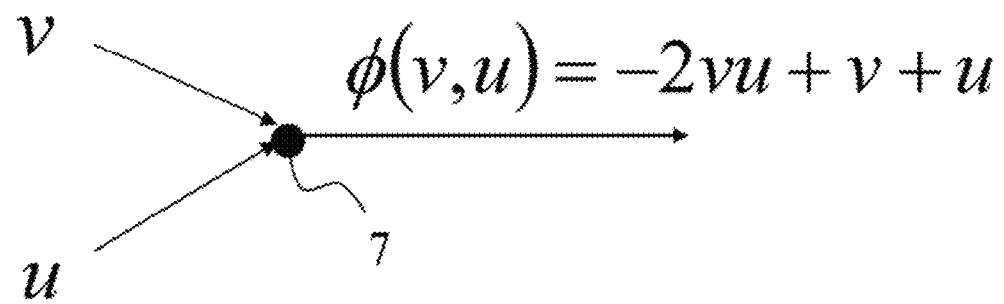
Figure 2:
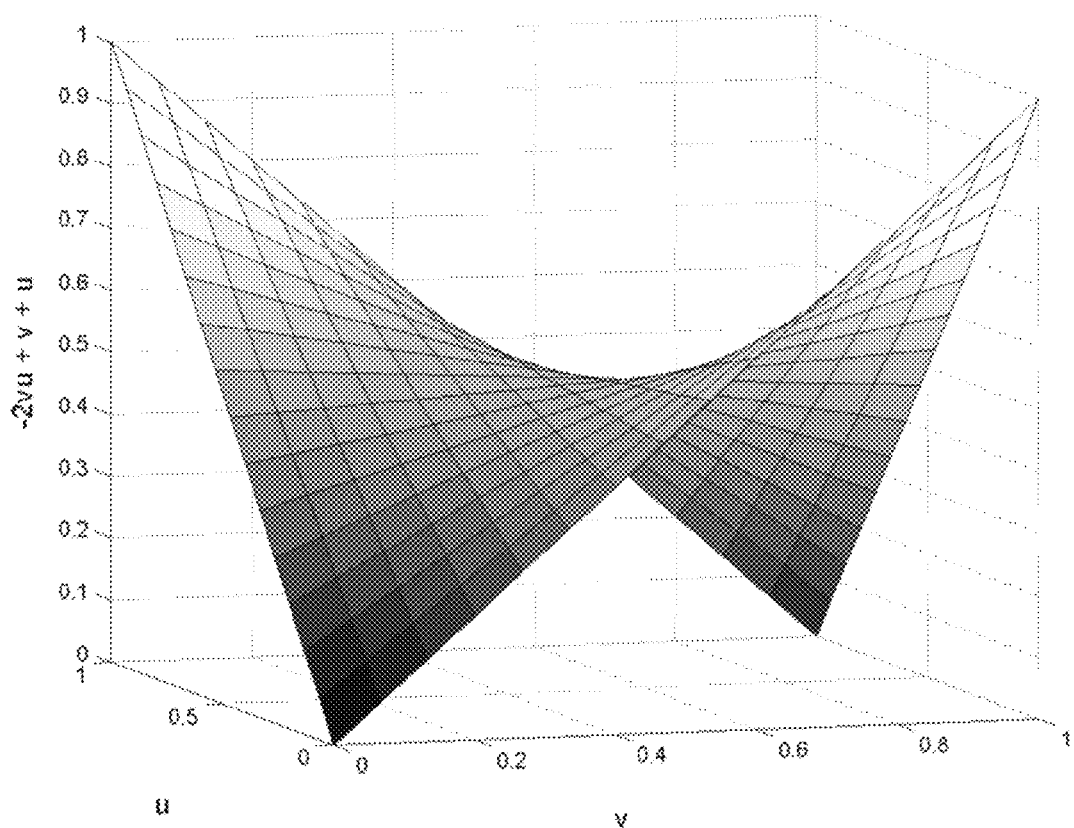

A model (or artificial) neuronal node is shown in FIG. 1. The input variables, v and u, to a neuronal node are usually spikes in spike trains modeled as Bernoulli processes. The output of the model neuronal node is $$\phi(v,u) = -2vu + v + u \quad (1)$$

which is a hyperbolic polynomial depicted over the unit square in FIG. 2. The unit square is only a part of the domain of the function $\phi$. If v and u are binary digits, $\phi(v, u)$ is the XOR function. If not, $\phi(v, u)$ approximates the XOR function nicely. As shown in FIG. 2, the closer v and u are to binary values, the more $\phi$ acts like XOR. The farther they are to binary values, the less $\phi$ acts like XOR. For example, $\phi(0.9, 0.9)=0.18$, $\phi(0.9, 0.1)=0.82$, $\phi(0.9, 0.75)=0.3$, and $\phi(0.75, 0.1)=0.7$. $\phi$ acts more like XOR at (0.9, 0.9) and (0.9, 0.1) than at (0.9, 0.75) and (0.75, 0.1). Note that there are other polynomials (e.g., the elliptic polynomial $2v^2 + 2u^2 - 2vu - v - u$) that act like the XOR function at binary inputs, but $\phi$ involves the least number of arithmetic operations and approximates XOR in the most reasonable manner as shown in FIG. 2. $\phi(v, u)$ is henceforth called the XOR polynomial.

5.1.2 Composition of Operations of Model Neuronal Nodes

The algebraic binary operation $\phi(v, u) = -2vu + v + u$ is commutative and also associative:

$$\phi(w, \phi(v, u)) = \phi(\phi(w, v), u)$$
$$= (-2)^2 wvu - 2(wv + wu + vu) + w + v + u$$

Hence, we can define a symmetric function $\phi_k$ by applying the binary operation repeatedly as follows:

$$\phi_k(v_1, v_2, \ldots, v_k) = \phi(\ldots \phi(\phi(v_1, v_2), v_3), \ldots, v_k)$$

where $\phi_1(v_i) = v_i$ and $\phi_2(v_i, v_j) = \phi(v_i, v_j)$.

It follows that $$\phi_k(v_1, v_2, \ldots, v_k) = \phi(\phi_i(v_1, v_2, \ldots v_i), \phi_{k-i}(v_{i+1}, v_{i+2}, \ldots, v_k))$$

Therefore, there are many different ways to obtain $\phi_k(v_1, v_2, \ldots, v_k)$. For example, $\phi_4(v_1, v_2, v_3, v_4)$ can be obtained by $\phi(\phi(v_1, v_2), \phi(v_3, v_4))$ or by $\phi(\phi_3(v_3, v_2, v_4), v_1)$.

If the model neuronal encoder has m inputs forming an input set $S = \{v_1, v_2, \ldots, v_m\}$, then the input set has $2^m$ subsets. On each of these subsets, say $\{v_{k_1}, v_{k_2}, v_{k_j}\}$, an output of the neuronal encoder is defined to be $\phi_i(v_{k_1}, v_{k_2}, \ldots, v_{k_j})$. For example, if the input set is $\{v_1, v_2, v_3\}$, then the subsets are $\Phi$, $\{v_1\}$, $\{v_2\}$, $\{v_2, v_1\}$, $\{v_3\}$, $\{v_3, v_1\}$, $\{v_3, v_2\}$, $\{v_3, v_2, v_1\}$, where $\Phi$ is the empty set. The outputs of the neuronal encoder are $\phi_0(\Psi)$, $\phi_1(v_1)$, $\phi_1(v_2)$, $\phi_2(v_2, v_1)$, $\phi_1(v_3)$, $\phi_2(v_3, v_1)$, $\phi_2(v_3, v_2)$, $\phi_3(v_3, v_2, v_1)$, where $\phi_0(\Phi)$ is defined to be 0.

Figure 3:
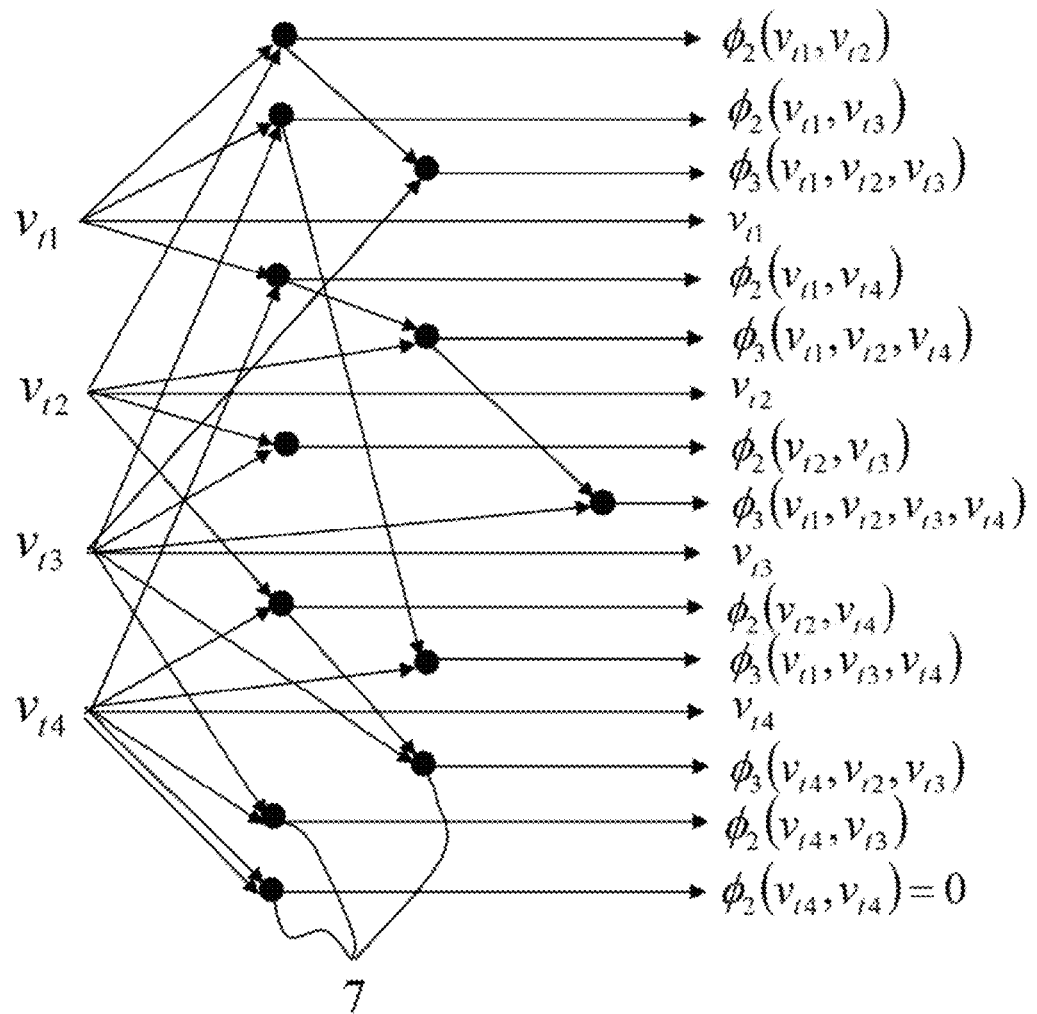

Similarly, if the input set is $\{v_1, v_2, v_3, v_4\}$, the model neuronal encoder has 16 outputs $\phi_i(v_{k_1}, \ldots, v_{k_j})$, where $\{v_{k_1}, \ldots, v_{k_j}\}$ are subsets of $\{v_1, v_2, v_3, v_4\}$. FIG. 3 shows this model neuronal encoder with four inputs and 16 outputs, where the four inputs $v_{ti}$, $i=1, 2, 3, 4$, at time t are each close to a binary digit. $\phi_i(v_{k_1}, \ldots, v_{k_j})$ can be evaluated by binary $\phi_2$ or other operations $\phi_k$ in more than one way if $i>2$. Therefore, the structure of a model neuronal encoder for more than 2 inputs is not unique.

Note that $\phi(v_i, v_i) = 0$ and $\phi(0, v_i) = v_i$. It follows that for $v_{k_1}, v_{k_2}, \ldots, v_{k_j}$ and $v_{k_1}$, $$\phi_{j+1}(v_{k_1}, v_{k_1}, v_{k_2}, \ldots, v_{k_j}) = \phi(\phi_2(v_{k_1}, v_{k_1}), \phi_{j-1}(v_{k_2}, \ldots, v_{k_j}))$$
$$= \phi(0, \phi_{j-1}(v_{k_2}, \ldots, v_{k_j}))$$
$$= \phi_{j-1}(v_{k_2}, \ldots, v_{k_j})$$

Hence, a function $\phi_j$ with repeated variables can be identified with a function $\phi_{j-2i}$ with different variables for some $i>0$. Using $\{v_1, v_2, \ldots, v_m\}$ as the input set and $\phi(v, u)$ to compose functions, we can obtain only $2^m$ different functions for input variables with binary values.

Note that model axonal encoders, model dendritic encoders, and model dendritic encoders with a dendrite or dendritic node replaced with an axon or axonal node respectively are collectively called neuronal encoders. An orthogonality property of a model neuronal encoder's output vector is discussed in the next Subsubsection and proven in the Appendix.

5.1.3 An Orthogonality Property of Neuronal Codes

To describe an orthogonality property of the outputs of a model neuronal encoder with input variables $\{v_1, v_2, \ldots, v_m\}$, we organize its $2^m$ outputs into a vector, called the neuronal code, as follows: Let u denote a scalar and $v = [v_1 \ v_2 \ \ldots \ v_k]'$ a k-dimensional vector. Define a k-dimensional vector $\phi(u, v)$ of polynomials by $$\phi(u, v) = [\phi(u, v_1) \ \phi(u, v_2) \ldots \phi(u, v_k)]$$

The $2^m$ different functions that can be defined by compositions of the binary operation $\phi$ on the input set $\{v_1, v_2, \ldots, v_m\}$ are generated and organized into a $2^m$-dimensional column vector $\check{v}$ by recursively generating row vectors $\check{v}(1, \ldots, k)$, for $k=1, 2, \ldots, m$, as follows:

$$\check{v}(1) = [0 \ \ v_1] \quad (2)$$

$$\check{v}(1, 2) = [\check{v}(1) \ \ \phi \ (v_2, \check{v}(1))] \quad (3)$$
$$= [0 \ \ v_1 \ \ v_2 \ \ -2v_2v_1 + v_2 + v_1]$$

$$\check{v}(1, \ldots, k+1) = [\check{v}(1, \ldots, k) \ \ \phi(v_{k+1}, \check{v}(1, \ldots, k))] \quad (4)$$

$$\check{v} = \check{v}'(1, \ldots, m) \quad (5)$$

Figure 4:
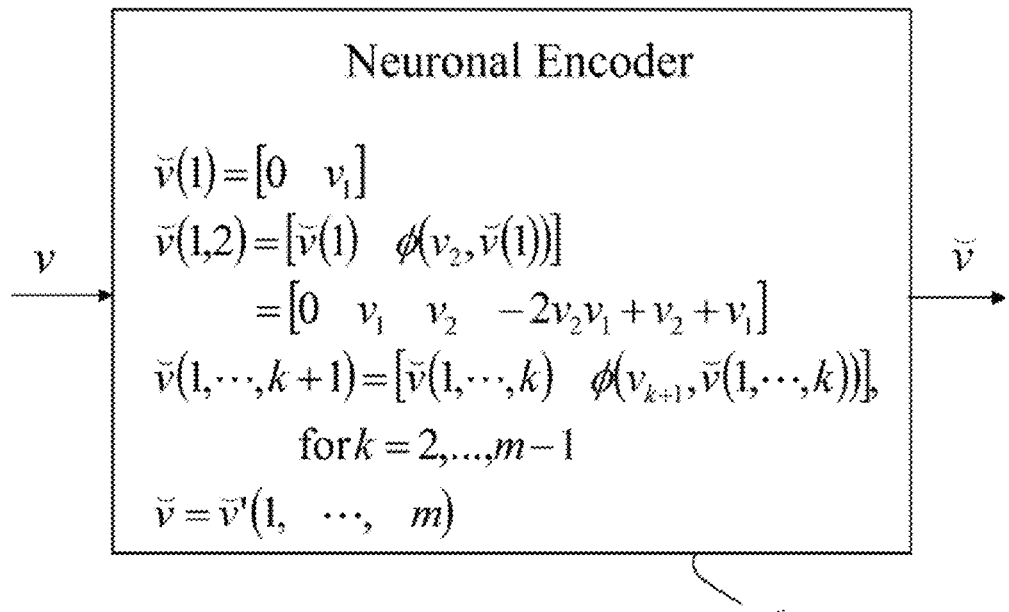
FIG. 4 illustrates an artificial neuronal encoder 6 that generates the $2^m$-dimensional neuronal code $\check{v}$ of an m-dimensional vector v input to the artificial neuronal encoder in a recursive manner.

Denoting the k-th component of $\check{v}$ by $\check{v}_k$, the vector $\check{v} = [\check{v}_1 \ \check{v}_2 \ \ldots \ \check{v}_{2^m}]'$ is called the neuronal code of v. Setting the first component of $\check{v}(1)$ equal to zero above (instead of one) yields two properties: First, because $\phi(v, v) = 0$ and $\phi(v, 0) = v$, two equal binary signals meeting at a neuronal node produce the first component of $\check{v}$, and this first component will not change other components through neuronal nodes through neuronal nodes down the stream. Second, this makes $\check{0} = 0$. Here, 0 are the zero vectors. The above recursive way to generate the neuronal codes is also shown in FIG. 4.

It is proven in the APPENDIX of James Ting-Ho Lo, "A Low-Order Model of Biological Neural Networks," *Neural Computation*, vol. 23, no. 10, pp. 2626-2682, 2011, that given two m-dimensional binary vectors, v and u, their neuronal codes, $\check{v}$ and $\check{u}$, satisfy $$\left(\tilde{v} - \frac{1}{2}I\right)'\left(\tilde{u} - \frac{1}{2}I\right) = 2^{-2}\prod_{k=1}^{m}\left(1 + 2^2\left(v_k - \frac{1}{2}\right)\left(u_k - \frac{1}{2}\right)\right) \quad (6)$$

where I=[1 1 ... 1]', which we note is not the identity matrix I. If v and u are binary digits, then $$\left(\tilde{v} - \frac{1}{2}I\right)'\left(\tilde{u} - \frac{1}{2}I\right) = 0, \text{ if } v \neq u \quad (7)$$

$$= 2^{m-2}, \text{ if } v = u \quad (8)$$

Note that if the components of u and v assume values from the set {0, ½, 1}, we have the following additional properties:

1. If $\left(v_k - \frac{1}{2}\right)\left(u_k - \frac{1}{2}\right) =$  (9)

0 for some $k$ in $\{1, \ldots, m\}$ then $$\left(\tilde{v} - \frac{1}{2}I\right)'\left(\tilde{u} - \frac{1}{2}I\right) = 2^{-2}\prod_{j=1, j \neq k}^{m}\left(1 + 2^2\left(v_j - \frac{1}{2}\right)\left(u_j - \frac{1}{2}\right)\right)$$

2. If $\left(\tilde{v} - \frac{1}{2}I\right)'\left(\tilde{u} - \frac{1}{2}I\right) \neq$  (10)

0 then $$\left(\tilde{v} - \frac{1}{2}I\right)'\left(\tilde{u} - \frac{1}{2}I\right) = 2^{4(v-\frac{1}{2}I)'(u-\frac{1}{2}I)-2}$$

EXAMPLE 1a

If v=[1 0 1 0]' and u=[1 0 1 1]', then v̌(1)=[0 1], v̌(1,2)=[0 1 φ(0,0) φ(0,1)]=[0 1 0 1], v̌(1,2,3)=[0 1 1 1 0 1 0], and $\tilde{v}$=[0 1 0 1 1 0 1 0 0 1 0 1 1 0 1 0]'

$\tilde{u}$=[0 1 0 1 1 0 1 0 1 0 1 0 0 1 0 1]'

It follows that $\tilde{v} - \frac{1}{2}I$ and $\tilde{u} - \frac{1}{2}I$ are respectively $$\begin{bmatrix} -\frac{1}{2} & \frac{1}{2} & -\frac{1}{2} & \frac{1}{2} & \frac{1}{2} & -\frac{1}{2} & \frac{1}{2} & -\frac{1}{2} \\ -\frac{1}{2} & \frac{1}{2} & -\frac{1}{2} & \frac{1}{2} & \frac{1}{2} & -\frac{1}{2} & \frac{1}{2} & -\frac{1}{2} \end{bmatrix}'$$

$$\begin{bmatrix} -\frac{1}{2} & \frac{1}{2} & -\frac{1}{2} & \frac{1}{2} & \frac{1}{2} & -\frac{1}{2} & \frac{1}{2} & -\frac{1}{2} \\ \frac{1}{2} & -\frac{1}{2} & \frac{1}{2} & -\frac{1}{2} & -\frac{1}{2} & \frac{1}{2} & -\frac{1}{2} & \frac{1}{2} \end{bmatrix}'$$

Hence, $(\tilde{v}-\frac{1}{2}I)'(\tilde{v}-\frac{1}{2}I)=2^{4-2}$ and $(\tilde{v}-\frac{1}{2}I)'(\tilde{u}-\frac{1}{2}I)=0$, as predicted by (8) and (7).

5.2 Hebbian-Type Learning Rules

Three learning rules, called unsupervised covariance rule, supervised covariance rule and unsupervised accumulation rule, are described in this Subsection. The first two are essentially Terrence J. Sejnowski's covariance rule. However, the unsupervised covariance rule and supervised covariance rule herein proposed do not build up the covariance between the outputs of the presynaptic and postsynaptic neurons as Sejnowski's covariance rule does. The unsupervised covariance rule builds up, in synapses, the covariance between the outputs of the presynaptic neuronal encoder and the postsynaptic neurons. The supervised covariance rule builds up the covariance between the outputs of the presynaptic neuronal encoder and the labels provided from outside the LOM that act as teaching signals for the supervised covariance learning. Like Sejnowski's covariance rule, the unsupervised and supervised covariance rules here, especially the former, can be looked upon as variants of what is commonly known as the Hebb rule. The unsupervised accumulation rule simply accumulates code deviation vectors, which are the deviations of the neuronal codes from their averages over a time window with a certain width.

5.2.1 Unsupervised Covariance Rule

There are two types of model neuron, namely model spiking neuron (also called D-neuron) and model nonspiking neuron (also called C-neuron), in the LOM. A model spiking neuron generates binary digits, and a model nonspiking neuron outputs graded signals that are transmitted to its neighboring model spiking neurons. Computations performed in these two types of neuron are described in Subsubsections 5.5.4 and 5.5.5.

Each of the $2^m$ outputs, $\check{v}_{t1}, \check{v}_{t2}, \ldots, \check{v}_{t2^m}$, from a neuronal encoder at time (or numbering) t passes through a synapse to reach each of a number of, say R, postsynaptic model spiking neurons and a postsynaptic model nonspiking neuron. $\check{v}_t = [\check{v}_{t1} \ldots \check{v}_{t2^m}]'$ is called a neuronal code, and $\langle\check{v}_t\rangle = [\langle\check{v}_{t1}\rangle \ldots \langle\check{v}_{t2^m}\rangle]'$ denotes an average of $\check{v}_t$ over a time window $[t-q_v+1, t]$ with width $q_v$, which is preset in consideration of the maximum size of the clusters formed using the unsupervised covariance rule (to be described) for the application. $\check{v}_t - \langle\check{v}_t\rangle$ is called a code deviation vector. It is the deviation of a neuronal code $\check{v}_t$ from a neuronal code average $\langle\check{v}_t\rangle$. FIG. 5a and FIG. 5b show an output of the neuronal encoder going through a model synapse represented by (x) to reach a model spiking neuron, model spiking neuron i, whose output at time t is $u_{ti}$. The model spiking neuron usually receive signals from the synapses connected to other model neuronal encoders.

FIG. 5a and FIG. 5b also show how the unsupervised covariance rule updates the weight (or strength) $D_{ij}$ of the model synapse:

$$D_{ij} \leftarrow \lambda D_{ij} + \Lambda(u_{ti} - \langle u_{ti}\rangle)(\check{v}_{tj} - \langle\check{v}_{tj}\rangle) \quad (11)$$

where $\Lambda$ is a proportional constant, $\lambda$ is a forgetting factor that is a positive number less than one, and $\langle\check{v}_{tj}\rangle$ and $\langle u_{ti}\rangle$ denote, respectively, the averages of $\langle\check{v}_{tj}\rangle$ and $\langle u_{ti}\rangle$ over time windows with preset widths. These widths may be different.

The outputs $u_{ti}$, i=1, ..., R, of the R model spiking neurons can be assembled into a vector, $u_t = [u_{t1} u_{t2} \ldots u_{tR}]'$, and the strengths DR into a R×$2^m$ matrix D whose ixj-th entry is $D_{ij}$. This matrix D is called a code covariance matrix. Using these notations, the unsupervised covariance rule can be expressed as follows:

$$D \leftarrow \lambda D + \Lambda(u_t - \langle u_t\rangle)(\check{v}_t - \langle\check{v}_t\rangle)' \quad (12)$$

If the vector pairs, $(v_s, u_s)$, s=1, ..., t, have been learned by the $2^m$ R synapses, their code covariance matrix D is $$D = \Lambda\sum_{s=1}^{t}\lambda^{t-s}(u_s - \langle u_s\rangle)(\tilde{v}_s - \langle\tilde{v}_s\rangle)' \quad (13)$$

This learning rule (11) makes the LOM more fault-tolerant and efficient than THPAM:

1. If the model spiking neuron outputting $u_{ti}$ or the neuronal node outputting $\check{v}_{tj}$ is out of order causing $u_{ti}$ or $\check{v}_{tj}$=0 or 1 or any constant for too long, then $u_{ti} - \langle u_{ti}\rangle$=0 or $v_{ti}$-

$<v_{ti}>=0$, whence $D_{ij} \leftarrow \lambda D_{ij}$ and $D_{ij}$ shrinks to zero, eliminating the effect of the faulty model spiking neuron or neuronal node.

2. If $\check{v}_{tj}$ assumes the value, 1 (or 0), significantly more often than 0 (or 1), then $<\check{v}_{tj}>$ is closer to 1 (or 0), $\check{v}_{tj}-<\check{v}_{tj}>$ is smaller for $\check{v}_{tj}=1$ (or 0) than for $\check{v}_{tj}=0$ (or 1), and D learns $\check{v}_{tj}$ with less intensity. The same happens if $u_{ti}$ assumes 1 (or 0) significantly more often than 0 (or 1). This automatically balances out the number of additions (to store 1's) to and subtractions (to store 0's) from D to avoid memory saturation at a synapse.

3. If $\check{v}_{tj}$ is replaced with an inhibitory $\check{v}_{tj}$ taking on −1 or 0, then $\check{v}_{tj}-<\check{v}_{tj}>=-(-\check{v}_{tj}-<-\check{v}_{tj}>)$, where $-\check{v}_{tj}$ is excitatory, and the orthogonality property among $\check{v}_t$ remains valid. This will be discussed more in Subsection 5.3.

These advantages of the unsupervised covariance rule are valid also for the supervised covariance rule and the unsupervised accumulation rule to be described below. In the LOM used as an artificial neural network, the formulas for the unsupervised covariance rule, (11), (12) and (13) can be replaced with $$D_{ij} \leftarrow \lambda D_{ij} + \Lambda \left(u_{ti} - \frac{1}{2}\right)\left(\check{v}_{tj} - \langle\check{v}_{tj}\rangle\right) \quad (14)$$

$$D \leftarrow \lambda D + \Lambda \left(u_t - \frac{1}{2}I\right)\left(\check{v}_t - \langle\check{v}_t\rangle\right)' \quad (15)$$

$$D = \Lambda \sum_{s=1}^{t} \lambda^{t-s}\left(u_s - \frac{1}{2}I\right)\left(\check{v}_s - \langle\check{v}_s\rangle\right)' \quad (16)$$

for less computation and more accurate estimation of the label $u_t$ once it is generated and learned by the PU, where $I=1\ 1 \ldots 1$ with R components.

How a vocabulary is built by the unsupervised covariance rule is discussed at the end of Subsubsection 5.5.7.

5.2.2 Supervised Covariance Rule

The set of sensor elements (e.g., the pixels in the CCD of a camera) whose measurements affect the inputs to a model spiking neuron is called the receptive field of the model spiking neuron. The vectors $v_t$ that are input to all the neuronal encoders that affect such inputs to a model spiking neuron have the same receptive field.

If a label $w_t$ of the cause (e.g., object or pattern) that appears in the receptive field of a spiking or nonspiking neuron is provided from outside the LOM, a supervised learning can be performed. For example, if the image or sub-image appearing in the receptive field of the neuron can be identified by a human, s/he can handcraft a label $w_t$ of the image or subimage.

FIG. 6a and FIG. 6b show how the component $\check{v}_{tj}$ and the component $w_{ti}$ of the label $w_t$ of model spiking neuron i are used to update the weight $D_{ij}$ in a model synapse ⓧ of postsynaptic model spiking neuron i for $j=1, \ldots, 2^m$.

The supervised covariance rule that updates the strength $D_{ij}$ using $\check{v}_{tj}$ and $w_{ti}$ is the following:

$$D_{ij} \leftarrow \lambda D_{ij} + \Lambda(w_{ti}-\frac{1}{2})(\check{v}_{tj}-<\check{v}_{tj}>) \quad (17)$$

for $j=1, \ldots, 2^m$ and $i=1, \ldots, R$, where $\Lambda$ and $\lambda$ are a proportion constant and a forgetting factor, and $<\check{v}_{tj}>$ denotes the average of $\check{v}_{tj}$ over a time window.

The synaptic weights (or strengths) $D_{ij}$ form an $R \times 2^m$ matrix D whose (i, j)th entry is $D_{ij}$. This matrix D is again called a code covariance matrix. Using these notations, the supervised covariance rule can be expressed as follows:

$$D \leftarrow \lambda D + \Lambda(w_t - \frac{1}{2}I)(\check{v}_t - <\check{v}_t>)' \quad (18)$$

If the pairs, $(v_s, w_s)$, $s=1, \ldots, t$, have been learned by the $R(2^m)$ synapses, their code covariance matrix D is $$D = \Lambda \sum_{s=1}^{t} \lambda^{t-s}\left(w_s - \frac{1}{2}I\right)\left(\check{v}_s - \langle\check{v}_s\rangle\right)' \quad (19)$$

Note that the update formulas, (17) and (18), and the equation (19) are the same as the update formulas, (14) and (15), and the equation (16), respectively; except that $u_t$ is respectively replaced with the label $w_t$ of $v_t$ provided from outside the LOM. In some applications, the term ½I in (17) and (18), and (19) can be replaced with $<w_{ti}>$, $<w_t>$ and $<w_s>$, respectively. In this case, the length of time interval on which the averages, $<w_{ti}>$, $<w_t>$ and $<w_s>$, are taken may be different from that for $<\check{v}_{tj}>$, $<\check{v}_t>$ and $<\check{v}_s>$.

EXAMPLE 2a

Consider a unit cube shown in FIG. 9. The vectors, $v_t$, $t=1, 2, \ldots, 8$, to be input to neuronal encoders in EXAMPLES 2a, 2b and 2c, are shown at the vertices. The signals from a teaching model spiking neuron corresponding to $v_t$, $t=1, 2, 3, 7, 8$, are available for supervised learning. They are binary digits $w_t$, $t=1, 2, 3, 7, 8$, respectively, enclosed in the square boxes. The supervised training data consists of the pairs, $(v_t, w_t)$, $t=1, 2, 3, 7, 8$. The question marks in the square boxes indicate no teaching signal is available for supervised learning.

The pairs, $(\check{v}_t', w_t)$, $t=1, 2, 3, 7, 8$, are listed as rows in the following table:

| $\check{v}'_t$ | 0 | $v_{t1}$ | $v_{t2}$ | $(v_{t2},v_{t1})$ | $v_{t3}$ | $(v_{t3},v_{t1})$ | $\phi$ $(v_{t3},v_{t2})$ | $\phi_3$ $(v_{t3},v_{t2},v_{t1})$ | $w_t$ |
|---|---|---|---|---|---|---|---|---|---|
| $\check{v}'_1$ | 0 | 0 | 0 | 0 | 0 | 0 | 0 | 0 | 0 |
| $\check{v}'_2$ | 0 | 1 | 0 | 1 | 0 | 1 | 0 | 1 | 1 |
| $\check{v}'_3$ | 0 | 0 | 1 | 1 | 0 | 0 | 1 | 1 | 1 |
| $\check{v}'_7$ | 0 | 0 | 1 | 1 | 1 | 1 | 0 | 0 | 1 |
| $\check{v}'_8$ | 0 | 1 | 1 | 0 | 1 | 0 | 0 | 1 | 1 |

Assume $\lambda=\Lambda=1$, $<\check{v}_t>=I/2$, and $<w_t>=I/2$ in (18). The code covariance matrix D is the following:

$$D = \begin{bmatrix} -\frac{3}{4} & \frac{1}{4} & \frac{3}{4} & \frac{3}{4} & \frac{1}{4} & \frac{1}{4} & -\frac{1}{4} & \frac{3}{4} \end{bmatrix} \quad (20)$$

5.2.3 Unsupervised Accumulation Rule

The $2^m$ synapses on the connections from the output terminals of a neuronal encoder to a model nonspiking neuron are updated by the unsupervised accumulation rule:

$$C \leftarrow \lambda C + \frac{\Lambda}{2}(\check{v}_t - \langle\check{v}_t\rangle)' \quad (21)$$

FIGS. 7a and 7b show a model nonspiking neuron and one of its synapses ⓧ and how the component $\check{v}_{tj}-<\check{v}_{tj}>$ of the code deviation $\check{v}_t-<\check{v}_t>$ is used to adjust $C_j$. Note that the graded output $c_t$ from the model nonspiking neuron is not feedbacked for updating the synaptic strength $C_j$. If the deviations $\check{v}_s-<\check{v}_s>$, $s=1, \ldots, t$, have been accumulated in the $2^m$ synapses, the strengths (or weights) in them are the row vector, $$C = \frac{\Lambda}{2} \sum_{s=1}^{t} \lambda^{t-s} (\tilde{v}_s - \langle \tilde{v}_s \rangle)' \quad (22)$$

This row vector C is called a code deviation accumulation vector.

EXAMPLE 2b

This is a continuation of EXAMPLE 2a. For the training data, $x_t$, t=1, 2, 3, 7, 8, from EXAMPLE 2a, which is shown in FIG. 9, the code deviation accumulation vector C is the following:

$$C = \begin{bmatrix} -\frac{5}{4} & -\frac{1}{4} & \frac{1}{4} & \frac{1}{4} & -\frac{1}{4} & -\frac{1}{4} & -\frac{3}{4} & \frac{1}{4} \end{bmatrix} \quad (23)$$

Note that the teaching signals, $w_t$, t=1, 2, 3, 7, 8, are not needed in obtaining C by the unsupervised accumulation rule (21).

The inputs to the neuronal encoder are $v_{\tau 1}$, $v_{\tau 2}$, $v_{\tau 3}$. The masking matrices M in the figure will be used in EXAMPLE 2c in Section 5.4. The outputs of the neuronal encoder are 0, $v_{\tau 1}$, $v_{\tau 2}$, $\phi(v_{\tau 2}, v_{\tau 1})$, $v_3$, $\phi(v_{\tau 3}, v_{\tau 1})$, $\phi(v_{\tau 3}, v_{\tau 2})$, $\phi_3(v_{\tau 3}, v_{\tau 2}, v_{\tau 1})$. For the synapses preceding the model spiking neuron to perform supervised covariance learning, the selection lever represented by the thick line segment with a circle at its end is placed in the top position to receive a teaching signal $r_\tau$ provided from outside. For these synapses to perform unsupervised covariance learning, the lever is placed in the bottom position to receive a spike or nonspike $v\{p_\tau\}$ output from the model spiking neuron. For these synapses to perform no learning, the lever is placed in the middle position to receive the signal ½. The selection lever of a biological synapse is usually permanently set at one position for one type of learning. It is not clear if a biological synapse can perform supervised, unsupervised, and no learning alternately.

In FIG. 11, the model nonspiking neuron and model spiking neuron share the same neuronal encoder and its outputs. This is not necessary in modeling biological neural networks. As long as the model nonspiking neuron and model spiking neuron jointly provide enough information to produce a good estimate of the empirical probability distribution, they may have different neuronal encoders.

5.3 Empirical Probabilities Learned

The purpose of this Subsection is to show that an artificial neuronal encoder and the Hebbian-type learning rules disclosed in the last two Subsections working together are able to learn empirical probability distributions of the labels of the vectors input to the artificial neuronal encoder.

Once a vector $v_\tau$ is received by a neuronal encoder, $v_\tau$ is encoded by the neuronal encoder into $\check{v}_\tau$, which is made available to synapses for learning as well as retrieving of a point estimate of the label ($u_t$ or $w_t$) of the input $v_\tau$, whether the label has been learned by the unsupervised covariance rule or the supervised covariance rule. This label of $v_\tau$, which may be $u_t$ or $w_t$ as defined in the preceding Subsection, is denoted by $r_\tau$. Recall that learned information is stored in the code covariance matrices, D and C. Upon the arrival of $\check{v}_\tau$, the following products, $d_\tau^o$ and $c_\tau^o$, are computed by the synapses preceding the R model spiking neurons and 1 model nonspiking neuron as shown in c° 8:

$$d_\tau^o = D(\check{v}_\tau - \langle \check{v}_\tau \rangle) \quad (24)$$

$$c_\tau^o = C(\check{v}_\tau - \langle \check{v}_\tau \rangle) \quad (25)$$

where $d_\tau^o$ is an R-dimensional vector and $c_\tau^o$ is a scalar. Recall that $\check{v}_t = [\check{v}_{t1} \ldots \check{v}_{t2^m}]'$ is called a neuronal code, and $\langle \check{v}_t \rangle = [\langle \check{v}_{t1} \rangle \ldots \langle \check{v}_{t2^m} \rangle]'$ denotes an average of $\check{v}_t$ over a time window $[t-q_v+1, t]$ with width $q_v$, which is preset in consideration of the size the maximum size of the clusters formed using the unsupervised covariance rule to be described for the application. $\check{v}_t - \langle \check{v}_t \rangle$ is called a code deviation vector. It is the deviation of a neuronal code $v_t$ from a neuronal code average $\langle \check{v}_t \rangle$.

To gain some intuitive understanding of the meanings of $d_\tau^o$ and $c_\tau^o$, let us assume that $\lambda = \Lambda = 1$, and that the averages, $\langle w_t \rangle$ and $\langle \check{v}_\tau \rangle$, are all equal to I/2. Here, I=[1 1 ... 1]', which we note is not the identity matrix I. Let $r_s$ be an R-dimensional binary vector. Noting that the time average of a biological spike train is usually close to ½ and that the forgetting factor $\lambda$ is believed to be very close to 1. The only problem with the assumption is that $\check{v}_{s1} = 0$ and hence $\langle \check{v}_{s1} \rangle = 0 \neq ½$. If the dimensionality of the vector $\check{v}_s$ is large, the effect of missing this one term of ½ is negligible. Nevertheless, it would be interesting to see whether and how this one term exists in biological neural networks.

Under the above assumptions, $$d_\tau^o = \Lambda \sum_{s=1}^{t} (r_s - \langle r_s \rangle)(\tilde{v}_s - \langle \tilde{v}_s \rangle)'(\tilde{v}_\tau - \langle \tilde{v}_\tau \rangle)$$

$$= \Lambda \sum_{s=1}^{t} \left(r_s - \frac{1}{2}I\right)\left(\tilde{v}_s - \frac{1}{2}I\right)'\left(\tilde{v}_\tau - \frac{1}{2}I\right)$$

and $$c_\tau^o = \frac{\Lambda}{2} \sum_{s=1}^{t} (\tilde{v}_s - \langle \tilde{v}_s \rangle)'(\tilde{v}_\tau - \langle \tilde{v}_\tau \rangle)$$

$$= \frac{\Lambda}{2} \sum_{s=1}^{t} \left(\tilde{v}_s - \frac{1}{2}I\right)'\left(\tilde{v}_\tau - \frac{1}{2}I\right)$$

Under the further assumption that $v_s$ and $v_\tau$ are binary vectors, by (7) and (8), which are proven in the APPENDIX, if $v_s \neq v_\tau$, then $$(\check{v}_s - ½I)'(\check{v}_\tau - ½I) = 0 \quad (26)$$

and if $v_s = v_\tau$, then $$(\check{v}_s - ½I)'(\check{v}_\tau - ½I) = 2^{m-2} \quad (27)$$

Therefore, under the above assumptions and the assumption that $v_s$ and $v_\tau$ are binary vectors, for j=1, ..., R, $$d_{\tau j}^o = \Lambda \left( \sum_{\substack{s=1 \\ v_s = v_\tau, r_{sj}=1}}^{t} + \sum_{\substack{s=1 \\ v_s = v_\tau, r_{sj}=0}}^{t} \right)\left(r_{sj} - \frac{1}{2}\right)2^{m-2}$$

$$= \Lambda \sum_{\substack{s=1 \\ v_s = v_\tau, r_{sj}=1}}^{t} \left(\frac{1}{2}\right)2^{m-2} + \Lambda \sum_{\substack{s=1 \\ v_s = v_\tau, r_{sj}=0}}^{t} \left(-\frac{1}{2}\right)2^{m-2}$$

$$= 2^{m-3}\Lambda |\{v_s \mid v_s = v_\tau, r_{sj} = 1, s \in \{1, \ldots, t\}\}| -$$

$$2^{m-3}\Lambda |\{v_s \mid v_s = v_\tau, r_{sj} = 0, s \in \{1, \ldots, t\}\}|$$

-continued and $$c_\tau^o = \frac{\Lambda}{2} \sum_{\substack{s=1 \\ v_s = v_\tau}}^{t} 2^{m-2}$$

$$= 2^{m-3}\Lambda|\{v_s \mid v_s = v_\tau, s \in \{1, \ldots, t\}\}|$$

$$= 2^{m-3}\Lambda|\{v_s \mid v_s = v_\tau, r_{sj} = 1, s \in \{1, \ldots, t\}\}| + 2^{m-3}\Lambda|\{v_s \mid v_s = v_\tau, r_{sj} = 0, s \in \{1, \ldots, t\}\}|$$

where $|S|$ denotes the number of elements in the set S.

Denoting $(c_\tau^o + d_{\tau j}^o)/2$ by $a_{\tau j}^o$, $$\frac{a_{\tau j}^o}{c_\tau^o} = \frac{|\{v_s \mid v_s = v_\tau, r_{sj} = 1, s \in \{1, \ldots, t\}\}|}{|\{v_s \mid v_s = v_\tau, s \in \{1, \ldots, t\}\}|}$$

This is the relative frequency that $r_{sj}=1$ has been learned for $v_s = v_\tau$ for $s=1, \ldots, t$. Let $a_\tau^o = [a_{\tau 1}^o \ a_{\tau 2}^o \ldots a_{\tau R}^o]'$. Then $a_\tau^o/c_\tau^o$ is a relative frequence distribution of $r_\tau$ given $v_\tau$.

$v_\tau$ may be shared by more than one cause (or pattern) and may contain corruption, distortion, occlusion or noise caused directly or indirectly by the sensor measurements such as image pixels and sound recordings. In this case, the label $r_\tau$ of $v_\tau$ should be a random variable, which can be described or represented only by an empirical probability distribution (or a relative frequency distribution). On the other hand, $v_\tau$ may contain parts from more than one cause. In this case, the label $r_\tau$ of $v_\tau$ should be a fuzzy variable, which can be described or represented only by its membership function as defined in the fuzzy set theory. Fortunately, both the probabilities and membership degrees range between zero and one. The former can be learned mainly as relative frequencies over time and the latter mainly as relative proportions in each $v_\tau$ as represented by relative frequencies. $a_{\tau j}^o/c_\tau^o$ evaluated above is a relative frequency representing a probability or a membership degree. The three learning rules in the preceding Subsection facilitate learning both the empirical probabilities and membership degrees and sometimes a combination thereof. For simplicity, the membership degree and membership function will also be referred to as empirical probability and empirical probability distribution in the present invention disclosure. The fact that the empirical probability distribution (or membership function) of the label $r_\tau$ can be retrieved from the synapses is striking, but mathematically and naturally necessary.

If any number of components in $v_\tau$ change their signs and the corresponding components in $\check{v}_s$ and I change their signs, then the orthogonality property, (7) and (8), still holds. If $\check{v}_{tq}$ is inhibitory, the qth component of $\check{v}_s - \langle\check{v}_s\rangle$ and $\check{v}_\tau - \langle\check{v}_\tau\rangle$ change their signs. If additionally $(\check{v}_s)'(\check{v}_\tau) = -1/2$, then $a_\tau^o/c_\tau^o$ above is still the relative frequency that $r_{sj}=1$ has been learned for $v_s=v_\tau$. In general, $a_{\tau j}^o/c_\tau^o$ above is this relative frequency regardless of how many of the neuronal encoder' outputs $\check{v}_t$ are inhibitory.

The above empirical-probability and membership-degree interpretation of $a_\tau^o/c_\tau^o$ are valid, only if all the vectors $v_t$, $t=1, 2, \ldots$, input to the neuronal encoder are binary vectors or nearly binary vectors. Biological spiking neurons emit spike trains, where a spike and a nonspike can be looked upon as nearly binary digits. Therefore, the output vectors of a biological neuronal encoder, whose components are spikes and nonspikes, are nearly orthogonal.

EXAMPLE 1b

This example is a continuation of EXAMPLE 1a. With the v and u from EXAMPLE 1a, let a supervised training data set consists of 8 copies of u with label 1 and 2 copies of u with label 0; and 3 copies of v with label 1 and 27 copies of v with label 0. By (19) and (22), this supervised training data set is learned with $\lambda = \Lambda = 1$ (in (19) and (22)) to form the code covariance matrix D and the code deviation accumulation vector C:

$$D = \tfrac{1}{2}(8-2)(\check{u}-\tfrac{1}{2}I)' + \tfrac{1}{2}(3-27)(\check{v}-\tfrac{1}{2}I)'$$

$$C = \tfrac{1}{2}(8+2)(\check{u}-\tfrac{1}{2}I)' + \tfrac{1}{2}(3+27)(\check{v}-\tfrac{1}{2}I)'$$

By (7) and (8), $D(\check{u}-\tfrac{1}{2}I)=3(4)$, $C(\check{u}-\tfrac{1}{2}I)=5(4)$, $D(\check{v}-\tfrac{1}{2}I)=-12(4)$, $C(\check{v}-\tfrac{1}{2}I)=15(4)$. It follows that $(D(\check{u}-\tfrac{1}{2}I)+C(\check{u}-\tfrac{1}{2}I))/(2C(\check{u}-\tfrac{1}{2}I))=8/10$ is the relative frequency that u has been learned with label 1; and $1-8/10=2/10$ is the relative frequency that a has been learned with label 0. Similarly, $(D(\check{v}-\tfrac{1}{2}I)+C(\check{v}-\tfrac{1}{2}I))/(2C(\check{v}-\tfrac{1}{2}I))=3/30$ is the relative frequency that v has been learned with label 1; and $1-3/30=27/30$ is the relative frequency that v has been learned with label 0.

5.4 Masking Factors for Maximal Generalization

Let a vector $v_\tau$ that deviates, due to corruption, distortion or occlusion, from each of the vectors $v_s$ that have been learned by the synapses on an artificial neuronal encoder be presented to the neuronal encoder. The neuronal encoder and its synapses are said to have a maximal generalization capability in their retrieval of information, if they are able to automatically find the largest subvector of $v_\tau$ that matches at least one subvector among the vectors $v_s$ stored in the synapses and enable post-synaptic neurons to generate an empirical probability distribution of the label of the largest subvector. This maximal capability is achieved by the use of a masking matrix described in this Subsection. A biological interpretation of such a matrix is given at the end of this Subsection.

The following are recursive formulas for expanding bipolar binary vectors $a=[a_1 \ a_2 \ldots a_m]'$ into an orthogonal expansion:

$$\hat{a}(1) = [1 \ a_1]'$$

$$\hat{a}(1, \ldots, j+1) = [\hat{a}'(1, \ldots, j) \ a_{j+1}\hat{a}'(1, \ldots, j)]' \text{ for } j=1, \ldots, m-1$$

$$\hat{a} = \hat{a}(1, \ldots, m) \quad (28)$$

$\hat{a}$ is called the orthogonal expansion of a. For example, if $a=[a_1 \ a_2 \ a_3]$, then $$\hat{a} = [1 \ a_1 \ a_2 \ a_2a_1 \ a_3 \ a_3a_1 \ a_3a_2 \ a_3a_2a_1]$$

Let us denote the vector $a=[a_1 \ a_2 \ldots a_m]'$ with its $i_1$-th, $i_2$-th, $\ldots$, and $i_j$-th components set equal to 0 by $a(i_1^-, i_2^-, \ldots, i_j^-)$, where $1 \le i_1 < i_2 < \ldots < i_j \le m$, and the neuronal and orthogonal expansions of $a(i_1^-, i_2^-, \ldots, i_j^-)$ by $\check{a}(i_1^-, i_2^-, \ldots, i_j^-)$ and $\hat{a}(i_2^-, i_2^-, \ldots, i_j^-)$, respectively. Denoting the m-dimensional vector $[1 \ 1 \ldots 1]'$ by I, the vector I with its $i_1$-th, $i_2$-th, $\ldots$, and $i_j$-th components set equal to 0 is $I(i_1^-, i_2^-, \ldots, i_j^-)$ and the orthogonal expansion of $I(i_1^-, i_2^-, \ldots, i_j^-)$ is $\hat{I}(i_1^-, i_2^-, \ldots, i_j^-)$. For example, if $I=[1 \ 1 \ 1]'$, then $$\hat{I}(1^-) = [1 \ 0 \ 1 \ 0 \ 1 \ 0 \ 1]$$

$$\hat{I}(2^-) = [1 \ 1 \ 0 \ 0 \ 1 \ 1 \ 0 \ 0]$$

$$\hat{I}(3^-) = [1 \ 1 \ 1 \ 1 \ 0 \ 0 \ 0 \ 0] \quad (29)$$

Notice that for the vector $a=[a_1\ a_2\ a_3]'$, $$\check{a}(1^-)=[0\ 0\ a_2 0\ a_3\ 0\ \phi(a_3,a_2)\ 0]=(diag\hat{I}(1^-))\check{a}$$

$$\check{a}(2^-)=[0\ a_1\ 0\ 0\ a_3\ \phi(a_3,a_1)\ 0\ 0]=(diag\hat{I}(2^-))\check{a}$$

$$\check{a}(3^-)=[0\ a_1\ a_2\ \phi(a_2,a_1)\ 0\ 0\ 0\ 0]=(diag\hat{I}(3^-))\check{a}$$

In general, for the vector $a=[a_1\ a_2\ \ldots\ a_m]'$, $$\check{a}(i_1^-,i_2^-,\ldots,i_j^-)=(diag\hat{I}(i_1^-,i_2^-,\ldots,i_j^-))\check{a} \quad (10)$$

Notice that $diag\hat{I}(i_1^-, i_2^-, \ldots, i_j^-)$ eliminates components in $\check{a}$ that involve $a_{i_1}, a_{i_2}, \ldots, a_{i_j}$. Therefore, $diag\hat{I}(i_1^-, i_2^-, \ldots, i_j^-)$ is called a masking matrix.

An important property of the masking matrix $diag\hat{I}(i_1^-, i_2^-, \ldots, i_j^-)$ is the following: Assume that $v_s$ and $v_\tau$ are binary vectors. If $$\left(diag\hat{I}(i_1^-, i_2^-, \ldots, i_j^-)\right)\left(\check{v}_s - \frac{1}{2}I\right) =$$

$$\left(diag\hat{I}(i_1^-, i_2^-, \ldots, i_j^-)\right)\left(\check{v}_\tau - \frac{1}{2}I\right)$$

then $$(\check{v}_s - \langle\check{v}_s\rangle)'(diag\hat{I}(i_1^-, i_2^-, \ldots, i_j^-))(\check{v}_\tau - \langle\check{v}_\tau\rangle) - 2^{m-2-j}. \quad (30)$$

If $$\left(diag\hat{I}(i_1^-, i_2^-, \ldots, i_j^-)\right)\left(\check{v}_s - \frac{1}{2}I\right) \neq$$

$$\left(diag\hat{I}(i_1^-, i_2^-, \ldots, i_j^-)\right)\left(\check{v}_\tau - \frac{1}{2}I\right)$$

then $$(\check{v}_s - \langle\check{v}_s\rangle)'(diag\hat{I}(i_1^-, i_2^-, \ldots, i_j^-))(\check{v}_\tau - \langle\check{v}_\tau\rangle) = 0 \quad (31)$$

Using this property, we combine all such masking matrices that set less than or equal to a selected positive integer J of components of $v_s$ equal to zero into the following masking matrix $$M = I + \sum_{j=1}^{J}\sum_{i_j=j}^{m}\ldots\sum_{i_2=2}^{i_3-1}\sum_{i_1=1}^{i_2-1} 2^{-\eta j} 2^j diag\hat{I}(i_1^-, i_2^-, \ldots, i_j^-) \quad (32)$$

where $2^j$ is used to compensate for the factor $2^{-j}$ in $2^{m-2-j}$ in the important property (30), and $2^{-\eta j}$ is a weight selected to differentiate between different levels $j$ of maskings. Note that the masking matrix M is a diagonal matrix, whose diagonal entries $M_{jj}$ are called masking factors.

The formulas (24) and (25) together with M constitute the following decovariance rules:

$$d_\tau = DM(\check{v}_\tau - \langle\check{v}_\tau\rangle) \quad (33)$$

$$c_\tau = CM(\check{v}_\tau - \langle\check{v}_\tau\rangle) \quad (34)$$

which are equivalent to $$d_{\tau kj} = D_{kj}M_{jj}(\check{v}_{\tau j} - \langle\check{v}_{\tau j}\rangle) = M_{jj}D_{kj}(\check{v}_{\tau j} - \langle\check{v}_{\tau j}\rangle)$$

$$c_{\tau j} = C_j M_{jj}(\check{v}_{\tau j} - \langle\check{v}_{\tau j}\rangle) = M_{jj}C_j(\check{v}_{\tau j} - \langle\check{v}_{\tau j}\rangle)$$

for $k=1,\ldots,R$ and $j=1,\ldots,2^m$. $c^\circ$ 10 illustrates synapses and a masking factor retrieve information about the vector $v_\tau$ input to the neuronal encoder according to the above decovariance rules.

Note that for $k=1, \ldots, R$, we have the following:

If $C(\check{v}_\tau - \langle\check{v}_\tau\rangle) \neq 0$, then $$D_k(\check{v}_\tau - \langle\check{v}_\tau\rangle) \approx D_k M(\check{v}_\tau - \langle\check{v}_\tau\rangle)$$

$$C(\check{v}_\tau - \langle\check{v}_\tau\rangle) \approx CM(\check{v}_\tau - \langle\check{v}_\tau\rangle)$$

If $C(\check{v}_\tau - \langle\check{v}_\tau\rangle) = 0$, but $C\sum_{i_1=1}^{m}(diag\hat{I}(i_1^-))(\check{v}_\tau - \langle\check{v}_\tau\rangle) \neq 0$, then $$D_k\sum_{i_1=1}^{m}(diag\hat{I}(i_1^-))(\check{v}_\tau - \langle\check{v}_\tau\rangle) \approx D_k M(\check{v}_\tau - \langle\check{v}_\tau\rangle)$$

$$C\sum_{i_1=1}^{m}(diag\hat{I}(i_1^-))(\check{v}_\tau - \langle\check{v}_\tau\rangle) \approx CM(\check{v}_\tau - \langle\check{v}_\tau\rangle)$$

If $C(\check{v}_\tau - \langle\check{v}_\tau\rangle) = 0$, $C\sum_{i_1=1}^{m}(diag\hat{I}(i_1^-))(\check{v}_\tau - \langle\check{v}_\tau\rangle) = 0$, but $C\sum_{i_2=2}^{m}\sum_{i_1=1}^{i_2-1}(diag\hat{I}(i_1^-, i_2^-))(\check{v}_\tau - \langle\check{v}_\tau\rangle) \neq 0$, then $$D_k\sum_{i_2=2}^{m}\sum_{i_1=1}^{i_2-1}(diag\hat{I}(i_1^-, i_2^-))(\check{v}_\tau - \langle\check{v}_\tau\rangle) \approx D_k M(\check{v}_\tau - \langle\check{v}_\tau\rangle)$$

$$C\sum_{i_2=2}^{m}\sum_{i_1=1}^{i_2-1}(diag\hat{I}(i_1^-, i_2^-))(\check{v}_\tau - \langle\check{v}_\tau\rangle) \approx CM(\check{v}_\tau - \langle\check{v}_\tau\rangle)$$

Continuing in this manner, it is seen that $D_k M(\check{v}_\tau - \langle\check{v}_\tau\rangle)$ and $CM(\check{v}_\tau - \langle\check{v}_\tau\rangle)$ always use the greatest number of uncorrupted, undistorted or unoccluded components of $v_\tau$ in estimating $d_{\tau k}$, $c_\tau$, and $a_{\tau k}$. The vector $a_{\tau j}/c_\tau$ is now an estimate of the conditional empirical probability distribution of $r_\tau$ given $v_\tau$, using the greatest number of uncorrupted, undistorted or unoccluded components of $v_\tau$.

If some terms in (32) are missing, the generalization effect of M degrades only gracefully. The example weight $2^{-5j}$ in (32) is used to illustrate M generalizing maximally in EXAMPLE 2c. The weight is believed to be $2^{-j}$ in biological neural networks for a reason to be discussed. J in (32) is believed to vary from brain region to brain region. The range of J can be found by biological experiments.

EXAMPLE 2c

Let the code covariance matrices, D and C, be those obtained in EXAMPLE 2a and EXAMPLE 2b. Using (29), we construct the masking matrix by the formula (32) for J=1, $$M = I + 2^{-5} 2 diag(\hat{I}(1^-) + \hat{I}(2^-) + \hat{I}(3^-)) \quad (35)$$

$$= I + 2^{-4} diag[3\ 2\ 2\ 1\ 2\ 1\ 1\ 0]$$

Recall that with the masking matrix M, we use $d_{\tau j} = D_{\tau j}M(\check{v}_\tau - \langle\check{v}_\tau\rangle)$ and $c_\tau = C_\tau M(\check{v}_\tau - \langle\check{v}_\tau\rangle)$ in general, where $D_j$ denotes the jth row of D. If $c_\tau \neq 0$, the empirical probability $p_{\tau j} = (d_{\tau j}/c_\tau + 1)/2$. The masking matrix M for this example is shown in FIG. 11.

Assume that $\check{v}_1$ is presented to the synapses containing the code covariance matrices through M. By matrix multiplication, $$DM(\check{v}_1 - \langle\check{v}_1\rangle) = -1 + 2^{-4}(-\frac{1}{2}) = -1.0312$$

$$CM(\check{v}_1 - \langle\check{v}_1\rangle) = 1 + 2^{-4}(5/2) = 1.1563$$

The empirical probability the label of $v_4$ is 1 is $(DM(\check{v}_1-\langle\check{v}_1\rangle)/(CM(\check{v}_1-\langle\check{v}_1\rangle))+1)/2=0.054$, and the empirical probability that the label of $v_4$ is 0 is 0.946. Note that $v_1$ with a label of 0 has been learned. The empirical probability that the label of $v_4$ is 0 should be 1. The use of M causes a very small amount of error to the empirical probability, which can be controlled by changing the weight, $2^{-5}$.

The neuronal codes of the three vertices, $v_4$, $v_5$ and $v_6$, of the cube in FIG. 9, which are not included in the supervised learning data, are listed as follows:

| $\check{v}'_t$ | 0 | $v_{t1}$ | $v_{t2}$ | $\phi$ $(v_{t2}, v_{t1})$ | $v_{t3}$ | $\phi$ $(v_{t3}, v_{t1})$ | $\phi$ $(v_{t3}, v_{t2})$ | $\phi$ $(v_{t3}, v_{t2}, v_{t1})$ |
|---|---|---|---|---|---|---|---|---|
| $\check{v}'_4$ | 0 | 1 | 1 | 0 | 0 | 1 | 1 | 0 |
| $\check{v}'_5$ | 0 | 0 | 0 | 0 | 1 | 1 | 1 | 1 |
| $\check{v}'_6$ | 0 | 1 | 0 | 1 | 1 | 0 | 1 | 0 |

Simple matrix-vector multiplication yields $D(\check{v}_t-\langle\check{v}_t\rangle)=0$ and $C(\check{v}_t-\langle\check{v}_t\rangle)=0$ for t=4, 5, 6. Hence no information is provided on $v_t$ by $D(\check{v}_t-\langle\check{v}_t\rangle)$ and $C(\check{v}_t-\langle\check{v}_t\rangle)$ for t=4, 5, 6. This shows that if $v_t$ has not been learned, then generalization is necessary to get information on it from the code covariance matrices.

Assume that $v_4$ is presented to the synapses containing the code covariance matrices. By matrix multiplication, $$DM(\check{v}_4-\langle\check{v}_4\rangle)=0+2^{-10}(9+2+6-3-2+1-1)=2^{-10}(12)$$

$$CM(\check{v}_4-\langle\check{v}_4\rangle)=0+2^{-10}(15-2+2-1+2-1-3)=2^{-10}(12)$$

The empirical probability the label of $v_4$ is 1 is $(DM(\check{v}_4-\langle\check{v}_4\rangle)/(CM(\check{v}_4-\langle\check{v}_4\rangle))+1)/2=1$. From FIG. 9, we see that all the three vertices neighboring $v_4$ have been learned and have a label of 1. It is a good generalization that a label of 1 is assigned to $v_4$.

Assume that $\check{v}_6$ is presented to the code covariance matrices. By matrix multiplication, $$DM(\check{v}_6-\langle\check{v}_6\rangle)=0+2^{-7}(9+2-6+3+2-1-1)=2^{-7}(8) \quad (36)$$

$$CM(\check{v}_6-\langle\check{v}_6\rangle)=0+2^{-7}(15-2+2-1+2-1-3)=2^{-7}(8) \quad (37)$$

The empirical probability the label of $v_6$ is 1 is $(DM(\check{v}_6-\langle\check{v}_6\rangle)/(CM(\check{v}_6-\langle\check{v}_6\rangle))+1)/2=1$. From FIG. 9, we see that only two vertices neighboring $v_4$ have been learned, and they both have a label of 1. It is a good generalization that a label of 1 is assigned to $v_6$.

Assume that $\check{v}_5$ is presented to the synapses containing the code covariance matrices. By matrix multiplication, $$DM(\check{v}_5-\langle\check{v}_5\rangle)=0+2^{-7}(9-2-6-3+2+1-1)=2^{-7}(0)$$

$$CM(\check{v}_5-\langle\check{v}_5\rangle)=0+2^{-7}(15+2-2-1-2-1-3)=2^{-7}(8)$$

The empirical probability the label of $v_5$ is 1 is $(DM(\check{v}_5-\langle\check{v}_5\rangle)/(CM(\check{v}_5-\langle\check{v}_5\rangle))+1)/2=\frac{1}{2}$. From FIG. 9, we see that only two vertices neighboring $v_4$ have been learned, and one of them has a label of 1, and the other has a label of 0. No generalization is possible. A label of 1 is assigned to $v_6$ with an empirical probability of $\frac{1}{2}$ and that a label of 0 is assigned to $v_6$ with equal empirical probability.

The above example shows that the weight $2^{-5j}$ in (32) is more than adequate to differentiate between different levels j of maskings for a neuronal encoder with only 3 inputs. The greater the number m of inputs to a neuronal encoder, the less two adjacent levels, j and j+1, of maskings need to be differentiated. For example, if the number m of components in the input vector is 12, any 11 of the 12 components should be almost as good as the 12 in determining the label of the input vector. A reduction by 50% of emphasis on the subvector is usually adequate.

Therefore, if m is 12 or larger, the weight $2^{-nj}$ in (32) can be set equal to $2^{-j}$ so that the reduction of emphasis by 50% from level j+1 and j is adequate. In this case, the masking matrix M is a mathematical idealization and organization of a large number of neuronal trees with nested and overlapped inputs. The following example illustrates this biological interpretation of the masking matrix M with the weight being $2^{-j}$ in (32).

EXAMPLE 3

Using (29), we construct the masking matrix by the formula (32) for J=1, $$M = I + 2^{-1} 2 diag(\hat{I}(1^-) + \hat{I}(2^-) + \hat{I}(3^-)) \quad (38)$$
$$= I + diag \hat{I}(1^-) + diag \hat{I}(2^-) + diag \hat{I}(3^-)$$

In the product $$M\check{v}_\tau = \check{v}_\tau + (diag\hat{I}(1^-))\check{v}_\tau + (diag\hat{I}(2^-))\check{v}_\tau + (diag\hat{I}(3))\check{v}_\tau$$

$(diag\hat{I}(k^-))\check{v}_\tau$ eliminates all terms in $\check{v}_\tau$ that contain $v_{\tau k}$ and can be viewed as the output vector of a model neuronal encoder for k=1, 2, 3. These model neuronal encoders are shown in FIG. 13. $M\check{v}_\tau$ can be viewed as the sum of the output vectors from four model neuronal encoders with nested and overlapped input vectors, $v_\tau=[v_{\tau 1}\ v_{\tau 2}\ v_{\tau 3}]'$, $[v_{\tau 2}\ v_{\tau 3}]'$, $[v_{\tau 1}\ v_{\tau 3}]'$, and $[v_{\tau 1}\ v_{\tau 2}]'$.

The difference between FIGS. 5a-7a and FIGS. 5b-7b is that the former do not contain the masking matrix, but the latter do. The above biological interpretation of the masking matrix explains said difference. In other words, while biologically there is no masking factor being multiplied to a synapse output as shown in FIG. 5a-7a, a large number of biological neuronal encoders with nested and overlapped inputs are mathematically idealized and organized to have the effect of the masking factor as shown in FIGS. 5b-7b.

5.5 Processing Units (PUs)

The LOM (low-order model) disclosed in the present invention disclosure is a network of processing units. A processing unit comprises model neuronal encoders, model synapses, masking matrices, a model nonspiking neuron and a number of model spiking neurons. Let us denote the vector input to the PU at time or numbering t, the number of model neuronal encoders in the PU and the number of model spiking neurons in the PU by $v_t$, R and $\Psi$, respectively.

5.5.1 Multiple Model Neuronal Encoders and General Neuronal Codes

Recall that if $v_t=[v_{t1}\ v_{t2}\ \ldots\ v_{tN}]$, then the neuronal code $\check{v}_t$ of $v_t$ is $2^N$ dimensional. If there were only one neuronal encoder in a PU, there would be two difficulties. First, $2^N$ grows exponentially as N increases. Second, a large number of terms in the masking matrix M in (32) are required for masking even a small proportion J/N of the components of $v_t$ if N is large. These difficulties motivated the use of $\Psi$ model neuronal encoders.

Let $v_t(\psi)$, $\psi=1, \ldots, \Psi$, be subvectors of $v_t$, where the components of $v_t(\psi)$ are randomly selected from those of $v_t$ such that the union of all the components of $v_t(\psi)$, $\psi=1, \ldots, \Psi$, is the set of components of $v_t$. The subvectors $v_t(\psi)$, $\psi=1, \ldots, \Psi$, are encoded by the $\Psi$ model neuronal encoders into neuronal codes $\check{v}_t(\psi)$, $\psi=1, \ldots, \Psi$. Their averages over a time window $[t-q_v+1, t]$ of width $q_v$ are denoted by $<\check{v}_t(\psi)>$, $\psi=1, \ldots, \Psi$. We assemble these vectors into $$\check{v}_t = [\check{v}_t'(1)\ \check{v}_t'(2) \ldots \check{v}_t'(\Psi)]' \tag{39}$$

$$<\check{v}_t> = [<\check{v}_t'(1)> <\check{v}_t'(2)> \ldots <\check{v}_t'(\Psi)>]' \tag{40}$$

Notice that $\check{v}_t$ here is not the neuronal code of $v_t$ defined in (5), but consists of the neuronal codes of the $\Psi$ subvectors. $\check{v}_t$ and $<\check{v}_t>$ above are called a general neuronal code of $v_t$ and an average general neuronal code respectively. This dual use of the symbol $\check{v}_t$ is not expected to cause confusion. Note that the vectors $v_t(\psi)$, $\psi=1, \ldots, \Psi$, may have common components and different dimensionalities, dim $v_t(\psi)$, $\psi=1, \ldots, \Psi$, but every component of $v_t$ is included in at least one $v_t(\psi)$. Equally importantly, the components of $v_t(\psi)$ are selected at random from those of the vector $v_t$ input to the PU. The difference $\check{v}_t - <\check{v}_t>$ between the general neuronal code of $v_t$ and the average general neuronal code is called the general code deviation vector.

5.5.2 General Code Covariance Matrix, General Code Deviation Accumulation Vector and General Masking Matrix For the neuronal codes, $\check{v}_t(\psi)$, $\psi=1, \ldots, \Psi$, let the corresponding code covariance matrices be denoted by $D(\psi)$, $\psi=1, \ldots, \Psi$; and let the corresponding code deviation accumulation vectors be denoted by $C(\psi)$, $\psi=1, \ldots, \Psi$; and the corresponding masking matrices be denoted by $M(\psi)$, $\psi=1, \ldots, \Psi$. We assemble these matrices into $$D = [D(1)\ D(2) \ldots D(\Psi)] \tag{41}$$

$$C = [C(1)\ C(2) \ldots C(\Psi)] \tag{42}$$

$$M = \mathrm{diag}[M(1)\ M(2) \ldots M(\Psi)] \tag{43}$$

Here D and C are respectively called general code covariance matrix and general code deviation accumulation vector, and M is called the general masking matrix for the $\Psi$ neuronal encoders. Note that D, C and M above are not those defined for $2^{\dim\ v_t}$-dimensional neuronal codes of the vector $v_t$ input to the PU. The dual use of the symbols here is not expected to cause confusion either. The general masking matrix M is a diagonal matrix, whose diagonal entries are called masking factors.

D, C and M above are $R \times \Sigma_{\psi=1}^{\Psi} 2^{\dim\ v_t(\psi)}$, $1 \times \Sigma_{\psi=1}^{\Psi} 2^{\dim\ v_t(\psi)}$, and $\Sigma_{\psi=1}^{\Psi} 2^{\dim\ v_t(\psi)} \times \Sigma_{\psi=1}^{\Psi} 2^{\dim\ v_t(\psi)}$ matrices, respectively. Note that by choosing dim $v_t(\psi)$ smaller than dim $v_t$, $2^{\dim\ v_t(\psi)}$ is much smaller than $2^{\dim\ v_t}$, and the dimensionalities of the general code covariance matrix D, general code deviation accumulation vector C, and the general masking matrix M are much smaller than those obtained from using $2^{\dim\ v_t}$-dimensional neuronal codes of the vector $v_t$ input to the PU. Therefore, the two aforementioned difficulties with a single neuronal encoder with a $2^{\dim\ v_t}$-dimensional output vector are alleviated by the use of multiple neuronal encoders in a PU. A third advantage of multiple neuronal encoders in a PU is the enhancement of generalization capability: If the neuronal code from one neuronal encoder fails to retrieve any useful information from a general code covariance matrix and a code deviation accumulation matrix, other neuronal codes from other neuronal encoders may still retrieve enough information for detecting and recognizing the vector $v_t$ input to the PU.

An example model spiking neuron with its masking matrix M, synapses, and two neuronal encoders for unsupervised covariance learning in a PU is shown in FIG. 15. The two neuronal encoders input subvectors, $v_\tau(1)$ and $v_\tau(2)$, of the vector $v_\tau$ input to the PU.

We stress that in describing a PU, the symbols, $v_t$, $\check{v}_t$, D, C, and M, denote the vector input to the PU, the general neuronal code, the general code covariance matrix, the general code deviation accumulation vector, and the general masking matrix respectively, unless indicated otherwise.

5.5.3 Processing Neuronal Codes

By the information retrieval formula, (33) and (34), applied to each of the $\Psi$ neuronal encoder, its synapses, the masking matrices $M(\psi)$, and the model spiking and nonspikeing neurons; upon the arrival of $v_\tau$ the following products, $d_\tau(\psi)$ and $c_\tau(\psi)$, $\psi=1, \ldots, \Psi$, are obtained for $\psi=1, \ldots, \Psi$:

$$d_\tau(\psi) = D(\psi) M(\psi)(\check{v}_\tau(\psi) - <\check{v}_\tau(\psi)>) \tag{44}$$

$$c_\tau(\psi) = C(\psi) M(\psi)(\check{v}_\tau(\psi) - <\check{v}_\tau(\psi)>) \tag{45}$$

which are a vector with R components and a scalar, respectively. Redefine the symbols $d_\tau$, $c_\tau$ and $a_\tau$ by $$d_\tau = DM(\check{v}_\tau - \langle \check{v}_\tau \rangle) = \sum_{\psi=1}^{\Psi} d_\tau(\psi) \tag{46}$$

$$c_\tau = CM(\check{v}_\tau - \langle \check{v}_\tau \rangle) = \sum_{\psi=1}^{\Psi} c_\tau(\psi) \tag{47}$$

$$a_\tau = (d_\tau + c_\tau I)/2 \tag{48}$$

$$I = [1\ 1\ \ldots\ 1]' \tag{49}$$

Let us reset the subscripts of the $\tau_{\psi=1}^{\Psi} 2^{\dim\ \check{v}_\tau(\psi)}$ components $\check{v}_\tau$ in 39 from 1 to $\Sigma_{\psi=1}^{\Psi} 2^{\dim\ \check{v}_\tau(\psi)}$. We do the same to those of the diagonal entries of the general masking matrix M in 43, those of the general cod deviation accumulation (row) vector C in 42, and those of each row of the general code covariance matrix D in 41. Then the two equations, (46) and (47), are respectively equivalent to $$d_{\tau k j} = D_{k j} M_{j j}(\check{v}_{\tau j} - <\check{v}_{\tau j}>) \tag{50}$$

$$c_{\tau j} = C_j M_{j j}(\check{v}_{\tau j} - <\check{v}_{\tau j}>) \tag{51}$$

for $k=1, \ldots, R$ and $j=1, \ldots, \Sigma_{\psi=1}^{\Psi} 2^{\dim\ \check{v}_\tau(\psi)}$, where $M_{jj}$, $d_{\tau kj}$, $C_j$, and $\check{v}_{\tau j}$ are the jth diagonal entry of the general masking matrix M, the (k, j)th entry of the general code covariance matrix D, the jth entry of the general code deviation accumulation vector C, and the jth entry of the general neuronal code $\check{v}_\tau$ at time or numbering $\tau$, respectively. Using the matrix notation $[d_{\tau kj}]$, which denotes a matrix with the (k, j)th entry being $d_{\tau kj}$ and the vector notation $[c_{\tau j}]$, which denotes a row vector with the jth entry being $c_{\tau j}$, the above equations (50) and (51) can be expressed as follows:

$$[d_{\tau k j}] = [M_{j j} D_{k j}(\check{v}_{\tau j} - <\check{v}_{\tau j}>)] \tag{52}$$

$$[c_{\tau j}] = [M_{j j} C_j(\check{v}_{\tau j} - <\check{v}_{\tau j}>)] \tag{53}$$

where $D_{kj}(\check{v}_{\tau j} - <\check{v}_{\tau j}>)$ and $C_j(\check{v}_{\tau j} - <\check{v}_{\tau j}>)$ can be looked upon as the outputs of the synapses with weights $D_{kj}$ and $C_j$ respectively after performing the multiplications involved in response to the input $\check{v}_{\tau j} - <\check{v}_{\tau j}>$; and $M_{jj}$ are called masking factors. The masking factor $M_{jj}$ is multiplied to the output $D_{kj}(\check{v}_{\tau j} - <\check{v}_{\tau j}>)$ of synapse j preceding spiking neuron k and to the output $C_j(\check{v}_{\tau j} - <\check{v}_{\tau j}>)$ of synapse j preceding nonspiking neuron.

Denoting $(c_\tau(\psi) + d_{\tau j}(\psi))/2$ by $a_{\tau j}(\psi)$, For each $\psi=1, \ldots, \Psi$, the ratio $a_{\tau j}(\psi)/c_\tau(\psi) = (d_{\tau j}(\psi)/c_\tau(\psi) + 1)/2$ is an estimate of the empirical conditional probability that the jth component $r_{\tau j}(\psi)$ of the label $r_\tau(\psi)$ of $v_t(\psi)$ is equal to 1 given $v_t(\psi)$. If $v_t(\psi)$, $\psi=1, \ldots, \Psi$, share the same label $r_\tau$, that is the label of $v_t$ (i.e., $r_\tau(\psi) = r_\tau$ for $\psi=1, \ldots, \Psi$; then the best estimate of the empirical conditional probability that the jth component $r_{\tau j}$ of label $r_\tau$ of $v_t$ is equal to 1 given $v_t(\psi)$, $\psi=1, \ldots, \Psi$, is $$\left(\sum_{\psi=1}^{\Psi} a_{\tau j}(\psi)\right) / \left(\sum_{\psi=1}^{\Psi} c_\tau(\psi)\right) = \left(\left(\sum_{\psi=1}^{\Psi} d_{\tau j}(\psi)\right) / \left(\sum_{\psi=1}^{\Psi} c_\tau(\psi)\right) + 1\right) / 2$$

for $j=1, \ldots, R$, or equivalently, $$a_\tau/c_\tau = (d_\tau/c_\tau + 1)/2$$

which is a representation of an empirical probability distribution denoted by $p_\tau$. How pseudo-random binary numbers are generated in accordance with $p_\tau$ is described in Subsubsection 5.5.5.

Note that $\check{v}_\tau$, $\langle \check{v}_\tau \rangle$, D, C and M, in describing a PU (and hence in this subsubsection) are the general neuronal code, the general code covariance matrix, the general code deviation accumulation vector, and the general masking matrix defined in (39), (40), (41), (42), and (43), respectively. Note also that $a_\tau$, $c_\tau$ and $d_\tau$ in describing a PU (and hence in this subsubsection) are computed using the general versions of $\check{v}_\tau$, $\langle \check{v}_\tau \rangle$, D, C and M, unless indicated otherwise. In describing a PU, the symbol $v_t$ remains to denote the vector input to the PU.

5.5.4 Model Nonspiking Neurons

A model nonspiking neuron in a PU receives signals from dim $\check{v}_\tau = \Sigma_{\psi=1}^{\Psi} 2^{dim\, v_t(\psi)}$ synapses connected to the $\Psi$ neuronal encoders in the PU. The strengths of these synapses form the code deviation accumulation vector C. Receiving $C_j(\psi)M_{jj}(\psi)(\check{v}_\tau(\psi) - \langle \check{v}_\tau(\psi) \rangle)_j$, $j=1, 2, \ldots, 2^{dim\, v_t(\psi)}$, $\psi=1, 2, \ldots, \Psi$, the model nonspiking neuron performs addition of them. The output of the model nonspiking neuron is $$c_\tau = \sum_{\psi=1}^{\Psi} C(\psi)M(\psi)(\check{v}_\tau(\psi) - \langle \check{v}_\tau(\psi) \rangle) \quad (54)$$

$$= CM(\check{v}_\tau - \langle \check{v}_\tau \rangle)$$

which is an estimate of the total number of times $v_\tau$ or its variants have been encoded and stored in C with effects of the forgetting factor, normalizing constant, and input corruption, distortion and occlusion included. $c_\tau$ is a graded signal transmitted to the neighboring R model spiking neurons in the same PU (processing unit).

An artificial nonspiking neuron is shown in FIG. 19. It evaluates the sum of its inputs, $c_{\tau j} = M_{jj} C_j (\check{v}_{\tau j} - \langle \check{v}_{\tau j} \rangle)$, $j=1, \ldots, \Sigma_{\psi=1}^{\Psi} 2^{dim\, v_t(\psi)}$.

5.5.5 Model Spiking Neurons

Each of the R model spiking neurons in the PU receives signals from $\Sigma_{\psi=1}^{\Psi} 2^{dim\, v_t(\psi)}$ synapses connected to the neuronal encoders in the PU. The entries of the k-th row $D_k$ of D are the strengths of these synapses for model spiking neuron j for $j=1, \ldots, R$. In response to $v_\tau$, model spiking neuron k performs addition of $D_{kj}(\psi)M_{jj}(\psi)(\check{v}_\tau(\psi) - \langle \check{v}_\tau(\psi) \rangle)_j$, $j=1, 2, \ldots, 2^{dim\, v_t(\psi)}$, $\psi=1, 2, \ldots, \Psi$, from the $\Sigma_{\psi=1}^{\Psi} 2^{dim\, v_t(\psi)}$ synapses. The output of model spiking neuron k is $$d_{\tau k} = \sum_{\psi=1}^{\Psi} D_k(\psi)M(\psi)(\check{v}_\tau(\psi) - \langle \check{v}_\tau(\psi) \rangle) \quad (55)$$

$$= D_k M(\check{v}_\tau - \langle \check{v}_\tau \rangle)$$

which is an estimate of the total number of times $v_\tau$ and its variants have been encoded and stored in D with the kth component $r_{\tau k}$ of $r_\tau$ being +1 minus the total number of times $v_\tau$ and its variants have been encoded and stored in D with the kth component $r_{\tau j}$ being −1. Included in this estimate are the effects of the forgetting factor, normalizing constant, and input corruption, distortion and occlusion.

Therefore, $(c_\tau + d_{\tau k})/2$ is an estimate of the total number of times $v_\tau$ and its variants have been encoded and stored in C with the kth component $r_{\tau k}$ of $r_\tau$ being 1. Consequently, $(d_{\tau k}/c_\tau + 1)/2$ is an estimate $p_{\tau k}$ of the empirical probability that $r_\tau$ is equal to 1 given $v_t$. Model spiking neuron k then uses a pseudo-random number generator to generate a spike (i.e., 1) with probability $p_{\tau k}$ or no spike (i.e., 0) with probability $1-p_{\tau k}$. This 1 or 0 is the output $u_{\tau k} = v\{p_{\tau k}\}$ of model spiking neuron k at time or numbering $\tau$. $u_{\tau k}$ is thus a point estimate of the k-th component $r_{\tau k}$ of the label $r_\tau$ of $v_\tau$.

Note that the vector $$p_\tau = [p_{\tau 1}\, p_{\tau 2} \cdots p_{\tau R}]'$$

is a representation of an empirical probability distribution of the label $r_\tau$. Note also that the outputs of the R model spiking neurons in response to $v_\tau$ form a binary vector $u_\tau = v\{p_{\tau k}\}$, which is a point estimate of the label $r_\tau$ of $v_\tau$.

Artificial spiking neuron k in the PU is shown in FIG. 23. It inputs $d_{\tau kj} = D_{kj}(\psi)M(\psi) \cdot (\check{v}_\tau(\psi) - \langle v_\tau(\psi) \rangle)$, $j=1, \ldots, \Sigma_{\psi=1}^{\Psi} 2^{dim\, v_t(\psi)}$, and $c_\tau$; and evaluates the sum $\Sigma_j d_{\tau kj}$ of $d_{\tau kj}$, $j=1, \ldots, \Sigma_{\psi=1}^{\Psi} 2^{dim\, v_t(\psi)}$. If $c_\tau = 0$, the artificial spiking neuron k then sets $p_{\tau k} = \frac{1}{2}$. If $c_\tau \neq 0$, the artificial spiking neuron k then sets $p_{\tau k} = ((\Sigma_j d_{\tau kj})/c_\tau + 1)/2$. The artificial spiking neuron generates a pseudo-random number $v\{p_{\tau k}\}$ as follows: $v\{p_{\tau k}\} = 1$ with probability $p_{\tau k}$ and $v\{p_{\tau k}\} = 0$ with probability $1 - p_{\tau k}$. An artificial spiking neuron is shown in FIG. 20.

Note that the PU has $\Sigma_{\psi=1}^{\Psi} 2^{dim\, v_t(\psi)}$ synapses for each of the R spiking neurons and has the same number of synapses for the nonspiking neuron. However, the R spiking neurons and the nonspiking neuron may have different numbers of synapses.

A flow chart of a PU without a learning mechanism is shown in FIG. 21. At time or numbering $\tau$, the PU receives a (feature) vector $v_\tau$. The neuronal encoders in the PU encode $v_\tau$ into the general neuronal code $\check{v}_\tau$ by (39). The synapses and the masking matrices compute and output $c_{\tau j} = C_j M_{jj}(\check{v}_{\tau j} - \langle \check{v}_\tau \rangle)$ and $d_{\tau kj} = D_{kj} M_{jj}(\check{v}_{\tau j} - \langle \check{v}_{\tau j} \rangle)$ for all k and j, or equivalently the vector $[c_{\tau j}]$ and matrix $[d_{\tau k}]$, where C, D and M are those in (42), (41) and (43), respectively. The model nonspiking neuron sums up $c_{\tau j}$ over all j to form $$c_\tau = \sum_j c_{\tau j}$$

in (47). Model spiking neuron k sums up $d_{\tau kj}$ over all j to form $$d_{\tau k} = \sum_j d_{\tau kj}.$$

If $c_\tau = 0$, then the spiking neuron sets $p_\tau = \frac{1}{2}$. Otherwise, for $k=1, \ldots, R$, the spiking neuron computes the empirical probability distribution $p_{\tau k} = (y_{\tau k} + 1)/2$, where $y_{\tau k} = d_{\tau k}/c_\tau$, and generates a pseudo-random number $v\{p_{\tau k}\}$ in accordance with the empirical probability $p_{\tau k}$: $P(v\{p_{\tau k}\} = 1) = p_{\tau k}$ and $P(v\{p_{\tau k}\} = 0) = 1 - p_{\tau k}$.

If the general code covariance matrix D in the PU in FIG. 21 has been learned in unsupervised learning by the unsupervised covariance rule and held fixed, the PU is called an unsupervised PU (UPU). If D in the PU in FIG. 21 has been learned in supervised learning by the supervised covariance rule and held fixed, the PU is called a supervised PU (SPU).

5.5.6 Unsupervised and Supervised Learning

The general code deviation accumulation vector C, whose components are stored in the artificial synapses with a feedforward connection to the artificial nonspiking neuron, is adjusted by the following unsupervised accumulation rule:

$$C \leftarrow \lambda C + \frac{\Lambda}{2}(\bar{v}_\tau - \langle \bar{v}_\tau \rangle)' \quad (56)$$

where the general neuronal code $\check{v}_\tau$ and its average over time $\langle \check{v}_\tau \rangle$ are defined in (39), and (40). Note that (56) is equivalent to:

$$C(\psi) \leftarrow \lambda C(\psi) + \frac{\Lambda}{2}(\bar{v}_\tau(\psi) - \langle \bar{v}_\tau(\psi) \rangle)'$$

for #=1, ..., Ψ.

In unsupervised learning by the PU, the general code covariance matrix D, whose entries are stored in the artificial synapses with a feedforward connection to the R artificial spiking neurons, is adjusted by the following unsupervised covariance rule:

$$D \leftarrow \lambda D + \Lambda(v\{p_\tau\} - \langle v\{p_\tau\}\rangle)(\check{v}_\tau - \langle \check{v}_\tau \rangle)' \quad (57)$$

where the general neuronal code $\check{v}_\tau$ and its average over time $\langle \check{v}_\tau \rangle$ are defined in (39), and (40), and $v\{p_\tau\}$ is the output vector $u_\tau$ of the PU. Note that (57) is equivalent to:

$$D(\psi) \leftarrow \lambda D(\psi) + \Lambda(u_\tau - \langle u_\tau \rangle)(\check{v}_\tau(\psi) - \langle \check{v}_\tau(\psi) \rangle)'$$

for $\psi$=1, ..., Ψ, where $u_\tau = v\{p_\tau\}$.

In supervised learning by the PU, the general code covariance matrix D, whose entries are stored in the artificial synapses with a feedforward connection to the R artificial spiking neurons, is adjusted by the following supervised covariance rule:

$$D \leftarrow \lambda D + \Lambda(r_\tau - \tfrac{1}{2})(\check{v}_\tau - \langle \check{v}_\tau \rangle)' \quad (58)$$

where the general neuronal code $\check{v}_\tau$ and its average over time $\langle \check{v}_\tau \rangle$ are defined in (39), and (40), and $r_\tau$ is the label of $v_\tau$ (or the measurements in the receptive field of the PU) that is provided from outside of the PU. The provided label $r_\tau$ is an R-dimensional binary vector. Note that (58) is equivalent to:

$$D(\psi) \leftarrow \lambda D(\psi) + \Lambda(r_\tau - \tfrac{1}{2})(\check{v}_\tau(\psi) - \langle \check{v}_\tau(\psi) \rangle)'$$

for $\psi$=1, ..., Ψ.

The adjusted C and D are delayed for one unit of time or one numbering before being stored in the model synapses.

FIG. 22 illustrates a PU with an unsupervised learning mechanism to learn the general code covariance matrix D by the unsupervised covariance rule and an unsupervised learning mechanism to learn the general code deviation accumulation vector C by the unsupervised accumulation rule. The adjusted C and D are delayed for one unit of time or one numbering before being stored in the model synapses. The PU in FIG. 22 is called an unsupervised PU (UPU).

FIG. 23 illustrates a PU with a supervised learning mechanism to learn the general code covariance matrix D by the supervised covariance rule and an unsupervised learning mechanism to learn the general code deviation accumulation vector C by the unsupervised accumulation rule. The adjusted C and D are delayed for one unit of time or one numbering before being stored in the model synapse. The PU in FIG. 23 is called a supervised PU (SPU).

A network of at least one PU is called a low-order model (LOM) of biological neural networks. The vector $v_\tau$ input to a PU in a layer contains not only feedforwarded components from outputs of model spiking neurons in the lower layers but also feedbacked components from outputs of model spiking neurons in the same or higher layers. Feedbacked components are delayed for at least one unit of time to ensure stability. Feedforwarded components may come from more than one layer preceding the layer in which the PU belongs to.

5.5.7 Creating a Vocabulary by Unsupervised Covariance Learning

Pseudo-random binary digit generation performed by the R model spiking neurons in a PU (processing unit) is indispensable in making the unsupervised covariance rule work for the PU. Let us now see how a "vocabulary" is created by unsupervised covariance rule for the PU: If a feature subvector $v_\tau$ or a slightly different version of it has not been learned by the PU, and $CM(\check{v}_\tau - \langle \check{v}_\tau \rangle) = 0$; then $d_\tau/c_\tau$ is set equal to 0 and $p_\tau = (1/2)I$, where I=1 1 ... 1. The R model spiking neurons use this empirical probability vector to generate a purely random label $r_\tau$. Once this $r_\tau$ and the output vector $\check{v}_\tau$ have been learned and stored in C and D, if $v_\tau$ is input to the PU for a second time, then $u_\tau = r_\tau$ with probability 1, and one more copy of the pair $(v_\tau, r_\tau)$ is included in C and D.

If an input vector $v_\tau$ or a slightly different version of it has been learned by a PU with different labels for different numbers of times, then $y_\tau = d_{\tau k}/c_\tau \neq 0$ and $p_\tau \neq (1/2)I$. Since $v_\tau$ may contain different parts from different causes and are assigned different labels in different rounds of unsupervised learning, $p_\tau$ may not be a binary vector. For example, assume that two labels, $r_\tau^1$ and $r_\tau^2$ of the same input vector $v_\tau$ have been learned with relative frequencies, 0.7 and 0.3, respectively. Then in response to $v_\tau$, each component of $u_\tau$ that is output from the PU is equal to $r_\tau^1$ with probability 0.7 and is equal to $r_\tau^2$ with probability with probability 0.3. Since these two labels may have common components, the point estimate of the label resembles $r_\tau^1$ with a probability of greater than 70% and resembles $r_\tau^2$ with a probability of greater than 30%.

5.6 Controlling Cluster Sizes

The set of vectors that, as input vectors to a PU, will retrieve (or generate) the same label from the PU is called a cluster. The length of the time interval over which the time average $\langle u_t \rangle$ is taken of the PU's output vector $u_t = v\{p_t\}$ can be selected to control the cluster sizes.

EXAMPLE 4

The Gray codes of two adjacent integers differ by one component. For example, the Gray codes of the integers, 0 to 15, are, respectively, 0000, 0001, 0011, 0010, 0110, 0111, 0101, 0100, 1100, 1101, 1111, 1110, 1010, 1011, 1001, 1000. Let $v_t$, t=1, 2, ..., 16, be these 16 codes in the same order. For example, $v_1$=[0 0 0 0]', $v_2$=[0 0 0 1]' and so on. Repeating the 16 codes, an infinite sequence of vectors $x_t$, t=1, 2, ..., is available for learning. Let us use a PU with 10 model spiking neurons and 1 model nonspiking neuron to learn $v_t$, t=1, 2, ..., 16, in the given order without a supervisor. Assume that Ψ=J=1 in (39) and (32) and that λ=Λ=1 in (12) and (21).

Because J=1 in M, an unsupervised learning rule generalizes, if necessary, on three binary digits of each $v_t$. Since two consecutive codes differ by only one bit, the unsupervised correlation rule in THPAM (James Ting-Ho Lo, Functional Model of Biological Neural Networks, *Cognitive Neurodynamics*, Vol. 4, Issue 4, pp. 295-313, November 2010) learns all the 16 codes (i.e., $v_t$) with one single label and thus puts them in one single cluster. Note that components 0 in $v_t$ are replaced with $-1$ before the unsupervised correlation rule in THPAM can be applied.

Let us now use the unsupervised covariance rule to learn the same sequence of codes $v_t$. To initiate the learning, we set $<v\{p_t\}>=I/2$ for $t=1, 0, -1, -2, \ldots, -\infty$ and set $C=0$ and $D=0$ at $t=0$. For simplification, we assume $<\check{v}_t>=I/2$ for all $t$. Note that the time averages $<v\{p_t\}>$ and $<\check{v}_t>$ may be taken over different time lengths.

EXAMPLE 4a

Assume that the time average $<v\{p_t\}>$ is taken over 100,000 time units, namely $<v\{p_t\}>=\Sigma_{\Sigma=-100,000+t+1}^{t} v\{p_\tau\}/100,000$. Under this assumption, $<v\{p_t\}>$ is virtually ½ for $t=1, 2, \ldots, 16$. For notational simplicity, we take $<v\{p_t\}>$ to be ½ for $t=1, 2, \ldots, 16$ in the following.

Retrieval at $t=1$: $c_1=0$, $d_1=0$, $p_1=I/2$ and $v\{p_{1i}\}$ is purely random (i.e., $v\{p_{1i}\}=1$ with probability ½ for $i=1, \ldots, 10$).
Learning at $t=1$: $C=½(\check{v}_1-I/2)'$ and $D=(v\{p_1\}-I/2)(\check{v}_1-I/2)'$. Note that $v\{p_1\}$ is a binary vector.
Retrieval at $t=2$: $c_2=1$, $d_2=2(v\{p_1\}-I/2)$, $p_2=v\{p_1\}$, and $v\{p_2\}=v\{p_1\}$, because $v\{p_1\}$ is a binary vector. $v_2$ is assigned the same label $v\{p_1\}$ as $v_1$, and $v_1$ and $v_2$ are put in the same cluster.
Learning at $t=2$: $C=½\Sigma_{t=1}^{2}(\check{v}_t-I/2)'$ and $D=\Sigma_{t=1}^{2}(v\{p_t\}-I/2)(\check{v}_t-I/2)'$.
Retrieval at $t=3$: $c_3=1$, $d_3=2(v\{p_2\}-I/2)$, $p_3=v\{p_2\}$, $v\{p_3\}=v\{p_2\}$. $v_3$ is assigned the same label $v\{p_1\}$ as $v_2$, and $v_1, v_2$ and $v_3$ are put in the same cluster.
Learning at $t=3$: $C=½\Sigma_{t=1}^{3}(\check{v}_t-I/2)'$ and $D=\Sigma_{t=1}^{3}(v\{p_t\}-I/2)(\check{v}_t-I/2)'$
Retrieval at $t=4$: $c_4=1$, $d_4=2(v\{p_3\}-I/2)$, $p_4=v\{p_3\}$, and $v\{p_4\}=v\{p_3\}$. $v_4$ is assigned the same label $v\{p_3\}$ as $v_3$, and $v_1, \ldots, v_4$ are put in the same cluster.

Continuing in this manner, all the 16 codes $v_t$ are assigned the same label $v\{p_1\}$ and thus put in the same cluster.

EXAMPLE 4b

Assume that the time average $<v\{p_t\}>$ is taken over 1 time unit, —mely $<v\{p_t\}>=v\{p_t\}$.
Retrieval at $t=1$: $c_1=0$, $d_1=0$, $p_1=I/2$ and $v\{p_1\}$ is purely random (i.e., $v\{p_{1i}\}=1$ with probability ½ for $i=1, \ldots, 10$).
Learning at $t=1$: $C=½(\check{v}_1-I/2)'$ and $D=(v\{p_1\}-<v\{p_1\}>)(\check{v}_1-I/2)'=0$.
Retrieval at $t=2$: $c_2=1$, $d_2=0$, $p_2=I/2$ and $v\{p_2\}$ is purely random.
Learning at $t=2$: $C=½\Sigma_{t=1}^{2}(\check{v}_t-I/2)'$ and $D=\Sigma_{t=1}^{2}(v\{p_t\}-\{p_t\})(\check{v}_t-I/2)'=0$.
Retrieval at $t=3$: $c_3=1$, $d_3=0$, $p_3=I/2$ and the label $v\{p_3\}$ is purely random.
Learning at $t=3$: $C=½\Sigma_{t=1}^{3}(\check{v}_t-I/2)'$ and $D=\Sigma_{t=1,3}(v\{p_t\}-v\{p_{t-1}\})(\check{v}_t-I/2)'=0$.
Retrieval at $t=4$: $c_4=1$, $d_4=0$, $p_4=I/2$ and the label $v\{p_4\}$ is purely random.

Continuing in this manner, the 16 codes $v_t$ are each assigned a purely random label. Since there are 10 model spiking neurons and thus each label has 10 entries, the chance is that the 16 codes are assigned with different labels. Note that $D$ remains to be 0 and thus no knowledge is learned.

EXAMPLE 4c

Assume that the time average $<v\{p_t\}>$ is taken over n time units, namely $<v\{p_t\}>=\Sigma_{i=0}^{n-1}v\{p_{t-i}\}/n$.

Retrieval at $t=1$: $c_1=0$, $d_1=0$, $p_1=I/2$ and $v\{p_1\}$ is purely random (i.e., $v\{p_{1i}\}=1$ with probability ½ for $i=1, \ldots, 10$).
Learning at $t=1$: $C^1=½(\check{v}_1-I/2)'$ and $D^1=(v\{p_1\}-(v\{p_1\}+(n-1)I/2)/n)(\check{v}_1-I/2)'$.
Retrieval at $t=2$: $c_2=1$, $d_2=2(v\{p_1\}-(v\{p_1\}+(n-1)I/2)/n)$, $p_2=v\{p_1\}-(v\{p_1\}+(n-1)I/2)/n)+I/2$.
Learning at $t=2$: $C^2=½\Sigma_{t=1}^{2}(\check{v}_t-½)'$ and $D^2=D^1+(v\{p_2\}-(\Sigma_{\tau=2}^{1}v\{p_\tau\}+(n-2)I/2)/n)(\check{v}_2-½I)'$.

Continuing in this manner for $t\leq n$,
Retrieval at $t$: $c=1$, $d_t=2(v\{p_{t-1}\}-(\Sigma_{\tau=t-1}^{1}v\{p_\tau\}+(n-t+1)I/2)/n)$, $p_t=v\{p_{t-1}\}-(\Sigma_{\tau=t-1}^{1}v\{p_\tau\}+(n-t+1)I/2)/n+½I$
Learning at $t$: $C^t=½\Sigma_{\tau=1}^{t}(\check{v}_\tau-½)'$ and $D^t=D^{t-1}+(v\{p_t\}-(\Sigma_{\tau=t}^{1}v\{p_\tau\}+(n-t)I/2)/n)(\check{v}_t-½)'$;
and for $t>n$,
Retrieval at $t$: $c_t=1$, $d_t=2(v\{p_{t-1}\}-\Sigma_{\tau=t-1}^{t-n}v\{p_\tau\}/n)$, $p_t=v\{p_{t-1}\}-\Sigma_{\tau=t-1}^{t-n}v\{p_\tau\}/n+½I$.
Learning at $t$: $C^t=½\Sigma_{\tau=1}^{t}(\check{v}_\tau-½)'$ and $D^t=D^{t-1}+(v\{p_t\}-\Sigma_{\tau=t}^{t-n+1}v\{p_\tau\}/n)(\check{v}_t-½)'$.

Note that $\lim_{n\to\infty} p_t=v\{p_{t-1}\}$. This is consistent with Example 2a. Two observations can be made from these formulas:
1. Given a fixed t: the greater n is, the closer $p_t$ is to $v\{p_{t-1}\}$, the closer $v\{p_t\}$ is from $v\{p_{t-1}\}$, the more likely $v_t$ is assigned the same label $v\{p_{t-1}\}$ as $v_{t-1}$, or the more likely $v_t$ and $v_{t-1}$ are put in the same cluster.
2. Given a fixed n: for $t\leq n$, the deviation of $(\Sigma_{\tau=-1}^{1}v\{p_\tau\}+(n-t+1)I/2)/n$ from ½I increases as t increases, and hence the deviation of $p_t$ from $v\{p_{t-1}\}$ increases. Consequently, the chance that $v_t$ is assigned $v\{p_{t-1}\}$ as than $v_{t-1}$ decreases as t increases, and the chance that $v_t$ and $v_{t-1}$ are put in the same cluster decreases.

EXAMPLE 5

Let us now use the unsupervised covariance rule to learn the sequence of identical codes $v_t(t)=[1\ 1\ 1]'$, $t=1, \ldots, 16$.
Assume that the time average $<v\{p_t\}>$ is taken over n time units, namely $<v\{p_t\}>=\Sigma_{i=0}^{n-1}v\{p_{t-i}\}/n$.
Retrieval at $t=1$: $c_1=0$, $d_1=0$, $p_1=I/2$ and $v\{p_1\}$ is purely random (i.e., $v\{p_{1i}\}=1$ with probability ½ for $i=1, \ldots, 10$).
Learning at $t=1$: $C^1=½(\check{v}_1-I/2)'$ and $D^1=(v\{p_1\}-(v\{p_1\}+(n-1)I/2)/n)(\check{v}_1-I/2)'$.
Retrieval at $t=2$: $c_2=2$, $d_2=4(v\{p_1\}-(v\{p_1\}+(n-1)I/2)/n)$, $p_2=v\{p_1\}-(v\{p_1\}+(n-1)I/2)/n+I/2$.
Learning at $t=2$: $C^2=½\Sigma_{t=1}^{2}(\check{v}_t-½)'$ and $D^2=D^1+(v\{p_2\}-(\Sigma_{\tau=2}^{1}\{p_\tau\}+(n-2)I/2)/n)\cdot(\check{v}_2-½I)'$.
Retrieval at $t=3$: $c_3=4$, $d_3=d_2+4(v\{p_2\}-(\Sigma_{\tau=2}^{1}v\{p_\tau\}+(n-2)I/2)/n)$, $p_3=(p_2+v\{p_2\}-(\Sigma_{\tau=2}^{1}v\{p_\tau\}+(n-2)I/2)/n+½I)/2$
Learning at $t=3$: $C^3=½\Sigma_{t=1}^{3}(\check{v}_t-½)'$ and $D^3=D^2+(v\{p_3\}-(\Sigma_{\tau=2}^{1}v\{p\}-(n-2)I/2)/n)\cdot(\check{v}_3-½)'$
Retrieval at $t=4$:

$$c_4 = 6,\ d_4 = d_3 + 4\left(v\{p_3\} - \left(\sum_{\tau=2}^{1} v\{p_\tau\} - (n-2)I/2\right)\bigg/n\right),$$

$$p_4 = \left(\sum_{\tau=2}^{3} p_\tau + v\{p_3\} - \frac{1}{n}\sum_{\tau=2}^{1} v\{p_\tau\} - \frac{n-3}{2n}I + \frac{1}{2}I\right)\bigg/3$$

Continuing in this manner for $t\leq n$,
Retrieval at $t$: $c_t=2(t-1)$, $d_t=4(v\{p_{t-1}\}-(\Sigma_{\tau=t-1}^{1}v\{p_\tau\}+(n-+1)I/2)/n)$, $p_t=[\Sigma_{\tau=2}^{t-1}p_\tau+v\{p_{t-1}\}-(\Sigma_{\tau=t-1}^{1}v\{p_\tau\}+(n-t+1)I/2)/n+]/(t-1)$.
Learning at $t$: $C^t=½\Sigma_{\tau=1}^{t}(\check{v}_\tau-½)'$ and $D^t=D^{t-1}+(v\{p_t\}-(\Sigma_{\tau=t}^{1}v\{p_\tau\}+(n-t)I/2)/n)\cdot(\check{v}_t-½)'$;

and for t>n,
Retrieval at t: $c_t=2(t-1)$, $d=4(v\{p_{t-1}\}-\Sigma_{\tau=t-1}^{t-n}v\{p_\tau\}/n)$, $p_t=[\Sigma_{\tau=2}^{t-1}p_\tau v\{p_{t-1}\}-\Sigma_{\tau=t-1}^{t-n}v\{p_\tau\}/n+\frac{1}{2}I]/(t-1)$.
Learning at t: $C^t=\frac{1}{2}\Sigma_{\tau=1}^t(\check{v}_\tau-\frac{1}{2})'$ and $D^t=D^{t-1}+(v\{p_t\}-\Sigma_{\tau=t}^{t-n+1}v\{p_\tau\}/n)(\check{v}_t-\frac{1}{2})$.

The two observations are valid here. However, $p_t=(\Sigma_{\tau=2}^{t-1}p_\tau+v\{p_{t-1}\}-(\Sigma_{\tau=t-1}^{1}v\{p_\tau\}+(n-t+1)I/2)/n+\frac{1}{2}I)/(t-1)$ shows that the change from $p_{t-1}$ to $p_t$ for learning identical codes is much smaller than that for learning the sequence of Gray codes in EXAMPLE 4c. This means that for some n, the identical codes can be put in the same cluster, and yet the 16 Gray codes are put in more than one cluster. In fact, it is acceptable by the LOM that the identical codes are assigned different labels as long as the labels differ by a couple of bits, because these labels are inputs to other PUs, which have generalization capability.

The Gray codes in the given learning order are an extreme example that does not exist in the real-world. The analysis in the above examples show that sizes of the clusters of the Gray codes in the given learning order can be controlled by selecting n appropriately. In the real world, repeated learning is a frequently encountered situation. Therefore, we should select n large enough to guarantee that the chance for putting the same input vector in repeated learning into two different clusters is negligible. Only under the condition this requirement is fulfilled, we select n as small as possible to prevent a cluster to overgrow. Of course, the maximum size of a cluster depends on the application of the LOM. (In fact, having more clusters does little harm to the processing of the LOM. It is like having multiple words for similar things.) The formulas for determining $p_t$ in the above examples can be generalized easily for any dimensionality of the input vector and any number of presentations for similar input vectors (i.e., those with a small number of different bits) or identical input vectors. Generalizations of the formulas in Example 5 are especially useful for determining the smallest n required for not assigning different labels to identical input vectors.

5.7 Learning Masking Factors for Unsupervised Learning of Vectors with Smaller Differences In supervised learning by an SPU (supervised processing unit), the label is not generated by the SPU, but is provided from outside the SPU (or the LOM). If different labels are provided for input vectors with small differences, the SPU learns the different labels and can distinguish said input vectors with small differences thereafter. In unsupervised learning by an UPU, if the UPU is required to be able to distinguish learned input vectors with small differences and to remain to be able to recognize unlearned input vectors that have larger differences with (or are more different from) learned input vectors, other masking matrices that are more strict (or less tolerant) than the masking matrices are used. These other masking matrices have a smaller J in (32) than the masking matrices do and are called the learning masking matrices. The learning masking matrices, denoted by $M^\#(\psi)$, $\psi=1,\ldots,\Psi$, form a general masking matrix called the general learning masking matrix $$M^\#=\text{diag}[M^\#(1)\ M^\#(2)\ \ldots\ M^\#(\Psi)] \quad (59)$$

It is a diagonal matrix. The diagonal entries are numbered consecutively from 1 to dim $\check{v}_\tau=\Sigma_{\psi=1}^\Psi 2^{dim\ v_\tau(\psi)}$, where $\check{v}_\tau$ is the general neuronal code, whose entries are also numbered consecutively from 1 to dim $v_\tau$. The diagonal entries $M_{jj}^\#=1,\ldots,\dim \check{v}_\tau$, of $M^\#$ are called learning masking factors.

An UPU (unsupervised processing unit) with learning masking matrices $M^\#(\psi)$, $\psi=1,\ldots,\Psi$, still generates the binary vector $v\{p_\tau\}$ that is output from the UPU in response to the vector $v_\tau$ input to the UPU using its masking matrices $M(\psi)$, $\psi=1,\ldots,\Psi$, as before. However, when the UPU learns, the learning masking matrices $M^\#(\psi)$, $\psi=1,\ldots,\Psi$, are used instead to generate an estimate $v\{p_\tau^\#\}$ of the label of $v_\tau$, and the general code covariance matrix D is adjusted by $$D(\psi)\leftarrow \lambda D(\psi)+\Lambda(v\{p_\tau^\#\}-\langle v\{p_\tau^\#\}\rangle)(\check{v}_\tau-\langle\check{v}_\tau\rangle)' \quad (60)$$

More specifically, $v\{p_\tau^\#\}$ is generated as follows:

$$[c_{\tau j}^\#]=[M_{jj}^\# C_j(\check{v}_\tau-\langle\check{v}_\tau\rangle)] \quad (61)$$

$$[d_{\tau kj}^\#]=[M_{jj}^\# D_{kj}(\check{v}_\tau-\langle\check{v}_\tau\rangle)] \quad (62)$$

$$c_\tau^\#=\sum_j c_{\tau j}^\# \quad (63)$$

$$p_{\tau k}^\#=\left(\sum_j d_{\tau kj}+c_\tau^\#\right)\Big/(2c_\tau^\#) \quad (64)$$

$v\{p_{\tau k}^\#\}$ is a pseudorandom number generated in accordance with the empirical probability distribution $p_{\tau k}^\#$, and then $v\{p_\tau^\#\}=[v\{p_{\tau 1}^\#\}\ \ldots\ v\{p_{\tau R}^\#\}]'$, where R is the number of model spiking neurons in the UPU. A typical UPU with learning masking factors $M_{jj}^\#$, $j=1,\ldots,\dim \check{v}_\tau$ is illustrated in FIG. 24.

5.8 Spike Trains for Each Exogenous Feature Vector

Recall that a binary vector $u_t$ output from a PU (processing unit), is obtained by a pseudo-random number generator using the empirical probability distribution $p_t$ of the label $r_t$ of a vector $v_t$ input to the PU. Components of such binary vectors $u_t$ with uncertainty form vectors input to other or the same PUs through feedforward or feedback connections. Upon receiving a vector with uncertainty, a PU uses masking matrices to suppress or "filter out" some components so that the remaining components are consistent with those stored in the code covariance matrices. (Masking matrices are described in Section 5.4.)

However, there is a chance for the pseudo-random number generator to generate a binary vector $u_t$ that is such an outlier for the empirical probability distribution $p_t$ that causes undesirable effects on learning and retrieving of PUs receiving components of $u_t$ in spite of masking matrices. To minimize such undesirable effects and to represent the empirical probabilities involved in the PUs, the LOM usually completes a certain number of rounds of retrieving and learning for each exogenous vector $v_t^{ex}$ input to the LOM so that many pseudorandom versions of $u_t$ are generated and learned by each PU for the same $v_t^{ex}$.

To have $\zeta$ rounds of retrieving and learning for each exogenous vector $v_t^{ex}$, the exogenous vector must be held constant for $\zeta$ units of time. In other words, the exogenous vector $v_t^{ex}$ is presented to the LOM with a different time scale. More specifically, $v_t^{ex}$ changes at $t=i\zeta+1$, $i=0, 1, 2, \ldots$. Consequently, a PU generates a sequence of binary vectors denoted by $u_t$, $t=i\zeta+j$, $j=1, 2, \ldots, \zeta$, for each exogenous feature vector $v_t^{ex}$, which remains constant for $t=i\zeta+j$, $j=1, 2, \ldots, \zeta$. More specifically, once a new exogenous vector $v_{i\zeta+1}^{ex}$ is presented, $v_{i\zeta+j}^{ex}=v_{i\zeta+1}^{ex}$ for $j=2, \ldots, \zeta$. The sequence $u_t$, $t=i\zeta+j$, $j=1, 2, \ldots, \zeta$, output from the PU consists of R spike trains, each having $\zeta$ spikes during the period of time.

Alternatively, if each exogenous vector $v_t^{ex}$ is held constant for 1 unit of time, then the PU generates a sequence of $\zeta$ binary vectors within the 1 unit of time; namely the PU generates one binary vector every $1/\zeta$ unit of time.

5.9 Multilayer Networks of Processing Units with Feedbacks

The low-order model (LOM) of biological neural networks described in the present invention disclosure is a network of processing units (PUs) with or without time-delayed feedbacks. An LOM that is a multilayer network of PUs is described in this Subsection.

An external vector input to the LOM is called an exogenous feature vector, and a vector input to a layer of PUs is called a feature vector. A feature vector input to a layer usually contains not only feedforwarded outputs from the PUs in preceding layers but also feedbacked outputs from the PUs in the same or higher layers with time delays. A feature vector may contain components from an exogenous feature vector. For simplicity, we assume that the exogenous feature vector is only input to layer 1 and is thus a subvector of a feature vector input to layer 1. All these feature vectors and output vectors over time usually form spike trains.

A subvector of a feature vector that is input to a PU is called a feature subvector. Trace the feedforward connections backward from neurons of a PU to a subvector of a feature vector input to a layer or the exogenous feature vector. This subvector is called the receptive field of the PU in the feature vector input to the layer or the exogenous feature vector. All the measurements that affect the receptive field in the exogenous feature vector are also called the receptive field of the PU in the measurements. For example, let the measurements taken by the pixels in a digital camera be input to a model of a retina, and let the output vector from the model of the retina be used as the exogenous feature vector of the LOM. Then the measurements or the pixels with those measurements that affect the receptive field of a PU in the exogenous feature vector are called the receptive field of the PU in the measurements.

The collection of neurons in layer l−i, i=1, 2, ..., that have a direct feedforward connection (without going through another neuron) to a neuron in a PU in layer l and the unit-time delay devices that hold a feedback that is directly input (without going through another unit-time delay device) to the same PU are called the immediate receptive field of the PU.

The feature vector input to layer l at time or numbering τ is denoted by $v_\tau^{l-1}$, and the output from layer l at τ is denoted by $v\{p_\tau^l\}$. The feature vector $v_\tau^{l-1}$ consists of components of the feedforwarded vector $v\{p_\tau^{l-1}\}$ and feedbacked vector $v\{p_{\tau-z(k)}^{l+k}\}$ feedbacked from the same layer l and higher layers l+k and after z(k) time units of delay for k=0, 1, ..., where z(k) is a function of k.

FIG. 25 shows layer l and layer l+2 of PUs of the LOM. In FIG. 25, same-layer feedback connections with one unit-time delay device from layer l to itself and 2-layer feedback connections with 5 unit-time delay devices from layer l+2 to layer l are shown. The box under layer l of PUs does not model a biological entity, but illustrates that the feature vector input to layer l comprises feedforward vector $v\{p_\tau^{l-1}\}$, the same layer feedback $v\{p_{\tau-1}^l\}$, and the 2-layer feedback $v\{p_{\tau-5}^{l+2}\}$. Note that the symbols, $v\{p_\tau^{l-1}\}$, $v\{p_{\tau-1}^l\}$ and $v\{p_{\tau-5}^{l+2}\}$, include all the components output from layer l−1, layer l+2, and layer l for simplicity in showing the feedback structure. For an application, we do not have to include all of them, but may select some of these components as inputs to layer l.

Once an exogenous feature vector is received by the LOM, the PUs perform functions of retrieving and/or learning from layer to layer starting with layer 1, the lowest layer. After the PUs in the highest layer, layer L, complete performing their functions, the LOM is said to have completed one round of retrievings and/or learnings. Each exogenous feature vector is held constant for a certain number ζ of time units, during which the LOM completes (of retrievings and/or learnings).

We note that retrieving and learning by a PU are performed locally, meaning that only the feature subvector input to the PU and its label are involved in the processing by the PU. Causes in patterns, temporal or spatial, usually form a hierarchy. Examples: (a). Phonemes, words, phrases, sentences, and paragraphs in speech. (b). Musical notes, intervals, melodic phrases, and songs in music. (c). Bananas, apples, peaches, salt shaker, pepper shaker, fruit basket, condiment tray, table, refrigerator, water sink, and kitchen in a house. Note that although Example (c) is a spatial hierarchy, when one looks around in the kitchen, the images scanned and received by the person's retina form a temporal hierarchy.

The higher a layer in the LOM is, the higher in the hierarchy the causes the PUs in the layer handle, and the more time it takes for the causes to form and be detected and recognized by the PUs. Therefore, the number of unit-time delay devices on a feedback connection is a monotone increasing function z(k) of k, which are defined above. This requirement is consistent with the workings in a biological neural network in the cortex. Note that it takes time (i) for biological PUs to process feature subvector, (ii) for spikes to travel along feedforward neural fibers from a layer to the next layer, and (iii) for spikes to travel along feedback neural fibers from a layer to the same or a lower-numbered layer. Note also the subscripts of the input vector $v_\tau^{l-1}$ and output vector $v\{p_\tau^l\}$ of all layers l are the same, indicating the same exogenous feature vector $v_\tau^{ex}$ is processed or propagated in all layers. The common subscript τ does not represent the time that the signals in the biological network reach or processed by its layers. However, a feedback $v_{\tau-z(k)}^{l+k}$ from layer l+k to layer l for inclusion in $v_\tau^{l-1}$ must have a delay z(k) that reflects the sum of the times taken for (i), (ii) and (iii) from the input terminals of layer l back to the same input terminals.

For notational simplicity, the superscript l−1 in $v_t^{l-1}$ and dependencies on l−1 or l in other symbols are sometimes suppressed in the following when no confusion is expected.

Let the sequence of feature vectors, $v_t^l$, t=1, 2, ..., be M-dimensional and thus $v_t^l = [v_{t1}^l \ldots v_{tM}^l]'$, whose components are ternary numbers. Let $n^l = [n_1^l \ldots n_k^l]'$ be a subvector of $[1 \ldots M]'$ such that $n_1^l < \ldots < n_k^l$. The subvector $$v_t^l(n^l) := [\; v_{tn_1^l}^l \;\; \cdots \;\; v_{tn_k^l}^l \;]'$$

of $v_t^l$ is called a feature subvector of $v_t^l$. $n^l$ is called a feature subvector index (FSI), and $v_t^l(n)$ is said to be a feature subvector on the FSI $n^l$ or have the FSI $n^l$. Each UPU is associated with a fixed FSI $n^l$ and denoted by UPU($n^l$). Using these notations, the sequence of subvectors of $v_t^{l-1}$, t=1, 2, ..., that is input to UPU($n^l$) is $v_t^{l-1}(n^l)$, t=1, 2, .... The FSI $n^l$ of a UPU usually has subvectors, $n^l(\psi)$, $\psi=1, \ldots, \Psi$, on which subvectors $v_t^{l-1}(n^l(\psi))$ of $v_t^{l-1}(n^l)$ are separately processed by the neuronal encoders in UPU($n^l$) at first. The subvectors, $n^l(\psi)$, $\psi=1, \ldots, \Psi$, are not necessarily disjoint, but are all inclusive in the sense that every component of $n^l$ is included in at least one of the subvectors $n^l(\psi)$. Moreover, the components of $n^l(\psi)$ are usually randomly selected from those of $n^l$.

The UPUs in layer l have FSIs (feature subvector indices) denoted by $1^l, 2^l, \ldots, N^l$. Upon receiving a feature vector $v_\tau^{l-1}$ by layer l, the feature subvectors, $v_\tau^{l-1}(1^l), v_\tau^{l-1}(2^l), \ldots, v_\tau^{l-1}(N^l)$, are formed and processed by UPU($1^l$), UPU($2^l$), ..., and UPU($N^l$) to compute the empirical probabilities, $p_\tau^l(1^l), p_\tau^l(2^l), \ldots, p_\tau^l(N^l)$, first and then generate the pseudo-random ternary vectors $v\{p_\tau^l(1^l)\}, v\{p_\tau^l(2^l)\}, \ldots, v\{p_\tau^l(N^l)\}$. Recall that $p_\tau^l(n^l)$ is the empirical probability of the label $r_\tau(n^l)$ of $v_\tau^l(n^l)$, and $v\{p_\tau^l(n^l)\}$ is the output of UPU($n^l$) based on $p_\tau^l(n^l)$. These empirical probabilities and UPU outputs are grouped into the empirical probability distribution $p_\tau^l$ and the output vector $v\{p_\tau^l\}$ of layer l as follows:

$p_\tau^l = [p_\tau^{l_1}(1^l)\ p_\tau^{l_1}(2^l) \ldots p_\tau^{l_1}(N^l)]'$ $v\{p_\tau^l\} = [v'\{p_\tau^l(1^l)\}\ v'\{p_\tau^l(2^l)\} \ldots v'\{p_\tau^l(N^l)\}]'$ The components of a feature vector $v_\tau^{l-1}$ input to layer l at time (or numbering) τ comprise components of binary vectors generated by UPUs in layer l−1 and those generated at previous times by UPUs in the same layer l or UPUs in higher layers with layer numberings l+k for some positive integers k. The time delays may be of different durations.

For illustration, an example is given in the following:

EXAMPLE 4

Let us set the number z(k) of unit-time delay devices equal to 4(k+1) for k=0, . . . , 7; and set the number ζ time units that each exogenous feature vector is held constant equal to 16.

For k=1 and z(1)=8, the first 8 feedbacks used by layer l in processing an exogenous feature vector $v_t^{ex}$ are output from layer l+1 in response to $v_{t-1}^{ex}$, which provides temporally and spatially associated information from the preceding exogenous feature vector $v_{t-1}^{ex}$.

For k=5 and z(5)=24, the first 8 feedbacks used by layer l in processing an exogenous feature vector $v_t^{ex}$ are output from layer l+5 in response to $v_{t-2}^{ex}$; and the next 8 feedbacks are output from layer l+5 in response to $v_{t-1}^{ex}$, which provides temporally and spatially associated information from the preceding exogenous feature vectors, $v_{t-2}^{ex}$ and $v_{t-1}^{ex}$.

For k=8 and z(8)=36, the first 4 feedbacks used by layer l in processing an exogenous feature vector $v_t^{ex}$ are output from layer l+8 in response to $v_{t-3}^{ex}$; and the next 12 feedbacks are output from layer l+8 in response to $v_{t-2}^{ex}$, which provides temporally and spatially associated information from the preceding exogenous feature vectors, $v_{t-3}^{ex}$ and $v_{t-2}^{ex}$.

Note that the greater k, the larger the number of unit-delay devices, and the further back the feedbacked information is in processing the current exogenous feature vector $v_t^{ex}$. Note also that the further back the feedbacked information, the less spatially but more temporally associative information is used in processing $v_t^{ex}$. Moreover, given the same numbers of unit-delay devices on each feedback connection, if an exogenous feature vector is presented to the LOM for a larger number of time units, then more recent information and less further back information is used in processing $v_t^{ex}$. This means more spatially associated information is brought back by the feedback connections and utilized by the LOM.

An example LOM with three layers of PUs and feedbacks is shown in its entirety in FIG. 26. There are three types of feedback connection: same-layer feedbacks, one-layer feedbacks and two-layer feedbacks. The numbers of unit-time delay devices on the feedback connections are not specified for simplicity. The second delay box on a feedback connection represents an additional delay.

5.10 The Clusterer and Interpreter

An architecture of the LOM that makes for an effective artificial neural network comprises a cluster and an interpreter, which are described in the present Subsection. The clusterer in the LOM is a network of unsupervised processing units (UPUs) with or without time-delayed feedbacks. If the cluster has no feedback connection, it is an unsupervised ANN (artificial neural network) that clusters spatial data. If the clusterer has feedback connections, it is an unsupervised ANN that clusters spatial and/or temporal data.

The vectors output from an UPU in the clusterer in the LOM are point estimates $v\{p_\tau\}$ of the labels of clusters of vectors $v_\tau$ input to the UPU. These labels form a vocabulary for the UPU. To interpret such a label or its point estimate $v\{p_\tau\}$ generated by UPU into a word, a few words, a sentence or a few sentences using the language of the human user, say English, an SPU is used.

Once an exogenous feature vector is received by a clusterer in the LOM, the UPUs perform functions of retrieving and/or learning from layer to layer starting with layer 1 (i.e., the lowest layer). After the UPUs in the highest layer, layer L, complete performing their functions, the clusterer in the LOM is said to have completed one round of retrievings and/or learnings (or memory adjustments). For each exogenous feature vector, the clusterer in the LOM will continue to complete a certain number of rounds of retrievings and/or learnings.

FIG. 27 shows layer l and layer l+2 of UPUs of a clusterer with feedback connections in the LOM, wherein same-layer feedback connections have one unit-time delay device and 2-layer feedback connections have 5 unit-time delay devices from layer l+2 to layer l. The box under layer l of PUs illustrates that the feature vector input to layer l comprises feedforward vector $v\{p_\tau^{l-1}\}$, the same layer feedback $v\{p_{\tau-1}^l\}$, and the 2-layer feedback $v\{p_{\tau-5}^{l+2}\}$.

FIG. 28 shows an LOM with a clusterer and an interpreter. The clusterer in the LOM in FIG. 27 is again shown in FIG. 28. The connections and delay devices in the clusterer are not shown for clarity in FIG. 28. The three UPUs in the lowest layer are not connected to a SPU, but each of the three PUs in the second and third layers is. UPU($1^2$) and UPU($2^2$) in the second layer have feedforward connections to SPU($1^3$) and SPU($2^3$) respectively, and UPU($1^3$) in the third layer has feedforward connections to SPU($1^4$).

The labels, $r_\tau(1^3)$, $r_\tau(2^3)$ and $r_\tau(1^4)$, which are used for supervised learning by the synapses in SPU($1^3$), SPU($2^3$) and SPU($1^4$) respectively are provided by the human trainer of the artificial neural network. For spatial pattern recognition, $r_\tau(n^l)$ is obtained by tracing the feedforward connections from SPU($n^l$) all the way down to input terminals that receive the exogenous feature vector and if necessary further down to the sensor elements such as the pixels in the CCD of a camera. These input terminals or sensory elements are called the receptive field of SPU($n^l$) and UPU($n^{l-1}$) in the measurements. If the human trainer sees a distinct cause such as an apple or John Doe's face in the receptive field, he/she assigns the bipolar binary code of a word or a phrase such as "apple" or "John Does's face" to the bipolar binary label $r_\tau(n^l)$. Since supervised covariance learning is very easy and the output vector of SPU($n^l$), which has the same number of bits as $r_\tau(n^l)$, will not be used as inputs to another PU, the total number of bits in $r_\tau(n^l)$ can be made as large as needed to hold the longest code for the receptive field. Shorter codes can be made longer by including zeros at the beginning or ending of the shorter codes.

The receptive field of an SPU branching out from a higher layer is larger than that of an SPU branching out from a lower layer. The cause in a larger receptive field usually requires a longer bipolar binary code to represent. For example, there are only 26 letters, more than 10,000 commonly used words, and millions of commonly used sentences; which need codes of 5 bits, 14 bits, and 30 bits, respectively. To avoid using a look-up table to translate codes into English word or sentences, we can simply type the letters, the words or the sentences to assign their ASCII codes to $r_\tau(n^l)$.

To avoid an SPU using different codes for the same pattern or cause, we may use SPU($n^l$) to retrieve its $v\{p_\tau^l(n^l)\}$. If it is not recognizable by the human trainer, if it does not agree with the human trainer, or if the empirical probability distribution $p_\tau^l(n^l)$ does not contain enough information; we assign a new $r_\tau(n^l)$ to SPU($n^l$). A measure of information contained in $p_\tau^l(n^l)$ is $$\xi(p_\tau(n^l)) = 1 - \frac{4}{R}\sum_{k=1}^{R} p_{\tau k}^l(n^l)(1 - p_{\tau k}^l(n^l)).$$

If $p_{\tau k}^l(n^l)=0$ or 1 for k=1, 2, ..., R, then $\xi(p_\tau^l(n^l))=1$ and $\xi(p_\tau(n^l))$ is maximized, meaning there is no uncertainty in $p_\tau(n^l)$. If $p_{\tau k}(n^l)=\frac{1}{2}$ for k=1, 2, ..., R, then $\xi(p_\tau(n^l))=0$ and $\xi(p_\tau(n^l))$ is minimized, meaning there is no information in $p_\tau(n^l)$.

Recall that the clusterer of the LOM learns independently of the learning (or even existence) of SPUs in the LOM's interpreter. Whenever new information is acquired for creating a new handcrafted label for the output of an UPU with or without an SPU, a new SPU can be added and learn the new label. Therefore, there can be multiple SPUs for an UPU, providing multiple interpretations of the output from the UPUs. For example, if the head of a man shows up in the receptive field of an UPU, there may be 2 SPUs that output labels, "head of a man with long hair" and "head of Albert Einstein" in response to the vector output from the UPU. If it is later found that the photograph containing the head of Einstein was taken in 1945, a third SPU can be added that outputs the handcrafted label "An image of Albert Einstein in 1945" in response to the same vector output from the UPU.

5.11 Preprocessing Exogenous Feature Vectors for the LOM

If feature vectors $\alpha_t^{ex}$, t=1, 2, ..., to be processed by an artificial neural network have components being real numbers, a and b, or near a and b, where a and b are not unipolar binary digits (i.e., 0 and 1), a preprocessor is used to convert the feature vectors into unipolar binary digits or values near them before processing by the LOM.

Given a variable $\alpha$ whose value is either a real number a or a real number b, it can be transformed into a variable v whose value is either 0 or 1, respectively, by the following function:

$$v = f(\alpha) = \frac{\alpha - a}{b - a}$$

If $\alpha$ is near a or near b, then v is near $f(a)=0$ or near $f(b)=1$, respectively. Given a vector $\alpha=[\alpha_1\ \alpha_2\ \ldots\ \alpha_m]'$ whose components are real numbers, a and b, the vector $\alpha$ can be transformed into a binary vector v by the function $$v=f(\alpha)=[f(\alpha_1)\ f(\alpha_2)\ \ldots\ f(\alpha_m)]'$$

If the component of $\alpha$ is near a or near b, then the corresponding components of v are near $f(a)$ or near $f(b)$, respectively. Notice that the symbol $f$ denotes both a real-valued function of a real-valued variable $\alpha$ and a vector-valued function of a vector variable $\alpha$ with real components.

If the exogenous feature vectors $\alpha_t^{ex}$, t=1, 2, ..., to be processed by an artificial neural network have components being real numbers, a and b, or near a and near b, the vectors $\alpha_t^{ex}$, t=1, 2, ..., can be converted into binary or nearly binary vectors $v_t^{ex}$, t=1, 2, ..., by $v_t^{ex}=f(\alpha_t^{ex})$, t=1, 2, ... The low-order model (LOM) described hereinabove can then be applied.

5.12 the CIPAM—an ANN Mathematical Equivalent to the LOM

The LOM is a model of biological neural networks, wherein most biological neurons communicate with spike trains. Spike trains are usually modeled as sequences of 1's and 0's. The feature vectors, neuronal codes, neuron inputs, and neuron outputs in the LOM are all (unipolar) binary vectors, whose components are 1's and 0's. On the other hand, the corresponding quantities in the functional model of biological neural networks, the THPAM, are bipolar binary vectors, whose components are −1's and 1's. The development of the LOM motivated a re-examination of the THPAM to improve the THPAM and eliminate its shortcomings.

This re-examination resulted in still another functional model of biological neural networks, namely the Clustering Interpreting Probabilistic Associative Memory (CIPAM), reported in James Ting-Ho Lo, A Cortex-Like Learning Machine for Temporal Hierarchical Pattern Clustering, Detection, and Recognition, *Neurocomputing*, Vol. 78, pp. 89-103, 2012; also available online with DOI: 10.1016/j.neucom.2011.04.046, which is incorporated into the present invention disclosure by reference. As in the THPAM, the feature vectors, neuronal codes, neuron inputs, and neuron outputs in the CIPAM are all bipolar binary vectors, whose components are −1's and 1's. Among differences between the CIPAM and the THPAM, a main difference is that the former uses the unsupervised and supervised covariance rule to learn code covariance matrices and the latter uses the unsupervised and supervised correlation rule to learn expansion correlation matrices. This main difference necessitates some other differences including that in their retrieving methods; namely the former uses decovariance rule and the latter decorrelation rule. For applications, the LOM, THPAM and CIPAM are all artificial neural networks (ANNs).

The high degree of similarity between the LOM and the CIPAM motivated a study of their relation. This study led to the discovery that LOM and the CIPAM together with their corresponding components can be mathematically transformed into each other by the affine transformation and its inverse:

$$v=f(x)=\tfrac{1}{2}(1-x) \qquad (65)$$

$$x=f^{-1}(v)=1-2v \qquad (66)$$

where $f^{-1}$ denotes the inverse function of $f$. Notice that $f(1)=0$ and $f(-1)=1$, and that $f^{-1}(0)=1$ and $f^{-1}(1)=-1$. Note $f(0)=\tfrac{1}{2}$. Using the CIPAM to process vectors with components from $\{-1, 0, 1\}$ is equivalent to using the LOM to process vectors with components from $\{1, \tfrac{1}{2}, 0\}$. However, for simplicity, processing vectors whose components are from these ternary sets are not described in detail in the present invention disclosure. Those skilled in the art are not expected to have difficulty with extending the invention for processing such vectors.

A bipolar binary digit x, whose value is 1 or −1 and a unipolar binary digit v, whose value is 0 or 1, can be transformed into each other, respectively by (65) and (66). Each component of the LOM and its corresponding component of the CIPAM can be transformed into each other by (65) and (66). From this viewpoint, the CIPAM and the LOM are mathematically equivalent artificial neural networks. The CIPAM has advantages similar to those of the LOM over the THPAM. As an artificial neural network, the CIPAM is computationally less expensive than the LOM.

In the operation of the CIPAM, the exogenous feature vectors and the feature vectors input to each layer of its neurons or PUs (processing units) are bipolar binary vectors whose components assume values from the bipolar binary set $\{-1, 1\}$. As an equivalent of the LOM, the CIPAM does not have the shortcomings of the PAM (i.e., THPAM) mentioned in Subsection 2 (e.g., the inability of the PAM's unsupervised correlation learning mechanism to prevent clusters from overgrowing under certain circumstances). On the other hand, because the CIPAM processes bipolar binary digits, {−1, 1}, it is computationally less expansive than the LOM, which processes (unipolar) binary digits, {0,1}. The CIPAM is briefly described through transforming the LOM into the CIPAM below. A detailed description is given in the paper by James Ting-Ho Lo, A Cortex-Like Learning Machine for Temporal Hierarchical Pattern Clustering, Detection, and Recognition, *Neurocomputing*, DOI: 10.1016/j.neucom.2011.04.046, which is incorporated herein by reference.

By (65) and (66), given a bipolar binary variable x, whose value is 1 or −1, we can transform it into a (unipolar) binary variable v by $v=f(x)=\frac{1}{2}(1-x)$ and the other way around by $x=f^{-1}(v)=1-2v$. Let $v=f(x)$ and $u=f(y)$. Recall that the neuronal node performs $\phi(v, u)=-2vu+v+u$. By simple substitution, $$\phi(f(x), f(y)) = \frac{1}{2}(1-xy)$$

$$f^{-1}(\phi(f(x), f(y))) = xy$$

Therefore, this function xy is a representation of the neuronal node operation, where the inputs of the neuronal node are represented by x and y and its output is represented by xy. Note that if x and y are bipolar binary variables, xy is the NXOR (not-exclusive-or) function.

Using this representation of the neuronal node operation, the equations (2)-(5) that generate the neuronal code (or encoding) $\check{v}$ of an m-dimensional vector v are respectively replaced by the following equations for generating the representation $\check{x}$ of $\check{v}$:

$$\check{x}(1) = [\,1 \quad x_1\,]' \tag{67}$$

$$\check{x}(1, 2) = [\,\check{x}(1) \quad x_2\check{x}(1)\,] \tag{68}$$
$$= [\,1 \quad x_1 \quad x_2 \quad x_2 x_1\,]$$

$$\check{x}(1, \ldots, k+1) = [\,\check{x}'(1, \ldots, j) \quad x_{k+1}\check{x}'(1, \ldots, k)\,]' \tag{69}$$

$$\check{x} = \check{x}(1, \ldots, m) \tag{70}$$

This representation of the neuronal code is actually the orthogonal expansion of x discussed in the paper by James Ting-Ho Lo, Functional Model of Biological Neural Networks, *Cognitive Neurodynamics*, Vol. 4, No. 4, pp. 295-313, November 2010 and the patent application by James Ting-Ho Lo, A Cortex-Like Learning Machine for Temporal and Hierarchical Pattern Recognition, U.S. patent application Ser. No. 12/471,341, filed May 22, 2009; Publication No. US-2009-0290800-A1, Publication Date: Nov. 26, 2009. In the same paper and same patent application, it is proven that given two m-dimensional vectors, x and y, their orthogonal expansions, $\check{x}$ and $\check{y}$, satisfy $$\check{x}'\check{y} = \prod_{j=1}^{m}(1 + x_j y_j) \tag{71}$$

Recall that for real-valued variables, v, u, x, and y, $$v - \frac{1}{2} = -\frac{1}{2}x$$

$$\phi(v, u) - \frac{1}{2} = -2\left(v - \frac{1}{2}\right)\left(u - \frac{1}{2}\right) = -\frac{xy}{2}$$

The relation between the above formula 71 and the formula (6) can be seen by observing that for m-dimensional vectors, v, u, x, y, and their neuronal codes, $\check{v}$, $\check{u}$, and orthogonal expansions, $\check{x}$, $\check{y}$, respectively; we have $\check{v}-\frac{1}{2}I=-\frac{1}{2}\check{x}$ and $\check{u}=\frac{1}{2}I=-\frac{1}{2}\check{y}$, and $$\prod_{k=1}^{m}(1 + x_k y_k) = 4\left(-\frac{1}{2}\check{x}\right)'\left(-\frac{1}{2}\check{y}\right) \tag{72}$$

$$= 4\left(\check{v} - \frac{1}{2}I\right)'\left(\check{u} - \frac{1}{2}I\right)$$

$$= \prod_{k=1}^{m}\left(1 + 2^2\left(v_k - \frac{1}{2}\right)\left(u_k - \frac{1}{2}\right)\right)$$

where $I=[1\ 1\ \ldots\ 1]'$, which we note is not the identity matrix I. From the formula 71, it follows that if x and y are bipolar binary variables, $$\check{x}'\check{y} = 0, \text{ if } x \neq y \tag{73}$$
$$= 2^m, \text{ if } x = y$$

Based on the transformations, (65) and (66), and the above corresponding properties between the variables x and y and the variables v and u, the LOM (low-order model of biological neural networks) described in preceding Subsections can be transformed into the CIPAM, which is an equivalent of LOM. In this equivalent of LOM, components of feature vectors, "spikes and nonspikes", and components of labels are bipolar binary digits or in their vicinities. The variables whose values are such digits and numbers will be denoted by $x_{tj}$, $y_{ti}$ and $z_{ti}$ instead of $v_{tj}$, $u_{ti}$ and $w_{ti}$ in the following lists of formulas for the equivalent, CIPAM. Here $x_{tj}=f^{-1}(v_{tj})$, $y_{ti}=f^{-1}(u_{ti})$, and $z_{ti}=f^{-1}(w_{ti})$.

For unsupervised covariance learning by the CIPAM, the formulas, (11), (12) and (13), are respectively transformed into $$D_{ij} \leftarrow \lambda D_{ij} + \Lambda(y_{ti} - \langle y_{ti}\rangle)(\check{x}_{tj} - \langle \check{x}_{tj}\rangle) \tag{74}$$

$$D \leftarrow \lambda D + \Lambda(y_t - \langle y_t\rangle)(\check{x}_t - \langle \check{x}_t\rangle)' \tag{75}$$

$$D = \Lambda \sum_{s=1}^{t} \lambda^{t-s}(y_s - \langle y_s\rangle)(\check{x}_s - \langle \check{x}_s\rangle)' \tag{76}$$

where $x_t$ is a vector input to a neuronal encoder; each of the $2^m$ outputs, $\check{x}_{t1}, \check{x}_{t2}, \ldots, \check{x}_{t2^m}$, from the neuronal encoder at time (or numbering) t, pass through a synapse to reach each of a number, say R, postsynaptic model spiking neurons and a postsynaptic model nonspiking neuron; and the output of model spiking neuron i is denoted by $y_{ti}$. $y_t$ is the vector of R outputs $y_{ti}$ of the R model spiking neurons. Furthermore, the formulas, (14), (15) and (16), are respectively transformed into $$D_{ij} \leftarrow \lambda D_{ij} + \Lambda y_{ti}(\tilde{x}_{tj} - \langle \tilde{x}_{tj} \rangle) \quad (77)$$

$$D \leftarrow \lambda D + \Lambda y_t(\tilde{x}_t - \langle \tilde{x}_t \rangle)' \quad (78)$$

$$D = \Lambda \sum_{s=1}^{t} \lambda^{t-s} y_s (\tilde{x}_s - \langle \tilde{x}_s \rangle)' \quad (79)$$

For supervised covariance learning by the CIPAM, (17), (18), and (19) are respectively transformed into $$D_{ij} \leftarrow \lambda D_{ij} + \Lambda z_{ti}(\tilde{x}_{tj} - \langle \tilde{x}_{tj} \rangle) \quad (80)$$

$$D \leftarrow \lambda D + \Lambda z_t(\tilde{x}_t - \langle \tilde{x}_t \rangle)' \quad (81)$$

$$D = \Lambda \sum_{s=1}^{t} \lambda^{t-s} z_s (\tilde{x}_s - \langle \tilde{x}_s \rangle)' \quad (82)$$

where $z_t$ is a label of the pattern (or cause) inside the receptive field of the R model spiking neurons, and is provided from outside the CIPAM. Here $z_s$, s=1, 2, . . . t, are bipolar binary vectors or nearly bipolar binary vectors.

For unsupervised accumulation learning by the CIPAM, (21) and (22) are respectively transformed into $$C \leftarrow \lambda C + \frac{\Lambda}{2}(\tilde{x}_t - \langle \tilde{x}_t \rangle)' \quad (83)$$

$$C = \frac{\Lambda}{2} \sum_{s=1}^{t} \lambda^{t-s} (\tilde{x}_s - \langle \tilde{x}_s \rangle)' \quad (84)$$

For retrieving information from synapses, (24) and (25) are respectively transformed into $$d_\tau = D(\check{x}_\tau - \langle \check{x}_\tau \rangle) \quad (85)$$

$$c_\tau = C(\check{x}_\tau - \langle \check{x}_\tau \rangle) \quad (86)$$

For maximal generalization, the masking matrix (32) remains the same, but (33) and (34), are replaced with $$d_\tau = DM(\check{x}_\tau - \langle \check{x}_\tau \rangle) \quad (87)$$

$$c_\tau = CM(\check{x}_\tau - \langle \check{x}_\tau \rangle) \quad (88)$$

which are also called the decovariance rule.

To describe the feature subvector input to a processing unit with $\Psi$ multiple neuronal encoders in the CIPAM, the formulas, (39) and (40), are respectively transformed into $$\check{x}_t = [\check{x}_t'(1) \, \check{x}_t'(2) \ldots \check{x}_t'(\Psi)]' \quad (89)$$

$$\langle \check{x}_t \rangle = [\langle \check{x}_t'(1) \rangle \, \langle \check{x}_t'(2) \rangle \ldots \langle \check{x}_t'(\Psi) \rangle]' \quad (90)$$

The formula, (43), for the general masking matrix M for a PU in the CIPAM remains the same. The general expansion covariance matrix D learned by the unsupervised covariance rule by an UPU in the CIPAM is defined by (41), where the code covariance matrix $D(\psi)$ is defined by (76) or (79), depending on whether $y_s - \langle y_s \rangle$ or $y_s$ is used. The general expansion covariance matrix D learned by the supervised covariance rule by an UPU in the CIPAM is defined by (41), where the code covariance matrix $D(\psi)$ is defined by (82). The general expansion covariance matrix C for the CIPAM is defined by (42), where the code covariance matrix $C(\psi)$ is defined by (84).

For retrieving information from synapses by the CIPAM, the formulas, (44) and (45), are transformed into $$d_\tau(\psi) = D(\psi)M(\psi)(\check{x}_\tau(\psi) - \langle \check{x}_\tau(\psi) \rangle) \quad (91)$$

$$c_\tau(\psi) = C(\psi)M(\psi)(\check{x}_\tau(\psi) - \langle \check{x}_\tau(\psi) \rangle) \quad (92)$$

for $\psi = 1, \ldots, \Psi$.

The computations performed by a nonspiking neuron and by spiking neuron k in a PU in the CIPAM are respectively the addition of components of $c_\tau(\psi)$, $\psi=1, \ldots, \Psi$, and the addition of kth rows of $d_\tau(\psi)$, $\psi=1, \ldots, \Psi$ to get c, and $d_{\tau k}$. Expressions of the resulting sums, $c_\tau$ and $d_{\tau k}$, can be expressed by transforming (54) and (55) respectively into $$c_\tau = CM(\check{x}_\tau - \langle \check{x}_\tau \rangle) \quad (93)$$

$$d_{\tau k} = D_k M(\check{x}_\tau - \langle \check{x}_\tau \rangle) \quad (94)$$

$(c_\tau + d_{\tau k})/2$ is an estimate of $2^m$ times the total number of times $v_\tau$ and its variants have been encoded and stored in C with the kth component $r_{\tau k}$ of $r_\tau$ being 1. $c_\tau$ is an estimate of $2^m$ times the total number of times $v_\tau$ and its variants have been encoded and stored in C. Consequently, $(d_{\tau k}/c_\tau + 1)/2$ is an empirical probability $p_{\tau k}$ that $r_{\tau k}$ is equal to 1 given $x_t$ input to the PU. Model spiking neuron k then uses a pseudo-random number generator to generate a number (or "spike") 1 with probability $p_{\tau k}$ and a number −1 (representing "no spike") with probability $1 - p_{\tau k}$. This pseudo-random number denoted by $x\{p_{\tau k}\}$ is the output $y_{\tau k}$ of model spiking neuron k at time or numbering $\tau$. $y_{\tau k} = x\{p_{\tau k}\}$ is thus a point estimate of the k-th component $r_{\tau k}$ of the label $r_\tau$ of $x_\tau$.

Note that the vector $$p_\tau = [p_{\tau 1} \, p_{\tau 2} \ldots p_{\tau R}]'$$

is a representation of an empirical probability distribution of the label $r_\tau$. Note also that the outputs of the R model spiking neurons in response to $x_\tau$ form a bipolar binary vector $y_\tau = x\{p_\tau\}$, which is a point estimate of the label $r_\tau$ of the vector $x_\tau$ input to the PU, whether $r_\tau$ is $y_\tau$ in unsupervised learning or $z_\tau$ in supervised learning.

The CIPAM has the following computational advantage over LOM: While the (model) neuronal node in LOM evaluates $-2vu+v+u$, the (model) neuronal node in the CIPAM evaluates xy. The former involves 2 multiplications and two additions, and the latter a single multiplication. In a neuronal encoder with an m-dimensional input vector, there are $2^m$ neuronal nodes. Therefore, the CIPAM is computationally much less expensive than LOM.

The learning masking matrices, denoted by $M^\#(\psi)$, $\psi=1, \ldots, \Psi$, form a general masking matrix called the general learning masking matrix $$M^\# = \text{diag}[M^\#(1) \, M^\#(2) \ldots M^\#(\Psi)] \quad (95)$$

which is a diagonal matrix. The diagonal entries are numbered consecutively from 1 to dim $\check{x}_\tau = \Sigma_{\psi=1}^{\Psi} 2^{dim \, x_\tau(\psi)}$, where $\check{x}_\tau$ is the general neuronal code, whose entries are also numbered consecutively from 1 to dim $\check{x}_\tau$. The diagonal entries $M_{jj}^\#$, j=1, . . . , dim $\check{x}_\tau$, of $M^\#$ are called learning masking factors.

An UPU (unsupervised processing unit) with learning masking matrices $M^\#(\psi)$, $\psi=1, \ldots, \Psi$, generates an estimate $x\{p_\tau\}$ of the label of the vector $x_\tau$ input to the UPU using its masking matrices $M(\psi)$, $\psi=1, \ldots, \Psi$, as before. However, when it comes to learning, the learning masking matrices $M^\#(\psi)$, $\psi=1, \ldots, \Psi$, are used instead to generate an estimate $x\{p_\tau^\#\}$ of the label of $x_t$, and the general code covariance matrix D is adjusted by $$D(\psi) \leftarrow \lambda D(\psi) + \Lambda(x\{p_\tau^\#\} - \langle x\{p_\tau^\#\} \rangle)(\check{x}_\tau - \langle \check{x}_\tau \rangle)' \quad (96)$$

More specifically, $x\{p_\tau^\#\}$ is generated as follows:

$$[c_{\tau j}^\#] = [M_{jj}^\# C_j(\tilde{x}_\tau - \langle \tilde{x}_\tau \rangle)] \qquad (97)$$

$$[d_{\tau k j}^\#] = [M_{jj}^\# D_{kj}(\tilde{x}_\tau - \langle \tilde{x}_\tau \rangle)] \qquad (98)$$

$$c_\tau^\# = \sum_j c_{\tau j}^\# \qquad (99)$$

$$p_{\tau k}^\# = \left(\sum_j d_{\tau k j} + c_\tau^\#\right) / (2 c_\tau^\#) \qquad (100)$$

$x\{p_\tau^\#\}$ is a pseudorandom number generated in accordance with the empirical probability distribution $p_{\tau k}^\#$, and then $x\{p_\tau^\#\} = [x\{p_{\tau 1}^\#\} \ldots x\{p_{\tau R}^\#\}]'$, where R is the number of model spiking neurons in the UPU.

5.13 Preprocessing Exogenous Feature Vectors for the CIPAM

Given a variable $\alpha$ whose value is either a real number a or a real number b, it can be transformed into a variable x whose value is either −1 or 1, respectively, by the following function:

$$x = f(\alpha) = \frac{2\alpha - a - b}{b - a}$$

If $\alpha$ is near a or near b, then x is near $f(a)=-1$ or near $f(b)=1$, respectively. Given a vector $\alpha=[\alpha_1 \alpha_2 \ldots \alpha_m]'$ whose components are real numbers, a and b, the vector $\alpha$ can be transformed into a bipolar binary vector x by the function $$x = f(\alpha) = [f(\alpha_1) f(\alpha_2) \ldots f(\alpha_m)]'$$

If a component of $\alpha$ is near a or near b, then the corresponding component of x is near $f(a)$ or near $f(b)$, respectively. Notice that the symbol $f$ denotes both a real-valued function of a real-valued variable $\alpha$ and a vector-valued function of a vector variable $\alpha$ with real components.

If the exogenous feature vectors $\alpha_t^{ex}$, $t=1, 2, \ldots$, to be processed by an artificial neural network have components being real numbers, a and b, or near a and near b, the vectors $\alpha_t^{ex}$, $t=1, 2, \ldots$, can be converted into binary or nearly binary vectors $x_t^{ex}$, $t=1, 2, \ldots$, by $x_t^{ex} = f(\alpha_t^{ex})$, $t=1, 2, \ldots$. The CIPAM described hereinabove can then be applied.

5.14 A General ANN Mathematically Equivalent to LOM

The mathematical equivalence of the LOM and CIPAM motivated search for ANNs (artificial neural networks) that are mathematically equivalent to the LOM and CIPAM. Generalizations of the affine transformations, (65) and (66), are the following:

$$v = f(\alpha) = \frac{\alpha - a}{b - a} \qquad (101)$$

$$\alpha = f^{-1}(v) = (b - a)v + a \qquad (102)$$

where $f^{-1}$ denotes the inverse function of $f$. Notice that $f(a)=0$ and $f(b)=1$, and that $f^{-1}(0)=a$ and $f^{-1}(1)=b$. Note that the affine transformations, (101) and (102) with a=1 and b=−1, are (65) and (66). Using (101) and (102), the LOM can be transformed into a general ANN for a and b the way the LOM is transformed into the CIPAM for a=1 and b=−1.

Let $v=f(\alpha)$ and $u=f(\beta)$. Recall that $\phi(v, u)=-2vu+v+u=(1-v)u+(1-u)v$. By simple substitution, $$\phi(v, u) = \phi(f(\alpha), f(\beta))$$
$$= \left(1 - \frac{\alpha - a}{b - a}\right)\left(\frac{\beta - a}{b - a}\right) + \left(1 - \frac{\beta - a}{b - a}\right)\left(\frac{\alpha - a}{b - a}\right)$$
$$= -\frac{(\alpha - b)(\beta - a) + (\alpha - a)(\beta - b)}{(b - a)^2}$$

and $$f^{-1}(\phi(f(\alpha), f(\beta))) = (b - a)\phi(f(\alpha), f(\beta)) + a$$
$$= \frac{-2\alpha\beta + (a + b)(\alpha + \beta - a)}{b - a}$$

This function $f^{-1}(\phi(f(\alpha), f(\beta)))$ is denoted by $\phi(\alpha, \beta)$. Notice that $\phi(a, a)=a$, $\phi(a, b)=b$, $\phi(b, a)=b$, $\phi(b, b)=a$. Hence, if $\alpha$ and $\beta$ only assume values from $\{a, b\}$, $\phi(\alpha, \beta)$ is a "general XOR or NXOR function".

The function $\phi(\alpha, \beta)$ is a general representation of the neuronal node operation $\phi(v, u)$, where the inputs of the neuronal node are represented by $\alpha$ and $\beta$ and its output is represented by $\phi(\alpha, \beta)$.

The algebraic binary operation $\phi(\alpha, \beta)$ is a commutative and associative binary operation on $\alpha$ and $\beta$:

$$\phi(\alpha, \beta) = \phi(\beta, \alpha)$$

$$\phi(\gamma, \phi(\alpha, \beta)) = \phi(\phi(\gamma, \alpha), \beta)$$

Hence, we can define a symmetric function $\phi_k$ by applying the binary operation repeatedly as follows:

$$\phi_k(\alpha_1, \alpha_2, \ldots, \alpha_k) = \phi(\ldots \phi(\phi(\alpha_1, \alpha_2), \alpha_3), \ldots, \alpha_k)$$

where $\phi_1(\alpha_i) = \alpha_i$ and $\phi_2(\alpha_i, \alpha_j) = \phi(\alpha_i, \alpha_j)$.

Let $v_i = f(\alpha_i)$ for $i=1, \ldots k$. Recall $\phi(\alpha_1, \alpha_2) = f^{-1}(\phi(v_1, v_2)) = f^{-1}(\phi(f(\alpha_1), f(\alpha_2)))$. Using this definition of $\phi(\alpha_1, \alpha_2)$, we obtain $$\varphi_3(\alpha_1, \alpha_2, \alpha_3) = \varphi(\varphi(\alpha_1, \alpha_2), \alpha_3)$$
$$= \varphi(f^{-1}(\phi(v_1, v_2)), f^{-1}(v_3))$$
$$= f^{-1}(\phi(\phi(v_1, v_2), v_3))$$
$$= f^{-1}(\phi_3(v_1, v_2, v_3))$$

Assume that $\phi_k(\alpha_1, \ldots, \alpha_k) = f^{-1}(\phi_k(v_1, \ldots, v_k))$. Using the definition of $\phi(\alpha_1, \alpha_2)$ again yields $$\varphi_{k+1}(\alpha_1, \ldots, \alpha_{k+1}) = \varphi(\varphi_k(\alpha_1, \ldots \alpha_k), \alpha_{k+1})$$
$$= \varphi(f^{-1}(\phi_k(v_1, \ldots v_k)), \alpha_{k+1})$$
$$= f^{-1}(\phi(\phi_k(v_1, \ldots v_k), v_{k+1}))$$
$$= f^{-1}(\phi_{k+1}(v_1, \ldots, v_{k+1}))$$

By mathematical induction, for any positive integer k, $$\phi_k(\alpha_1, \ldots, \alpha_k) = f^{-1}(\phi_k(v_1, \ldots, v_k)) \qquad (103)$$

To describe an orthogonality property of the outputs of a model neuronal encoder with input variables $\{\alpha_1, \alpha_2, \ldots, \alpha_m\}$, we organize its $2^m$ outputs into a vector as follows: Let $\beta$ denote a scalar and $\alpha=[\alpha_1 \alpha_2 \ldots \alpha_k]'$ a k-dimensional vector. Define a k-dimensional vector $\phi(\beta, \alpha)$ by $$\phi(\beta, \alpha) = [\phi(\beta, \alpha_1) \phi(\beta, \alpha_2) \ldots \phi(\beta, \alpha_k)]'$$

The $2^m$ different functions that can be defined by compositions of the binary operation $\phi(\alpha, \beta)$ on the input set $\{\alpha_1,$ $\alpha_2, \ldots, \alpha_m\}$ are generated and organized into a $2^m$-dimensional column vector $\check{\alpha}$ by recursively generating row vectors $\check{\alpha}(1, \ldots, k)$, for $k=1, 2, \ldots, m$, as follows:

$$\check{\alpha}(1) = [a \; \alpha] \tag{104}$$

$$\check{\alpha}(1,2) = [\check{\alpha}(1) \; \phi(\alpha_2, \check{\alpha}(1))] \tag{105}$$

$$\check{\alpha}(1, \ldots, k+1) = [\check{\alpha}(1, \ldots, k) \; \phi(\alpha_{k+1}, \check{\alpha}(1, \ldots, k))] \tag{106}$$

$$\check{\alpha} = \check{\alpha}'(1, \ldots, m) \tag{107}$$

By (103), $$\check{\alpha} = \begin{bmatrix} \check{\alpha}_1 & \check{\alpha}_2 & \ldots & \check{\alpha}_{2^m} \end{bmatrix}'$$
$$= \begin{bmatrix} f^{-1}(\check{v}_1) & f^{-1}(\check{v}_2) & \ldots & f^{-1}(\check{v}_{2^m}) \end{bmatrix}'$$

where $\check{\alpha}_k$ and $\check{v}_k$ denote the k-th components of $\check{\alpha}$ and $\check{v}$ respectively. The vector on the right side is denoted by $f^{-1}(\check{v})$ for simplicity. The vector $\check{\alpha}$ is called the neuronal code of $\alpha$.

By (101) and (102), $$\check{v}_k - \frac{1}{2} = f(\check{\alpha}_k) - \frac{1}{2}$$
$$= \frac{\check{\alpha}_k - a}{b-a} - \frac{1}{2}$$
$$= \frac{\check{\alpha}_k - \mu}{b-a}$$

where $$\mu = \frac{a+b}{2}.$$

Hence $$\check{v} - \frac{1}{2}I = \frac{1}{b-a}(\check{\alpha} - \mu I)$$

and $$(\check{\alpha} - \mu I)'(\check{\beta} - \mu I) = (b-a)^2 \left(\check{v} - \frac{1}{2}I\right)'\left(\check{u} - \frac{1}{2}I\right) \tag{108}$$
$$= \frac{(b-a)^2}{4} \prod_{k=1}^{m} \left(1 + 2^2 \left(v_k - \frac{1}{2}\right)\left(u_k - \frac{1}{2}\right)\right)$$
$$= \frac{(b-a)^2}{4} \prod_{k=1}^{m} \left(1 + 2^2 \left(\frac{\alpha_k - \mu}{b-a}\right)\left(\frac{\beta_k - \mu}{b-a}\right)\right)$$

It follows that if the components assume values from $\{a, b\}$, the neuronal codes have the following orthogonality property:

$$(\check{\alpha} - \mu I)'(\check{\beta} - \mu I) = 2^{m-2}(b-a)^2 \text{ if } \alpha = \beta$$
$$= 0 \text{ if } \alpha \neq \beta$$

If the components of $\alpha$ and $\beta$ assume values from the set $\{a, \mu, b\}$, we have the following additional properties from the formula (108):

1. If $(\alpha_k - \mu)(\beta_k - \mu) = 0$ for some k in $\{1, \ldots, m\}$, then $$(\check{\alpha} - \mu I)'(\check{\beta} - \mu I) = \frac{(b-a)^2}{4} \prod_{k=1, j \neq k}^{m} \left(1 + 2^2 \left(\frac{\alpha_k - \mu}{b-a}\right)\left(\frac{\beta_k - \mu}{b-a}\right)\right) \tag{109}$$

2. If $(\check{\alpha} - \mu I)'(\check{\beta} - \mu I) \neq 0$, then $(\check{\alpha} - \mu I)'(\check{\beta} - \mu I) = 2^{4(\alpha - \mu I)'(\beta - \mu I) - 2}$, where the vector I on the left side of the equality sign is $2^m$-dimensional, but I on the right side of the equality sign is m-dimensional.

Based on the transformations, (101) and (102), and the above corresponding properties between the variables $\alpha$ and $\beta$ and the variables v and u, the LOM (low-order model of biological neural networks) can be transformed into a general representation of the LOM, which is a general ANN mathematically equivalent to the LOM. In this general ANN, components of feature vectors, "spikes and nonspikes", and components of labels are numbers, a and b, or numbers in their vicinities. The variables whose values are such numbers will be denoted by $\alpha_{tj}$, $\beta_{ti}$ and $\gamma_{ti}$ instead of $v_{tj}$, $u_{ti}$ and $w_{ti}$ in the following lists of formulas for the general representation. Here $\alpha_{tj} = f^{-1}(v_{tj})$, $\beta_{ti} = f^{-1}(u_{ti})$, and $\gamma_{ti} = f^{-1}(w_{ti})$.

For unsupervised covariance learning by the general model, the formulas, (11), (12) and (13), are respectively transformed to $$D_{ij} \leftarrow \lambda D_{ij} + \Lambda(\beta_{ti} - \langle \beta_{ti} \rangle)(\check{\alpha}_{tj} - \langle \check{\alpha}_{tj} \rangle) \tag{110}$$

$$D \leftarrow \lambda D + \Lambda(\beta_t - \langle \beta_t \rangle)(\check{\alpha}_t - \langle \check{\alpha}_t \rangle)' \tag{111}$$

$$D = \Lambda \sum_{s=1}^{t} \lambda^{t-s}(\beta_s - \langle \beta_s \rangle)(\check{\alpha}_s - \langle \check{\alpha}_s \rangle)' \tag{112}$$

where $\alpha_t$ is a vector input to the neuronal encoder; the $2^m$ outputs, $\check{\alpha}_{t1}, \check{\alpha}_{t2}, \ldots, \check{\alpha}_{t2^m}$, from the neuronal encoder at time (or numbering) t, pass through a synapse to reach each of a number, say R, postsynaptic model spiking neurons and a postsynaptic model nonspiking neuron, and the output of model spiking neuron i is denoted by $\beta_{ti}$. $\beta_t$ is the vector of R outputs $\beta_{ti}$ of the R model spiking neurons. Furthermore, the formulas, (14), (15) and (16), are respectively transformed into $$D_{ij} \leftarrow \lambda D_{ij} + \Lambda(\beta_{ti} - (a+b)/2)(\check{\alpha}_{tj} - \langle \check{\alpha}_{tj} \rangle) \tag{113}$$

$$D \leftarrow \lambda D + \Lambda(\beta_t - (a+b)/2)(\check{\alpha}_t - \langle \check{\alpha}_t \rangle)' \tag{114}$$

$$D = \Lambda \sum_{s=1}^{t} \lambda^{t-s}(\beta_s - (a+b)/2)(\check{\alpha}_s - \langle \check{\alpha}_s \rangle)' \tag{115}$$

For supervised covariance learning by the general model, (17), (18), and (19) are respectively transformed into $$D_{ij} \leftarrow \lambda D_{ij} + \Lambda(\gamma_{ti} - (a+b)/2)(\check{\alpha}_{tj} - \langle \check{\alpha}_{tj} \rangle) \tag{116}$$

$$D \leftarrow \lambda D + \Lambda(\gamma_t - (a+b)/2)(\check{\alpha}_t - \langle \check{\alpha}_t \rangle)' \tag{117}$$

$$D = \Lambda \sum_{s=1}^{t} \lambda^{t-s}(\gamma_s - (a+b)/2)(\check{\alpha}_s - \langle \check{\alpha}_s \rangle)' \tag{118}$$

where $\gamma_t$, $t=1, 2, \ldots$, is a sequence of labels of the causes (e.g., patterns) inside the receptive field of the R model spiking neurons in the PU, and is provided from outside the CIPAM. The components of $\gamma_{ti}$ assume values from the set $\{a, b\}$.

For unsupervised accumulation learning by the general model, (21) and (22) are respectively transformed into $$C \leftarrow \lambda C + \frac{\Lambda}{2}(\tilde{\alpha}_t - \langle \tilde{\alpha}_t \rangle)' \quad (119)$$

$$C = \frac{\Lambda}{2} \sum_{s=1}^{t} \lambda^{t-s}(\tilde{\alpha}_s - \langle \tilde{\alpha}_s \rangle)' \quad (120)$$

For retrieving information from synapses, the decovariance rule, (24) and (25), are respectively transformed into $$d_\tau = D(\check{\alpha}_\tau - \langle \check{\alpha}_\tau \rangle) \quad (121)$$

$$c_\tau = C(\check{\alpha}_\tau - \langle \check{\alpha}_\tau \rangle) \quad (122)$$

which are also called the decovariance rule.

For maximal generalization, the masking matrix (32) remains the same, but (33) and (34) are replaced with $$d_\tau = DM(\check{\alpha}_\tau - \langle \check{\alpha}_\tau \rangle) \quad (123)$$

$$c_\tau = CM(\check{\alpha}_\tau - \langle \check{\alpha}_\tau \rangle) \quad (124)$$

which are also called the decovariance rule.

To describe the feature subvector input to a processing unit with $\Psi$ multiple neuronal encoders in the general model, the formulas, (39) and (40), are respectively transformed to $$\check{\alpha}_t = [\check{\alpha}_t'(1) \; \check{\alpha}_t'(2) \ldots \check{\alpha}_t'(\Psi)]' \quad (125)$$

$$\langle \check{\alpha}_t \rangle = [\langle \check{\alpha}_t'(1) \rangle \; \langle \check{\alpha}_t'(2) \rangle \ldots \langle \check{\alpha}_t'(\Psi) \rangle]' \quad (126)$$

The formula, (43), for the general masking matrix M for a PU in the CIPAM remains the same. The general expansion covariance matrix D learned by the unsupervised covariance rule by an UPU in the CIPAM is defined by (41), where the code covariance matrix $D(\psi)$ is defined by (112) or (115), depending on whether $y_s - \langle y_s \rangle$ or $y_s$ is used. The general expansion covariance matrix D learned by the supervised covariance rule by an UPU in the CIPAM is defined by (41), where the code covariance matrix $D(\psi)$ is defined by (118). The general expansion covariance matrix C for the CIPAM is defined by (42), where the code covariance matrix $C(\psi)$ is defined by (120).

For retrieving information from synapses by the general model, the formulas, (44) and (45), are transformed into $$d_\tau(\psi) = D(\psi)M(\psi)(\check{\alpha}_\tau(\psi) - \langle \check{\alpha}_\tau(\psi) \rangle) \quad (127)$$

$$c_\tau(\psi) = C(\psi)M(\psi)M(\check{\alpha}_\tau(\psi) - \langle \check{\alpha}_\tau(\psi) \rangle) \quad (128)$$

for $\psi = 1, \ldots, \Psi$.

The computation formulas performed by a nonspiking neuron and a spiking neuron in the general model are obtained by transforming (54) and (55) respectively into $$c_\tau = CM(\check{\alpha}_\tau - \langle \check{\alpha}_\tau \rangle) \quad (129)$$

$$d_{\tau k} = D_k M(\check{\alpha}_\tau - \langle \check{\alpha}_\tau \rangle) \quad (130)$$

$(c_\tau + d_{\tau k})/2$ is an estimate of $2^m$ times the total number of times $v_\tau$ and its general models have been encoded and stored in C with the kth component $r_{\tau k}$ of $r_\tau$ being a. $c_\tau$ is an estimate of $2^m$ times the total number of times $v_\tau$ and its general models have been encoded and stored in C. Consequently, $(d_{\tau k}/c_\tau + 1)/2$ is the empirical probability $p_{\tau k}$ that $r_{\tau k}$ is equal to a given $\alpha_\tau$. model spiking neuron k then uses a pseudo-random number generator to generate a number (or "spike") a with probability $p_{\tau k}$ and a number b (or no "spike") with probability $1 - p_{\tau k}$.

This pseudo-random number denoted by $\alpha\{p_{\tau k}\}$ is the output $\beta_{\tau k}$ of model spiking neuron k at time or numbering $\tau$. $\beta_{\tau k} = \alpha\{p_{\tau k}\}$ is thus a point estimate of the k-th component $r_{\tau k}$ of the label $r_\tau$ of $\alpha_\tau$ input to the PU.

Note that the vector $$p_\tau = [p_{\tau 1} \; p_{\tau 2} \ldots p_{\tau R}]'$$

is a representation of an empirical probability distribution of the label $r_\tau$. Note also that the outputs of the R model spiking neurons in response to $\alpha_\tau$ form a bipolar binary vector $\beta_\tau = \alpha\{p\}$, which is a point estimate of the label $r_\tau$ of $\alpha_\tau$.

6 CONCLUSION, RAMIFICATION, AND SCOPE OF INVENTION

Many embodiments of the present invention are disclosed, which can achieve the objects listed in the "Summary" of the present invention disclosure. While our descriptions hereinabove contain many specificities, these should not be construed as limitations on the scope of the invention, but rather as an exemplification of preferred embodiments. In addition to these embodiments, those skilled in the art will recognize that other embodiments are possible within the teachings of the present invention. Accordingly, the scope of the present invention should be limited only by the appended claims and their appropriately construed legal equivalents.

What is claimed is:

1. An artificial neural network for processing data, comprising at least one processing unit, a first processing unit including
   (a) at least one artificial neuronal encoder for encoding a vector into a neuronal code;
   (b) a means for evaluating a code deviation vector that is the deviation of a neuronal code obtained by said artificial neuronal encoder from a neuronal code average;
   (c) a plurality of artificial synapse memories each for storing a component of a code deviation accumulation vector;
   (d) a first means for evaluating a first product of a component of a code deviation accumulation vector, a masking factor, and a component of a code deviation vector;
   (e) an artificial nonspiking neuron processor for evaluating a first sum of first products obtained by said first means;
   (f) a plurality of artificial synapse memories each for storing an entry of a code covariance matrix;
   (g) a second means for evaluating a second product of an entry of a code covariance matrix, a masking factor, and a component of a code deviation vector; and
   (h) at least one artificial spiking neuron processor for evaluating a second sum of second products obtained by said second means, and for using at least said second sum and a first sum obtained by said artificial nonspiking neuron processor to evaluate a representation of a first empirical probability distribution of a component of a label of a vector that is input to said first processing unit.

2. The artificial neural network of claim 1, wherein a plurality of code covariance matrices are submatrices of a general code covariance matrix, a plurality of code deviation accumulation vectors are subvectors of a general code deviation accumulation vector, a plurality of masking factors are entries of a masking matrix, a plurality of masking matrices are submatrices of a general masking matrix, a plurality of neuronal codes are subvectors of a general neuronal code, and a plurality of neuronal code averages are subvectors of a general neuronal code average.

3. The artificial neural network of claim 1, further comprising at least one feedback connection with a time delay means.

4. The artificial neural network of claim 1, said first processing unit further including an unsupervised accumulation learning means for adjusting at least one component of a code deviation accumulation vector by an unsupervised accumulation rule in response to a vector that is input to said first processing unit.

5. The artificial neural network of claim 1, said first processing unit further including a pseudorandom number generation means for generating at least one pseudo-random number in accordance with a first empirical probability distribution obtained by said at least one artificial spiking neuron processor.

6. The artificial neural network of claim 5, said first processing unit further including an unsupervised learning means for using at least a pseudorandom number generated by said pseudorandom number generation means and an entry of a code deviation vector to adjust an entry of a code covariance matrix by an unsupervised covariance rule in response to a vector that is input to said first processing unit.

7. The artificial neural network of claim 1, said first processing unit further including
 (a) a third means for evaluating a third product of a component of a code deviation accumulation vector, a learning masking factor, and a component of a code deviation vector;
 (b) a summing means for evaluating a third sum of third products obtained by said third means;
 (c) a fourth means for evaluating a fourth product of an entry of a code covariance matrix, a learning masking factor, and a component of a code deviation vector;
 (d) a summing-evaluating means for evaluating a fourth sum of fourth products obtained by said fourth means and for using at least said fourth sum and a third sum obtained by said summing means to evaluate a representation of a second empirical probability distribution of a component of a label of a vector that is input to said first processing unit; and
 (e) an unsupervised learning means for using at least a pseudorandom number generated in accordance with a second empirical probability distribution generated by said summing-evaluation means and a component of a code deviation vector to adjust an entry of a code covariance matrix by an unsupervised covariance rule in response to a vector that is input to said first processing unit.

8. The artificial neural network of claim 1, said first processing unit further including a supervised learning means for using at least one entry of a code deviation vector and one component of a given label of a vector that is provided from outside said first processing unit to adjust at least one entry of a code covariance matrix by a supervised covariance rule in response to a vector that is input to said first processing unit.

9. The artificial neural network of claim 1, wherein a plurality of processing units are unsupervised processing units, which form a clusterer, and at least one processing unit is a supervised processing unit, the set of said at least one supervised processing unit being an interpreter.

10. A learning machine for processing data, said learning machine comprising at least one processing unit, a first processing unit including
 (a) an encoding means for encoding a vector into a code;
 (b) a means for evaluating a code deviation vector;
 (c) a memory means for storing at least one first weighted sum of an entry of a code covariance matrix and a component of a code deviation accumulation vector;
 (d) a memory means for storing at least one masking factor;
 (e) a multiplying means for evaluating a product of a second weighted sum of an entry of a code covariance matrix and a component of a code deviation accumulation vector, a masking factor, and a component of a code deviation vector;
 (f) a summing means for evaluating a sum of products obtained by said multiplying means;
 (g) an evaluation means for using at least a sum obtained by said summing means to evaluate a representation of an empirical probability distribution of a component of a label of a vector input to said first processing unit.

11. The learning machine defined in claim 10, wherein said first weighted sum of an entry of a code covariance matrix and a component of a code deviation accumulation vector is a component of a code deviation accumulation vector.

12. The learning machine defined in claim 10, wherein said first weighted sum of an entry of a code covariance matrix and a component of a code deviation accumulation vector is an entry of a code covariance matrix.

13. The learning machine defined in claim 10, wherein said first weighted sum of an entry of a code covariance matrix and a component of a code deviation accumulation vector is a sum of an entry of a code covariance matrix and a component of a code deviation accumulation vector.

14. The learning machine of claim 10, said first processing unit further including a memory means for storing at least one learning masking factor; and a second evaluation means for using at least a weighted sum of an entry of a code covariance matrix and a component of a code deviation accumulation vector; a learning masking factor;
 and a component of a code deviation vector to evaluate a representation of an empirical probability distribution of a component of a label of a vector input to said first processing unit.

15. The learning machine of claim 10, said first processing unit further including a pseudorandom number generation means for generating at least one pseudo-random number in accordance with an empirical probability distribution obtained by said evaluation means.

16. The learning machine of claim 15, said first processing unit further including an unsupervised learning means for using at least a pseudorandom number generated by said pseudorandom number generation means and an entry of a code deviation vector to adjust at least one first weighted sum of an entry of a code covariance matrix and a component of a code deviation accumulation vector.

17. The learning machine of claim 16, wherein said unsupervised learning means adjusts at least one component of a code deviation accumulation vector by an unsupervised accumulation rule.

18. The learning machine of claim 16, wherein said unsupervised learning means adjusts at least one entry of a code covariance matrix by an unsupervised covariance rule.

19. The learning machine of claim 15, further comprising a feedback means for feedbacking at least one pseudorandom number generated by said pseudorandom number generation means to a processing unit after a time delay.

20. The learning machine of claim 10, said first processing unit further including a supervised learning means for adjusting at least one entry of a code covariance matrix by a supervised covariance rule.

21. The learning machine of claim 10, wherein a plurality of processing units are unsupervised processing units, which form a clusterer, and at least one processing unit is a supervised processing unit, which forms a interpreter.

22. A method for processing data, said method comprising steps of:

(a) encoding a subvector of a first vector into a code;
(b) evaluating a code deviation vector that is the deviation of a code from a code average;
(c) evaluating a product of a weighted sum of a component of a code deviation accumulation vector and an entry of a code covariance matrix, a masking factor, and a component of a code deviation vector;
(d) evaluating a sum of products obtained by said step of evaluating a product; and
(e) using at least a sum of products obtained by said step of evaluating a sum to evaluate a representation of an empirical probability distribution of a component of a label of said first vector.

23. The method of claim 22, wherein a weighted sum of a component of a code deviation accumulation vector and an entry of a code covariance matrix is a component of a code deviation accumulation vector.

24. The method of claim 22, wherein a weighted sum of a component of a code deviation accumulation vector and an entry of a code covariance matrix is an entry of a code covariance matrix.

25. The method of claim 22, wherein a weighted sum of a component of a code deviation accumulation vector and an entry of a code covariance matrix is a sum of an entry of a code covariance matrix and a component of a code deviation accumulation vector.

26. The method of claim 22, further comprising a step of using at least a component of a code deviation vector and a component of a given label of said first vector to adjust at least one entry of a code covariance matrix by a supervised covariance rule, said component of a given label being provided for said method to use.

27. The method of claim 22, further comprising a step of generating a pseudo-random number in accordance with an empirical probability distribution of a component of a label of said first vector.

28. The method of claim 27, further comprising a step of including a pseudo-random number generated in accordance with an empirical probability distribution of a component of a label as a component in said first vector after a time delay.

29. The method of claim 27, further comprising a step of adjusting a weighted sum of a component of a code deviation accumulation vector and an entry of a code covariance matrix.

30. The method of claim 29, wherein said step of adjusting a weighted sum is a step of adjusting a component of a code deviation accumulation vector by an unsupervised accumulation rule.

31. The method of claim 29, wherein said step of adjusting a weighted sum is a step of adjusting an entry of a code covariance matrix by an unsupervised covariance rule.

32. The method of claim 29, further comprising a step of using at least a component of a code deviation vector and a component of a given label of said first vector to adjust a component of a code covariance matrix by a supervised covariance rule, said given label being provided for said method to use.

33. The method of claim 22, further comprising steps of:
(a) evaluating a second product of a weighted sum of a component of a code deviation accumulation vector and an entry of a code covariance matrix, a learning masking factor, and a component of a code deviation vector;
(b) evaluating a sum of second products obtained by said step of evaluating a second product; and
(c) using at least a sum of second products obtained by said step of evaluating a sum of second products to evaluate a representation of a second empirical probability distribution of a component of a label of said first vector.

34. The method of claim 33, further comprising a step of using at least a sum of second products obtained by said step of evaluating a sum of second products and a component of a given label of said first vector to adjust an entry of a code covariance matrix by a supervised covariance rule, said given label being provided for said method to use.

* * * * *